(12) United States Patent
Reese et al.

(10) Patent No.: US 11,777,881 B2
(45) Date of Patent: Oct. 3, 2023

(54) USER INTERFACES AND ASSOCIATED SYSTEMS AND PROCESSES FOR SHARING PORTIONS OF CONTENT ITEMS

(71) Applicant: Apple Inc., Cupertino, CA (US)

(72) Inventors: Tiffany S. Reese, Cupertino, CA (US); Erik Lindholm, San Francisco, CA (US); Drew R. Domm, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/587,965

(22) Filed: Jan. 28, 2022

(65) Prior Publication Data

US 2022/0248187 A1 Aug. 4, 2022

Related U.S. Application Data

(60) Provisional application No. 63/143,646, filed on Jan. 29, 2021.

(51) Int. Cl.
*H04L 51/046* (2022.01)
*G06F 16/955* (2019.01)
(Continued)

(52) U.S. Cl.
CPC .......... *H04L 51/046* (2013.01); *G06F 3/0484* (2013.01); *G06F 3/0488* (2013.01); *G06F 16/685* (2019.01); *G06F 16/955* (2019.01); *H04L 9/3247* (2013.01); *H04L 51/10* (2013.01); *H04W 4/12* (2013.01); *H04W 4/30* (2018.02)

(58) Field of Classification Search
CPC .. G06F 16/955; G06F 16/685; G06F 3/04847; G06F 3/0484; G06F 3/0488; H04L 9/3247
See application file for complete search history.

(56) References Cited

U.S. PATENT DOCUMENTS

| 5,613,909 A | 3/1997 | Stelovsky |
| 6,323,846 B1 | 11/2001 | Westerman et al. |

(Continued)

FOREIGN PATENT DOCUMENTS

| EP | 2533548 A1 | 12/2012 |
| WO | 2013/169849 A2 | 11/2013 |

(Continued)

OTHER PUBLICATIONS

International Search Report received for PCT Patent Application No. PCT/US2022/014451, dated Apr. 8, 2022, 3 pages.

(Continued)

*Primary Examiner* — Gerald Johnson
(74) *Attorney, Agent, or Firm* — Kubota & Basol LLP

(57) ABSTRACT

In some embodiments, a first electronic device shares a portion of a content item corresponding to a respective portion of lyrics for the content item with a second electronic device. In some embodiments, a system facilitates securely sharing a portion of a content item between two devices. In some embodiments, an electronic device generates a server address for accessing a portion of a content item. In some embodiments, a uniform resource locator includes an identification of content, an indication of a first subset of the content, and authentication data.

50 Claims, 37 Drawing Sheets

(51) Int. Cl.
*G06F 16/683* (2019.01)
*H04L 9/32* (2006.01)
*H04L 51/10* (2022.01)
*H04W 4/30* (2018.01)
*G06F 3/0484* (2022.01)
*G06F 3/0488* (2022.01)
*H04W 4/12* (2009.01)

(56) References Cited

U.S. PATENT DOCUMENTS

| | | | |
|---|---|---|---|
| 6,357,042 | B2 | 3/2002 | Srinivasan et al. |
| 6,570,557 | B1 | 5/2003 | Westerman et al. |
| 6,677,932 | B1 | 1/2004 | Westerman |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,689,920 | B2 | 3/2010 | Robbin et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,199,160 | B2 | 6/2012 | Hauke |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,433,431 | B1 | 4/2013 | Master et al. |
| 8,479,122 | B2 | 7/2013 | Hotelling et al. |
| 8,601,372 | B1 | 12/2013 | Gentile et al. |
| 9,002,410 | B2 | 4/2015 | Tsui et al. |
| 9,176,658 | B1 | 11/2015 | Latin-stoermer et al. |
| 9,280,905 | B2 | 3/2016 | Campiranon et al. |
| 9,348,458 | B2 | 5/2016 | Hotelling et al. |
| 9,933,937 | B2 | 4/2018 | Lemay et al. |
| 9,977,584 | B2 | 5/2018 | Latin-stoermer et al. |
| 10,678,427 | B2 | 6/2020 | Xu |
| 2002/0015024 | A1 | 2/2002 | Westerman et al. |
| 2004/0205334 | A1 | 10/2004 | Rennels |
| 2004/0266337 | A1 | 12/2004 | Radcliffe et al. |
| 2005/0190059 | A1 | 9/2005 | Wehrenberg |
| 2006/0017692 | A1 | 1/2006 | Wehrenberg et al. |
| 2006/0033724 | A1 | 2/2006 | Chaudhri et al. |
| 2006/0197753 | A1 | 9/2006 | Hotelling |
| 2007/0204288 | A1 | 8/2007 | Candelore |
| 2008/0163283 | A1 | 7/2008 | Tan et al. |
| 2008/0184870 | A1 | 8/2008 | Toivola |
| 2009/0083281 | A1 | 3/2009 | Sarig et al. |
| 2009/0153288 | A1 | 6/2009 | Hope et al. |
| 2009/0177966 | A1 | 7/2009 | Chaudhri |
| 2009/0228544 | A1 | 9/2009 | Demers et al. |
| 2010/0251121 | A1 | 9/2010 | Rosser et al. |
| 2011/0137920 | A1 | 6/2011 | Cohen et al. |
| 2011/0276333 | A1 | 11/2011 | Wang et al. |
| 2012/0033948 | A1 | 2/2012 | Rodriguez et al. |
| 2012/0047437 | A1 | 2/2012 | Chan |
| 2012/0079384 | A1 | 3/2012 | Chuang |
| 2012/0304111 | A1 | 11/2012 | Queru |
| 2013/0269019 | A1 | 10/2013 | Garmark et al. |
| 2016/0011761 | A1 | 1/2016 | Latin-stoermer et al. |
| 2016/0255025 | A1* | 9/2016 | Valverde ................ H04L 67/06 715/716 |
| 2017/0068402 | A1 | 3/2017 | Lochhead et al. |
| 2017/0083214 | A1 | 3/2017 | FuresjÖ et al. |
| 2017/0093943 | A1* | 3/2017 | Alsina ................ H04L 67/1095 |
| 2017/0357421 | A1 | 12/2017 | Dye et al. |
| 2018/0088896 | A1 | 3/2018 | Olson |
| 2018/0309636 | A1 | 10/2018 | Strom et al. |
| 2018/0366097 | A1 | 12/2018 | Sharp |
| 2019/0034075 | A1 | 1/2019 | Smochko et al. |
| 2019/0087082 | A1 | 3/2019 | Chaudhri et al. |
| 2019/0172166 | A1 | 6/2019 | Evans |
| 2019/0355337 | A1 | 11/2019 | Steinwedel et al. |
| 2020/0204868 | A1 | 6/2020 | Peng et al. |
| 2020/0356221 | A1 | 11/2020 | Behzadi et al. |
| 2020/0356593 | A1 | 11/2020 | Azzinnari et al. |
| 2020/0379715 | A1 | 12/2020 | Won et al. |
| 2022/0247703 | A1 | 8/2022 | Deva et al. |

FOREIGN PATENT DOCUMENTS

| | | |
|---|---|---|
| WO | 2014/105276 A1 | 7/2014 |
| WO | 2020/023376 A1 | 1/2020 |

OTHER PUBLICATIONS

Examiner's Answer to Appeal Brief received for U.S. Appl. No. 16/584,715, mailed on Apr. 29, 2022, 33 pages.
Final Office Action received for U.S. Appl. No. 16/584,715, dated Jun. 8, 2020, 25 pages.
Final Office Action received for U.S. Appl. No. 16/584,715, dated May 17, 2021, 30 pages.
International Search Report received for PCT Patent Application No. PCT/US2020/035465, dated Nov. 2, 2020, 6 pages.
Looking ahead in the YouTube Player, YouTube Official Blog, Mar. 6, 2012, 5 pages.
Non-Final Office Action received for U.S. Appl. No. 16/584,715, dated Feb. 24, 2020, 25 pages.
Non-Final Office Action received for U.S. Appl. No. 16/584,715, dated Nov. 24, 2020, 26 pages.
Notice of Allowance received for U.S. Appl. No. 16/584,715, dated Feb. 7, 2023, 10 pages.
Notice of Allowance received for U.S. Appl. No. 17/657,311, dated Feb. 21, 2023, 9 pages.
Patent Board Decision received for U.S. Appl. No. 16/584,715, mailed on Nov. 14, 2022, 11 pages.

* cited by examiner

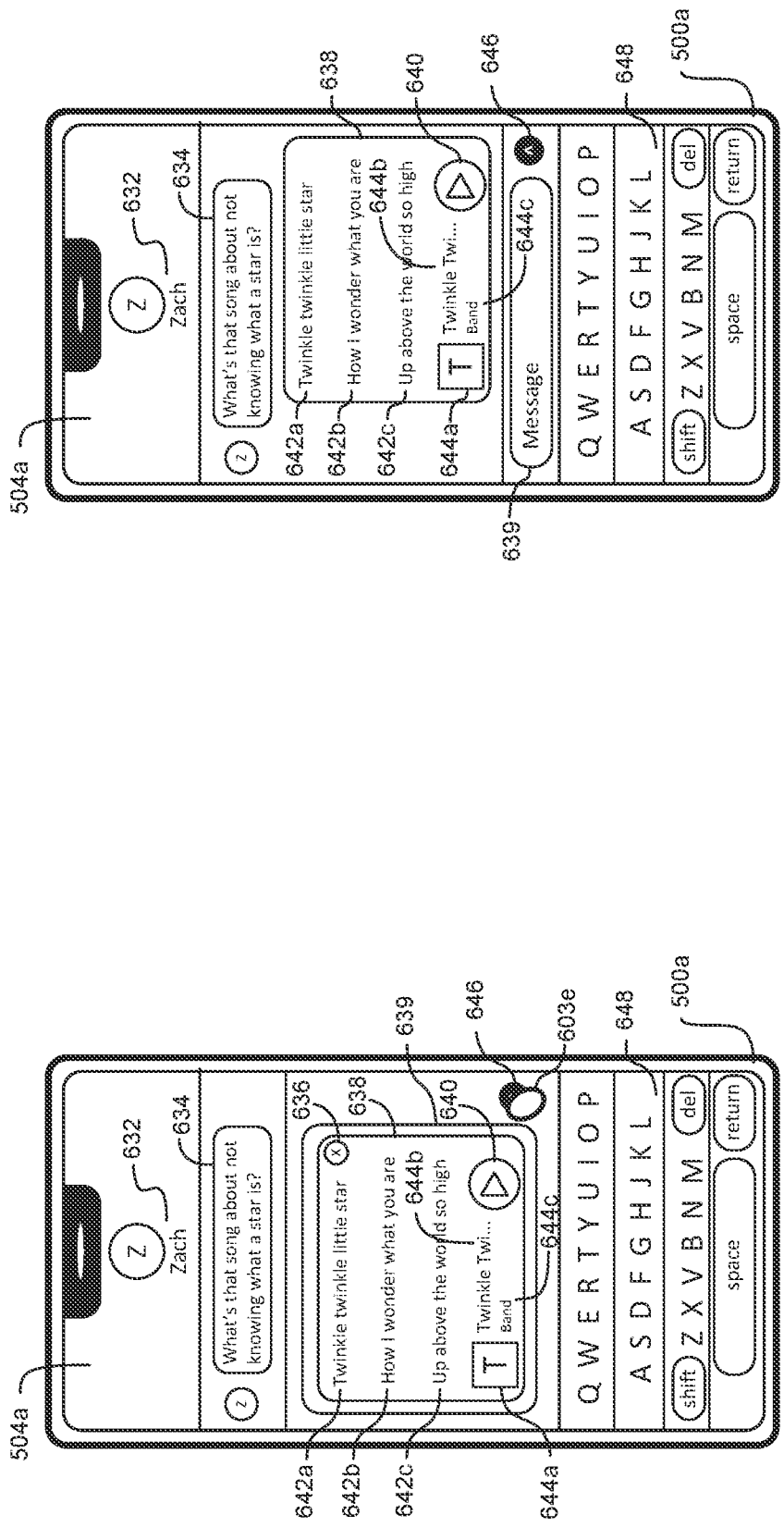

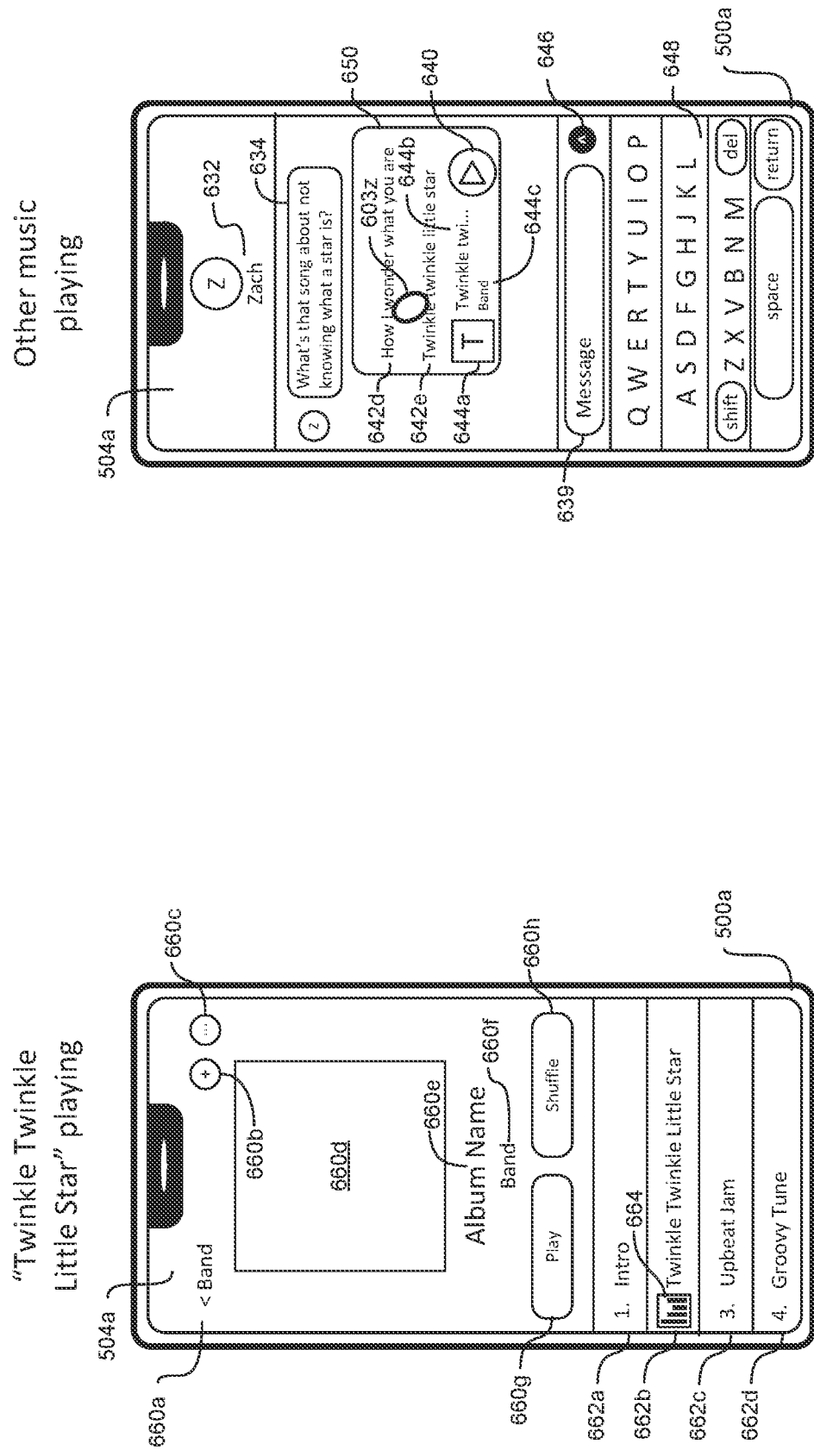

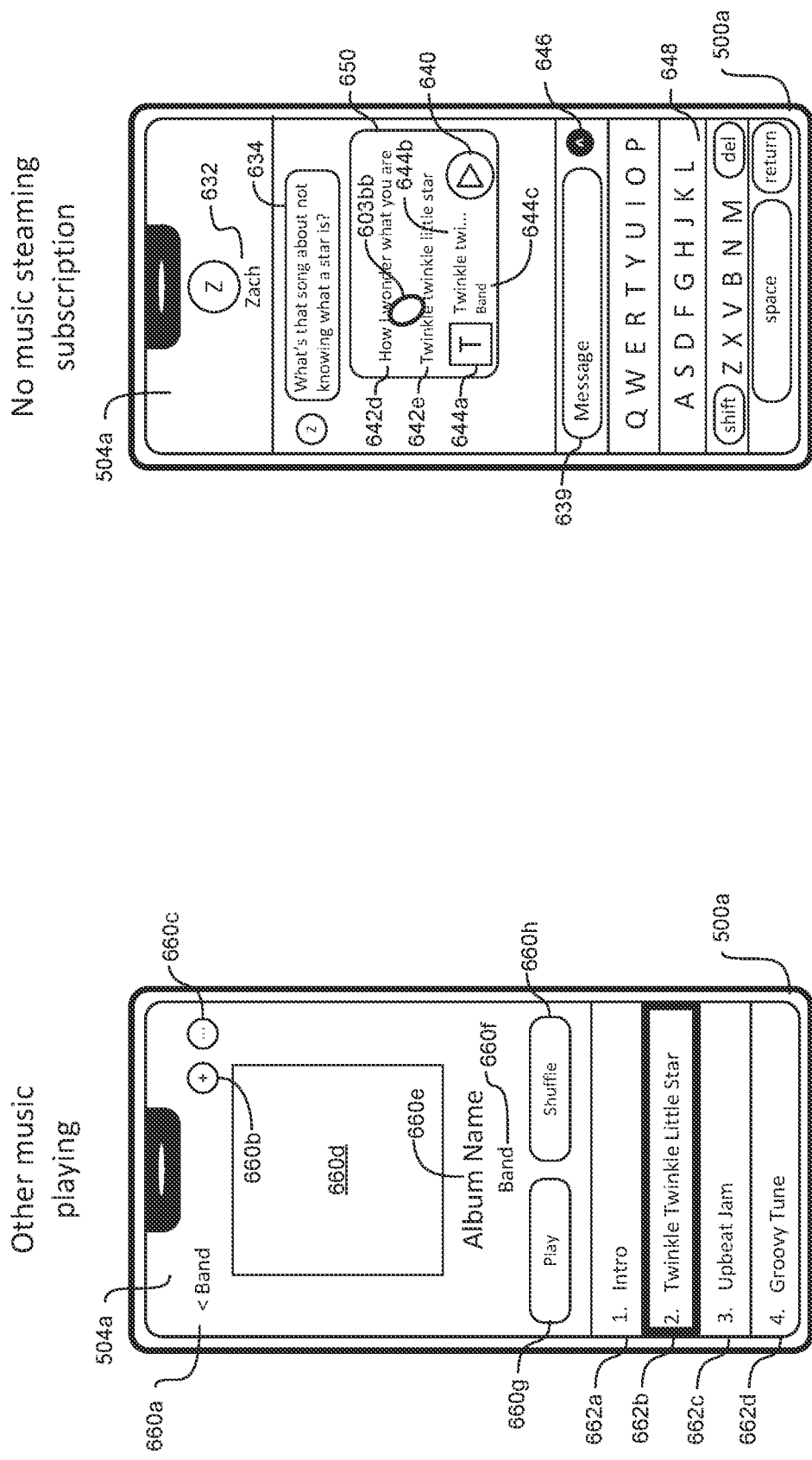

USER INTERFACES AND ASSOCIATED SYSTEMS AND PROCESSES FOR SHARING PORTIONS OF CONTENT ITEMS

CROSS-REFERENCE TO RELATED APPLICATIONS

This application claims the benefit of U.S. Provisional Application No. 63/143,646, filed Jan. 29, 2021, the content of which is incorporated herein by reference in its entirety for all purposes.

FIELD OF THE DISCLOSURE

This specification relates generally to electronic devices that share portions of content, and user interactions with such devices.

BACKGROUND

User interaction with electronic devices has increased significantly in recent years. These devices can be devices such as computers, tablet computers, televisions, multimedia devices, mobile devices, and the like. In some circumstances, users wish to use electronic devices to access and/or share content.

SUMMARY

Some embodiments described in this disclosure are directed to ways of sharing portions of content items with other electronic device. Some embodiments described in this disclosure are directed to ways of authenticating shared portions of content items. Enhancing a user's interactions with an electronic device in performing the above actions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Description of Embodiments

Figure 1A:
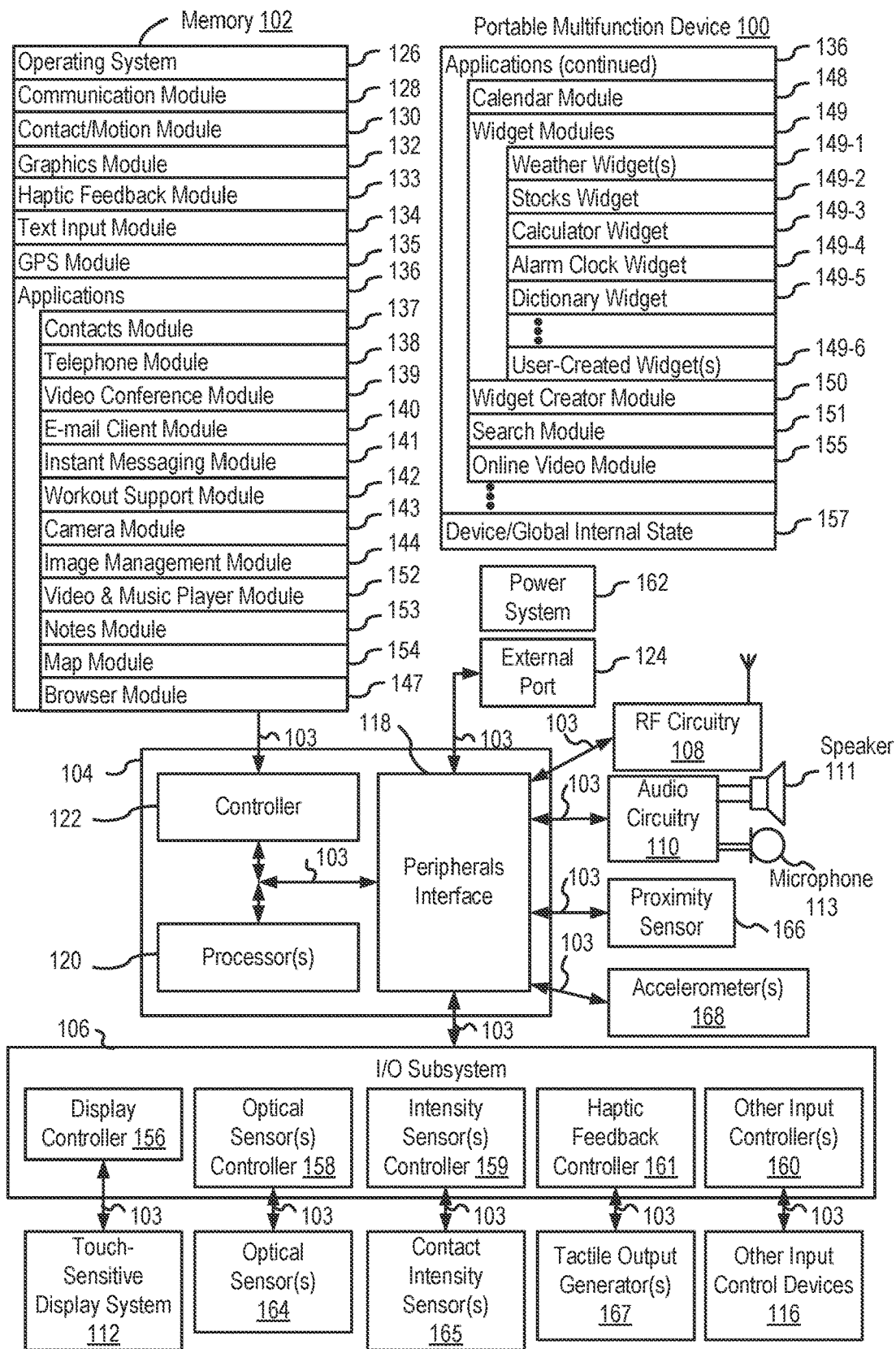
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

In some implementations, an example electronic device shares portions of content items (e.g., audio content) corresponding to the lyrics for the content items. For example, the electronic device optionally presents a sharing user interface in which the user is able to select one or more lines of lyrics to designate for sharing and initiate a process to share a portion of the content item corresponding to the lines of lyrics designated for sharing. Such techniques can reduce the cognitive burden on a user who uses an example electronic device and streamline a process for sharing user-defined portions of content items. In some implementations, a system including a first electronic device and a second electronic device generates a digital signature to securely share a portion of a content item. For example, the digital signature is optionally based on an indication of a content item and a designated portion of the content item. Such techniques can provide a secure way of sharing portions of content items in a manner that upholds licensing agreements with content creators. In some implementations, a uniform resource locator (e.g., URL) for sharing a portion of a content item includes an indication of the content item, an indication of the portion of the content item, and authentication data based on the indication of the content item and indication of the portion of the content item. For example, when the URL is accessed, a server verifies the authentication data before providing access to the portion of the content item. Such techniques can provide a secure way of sharing portions of content items in a manner that upholds licensing agreements with content creators.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S.

patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system)

receiver (not shown) for obtaining information concerning the location and orientation (e.g., portrait or landscape) of device 100.

Figure 3:
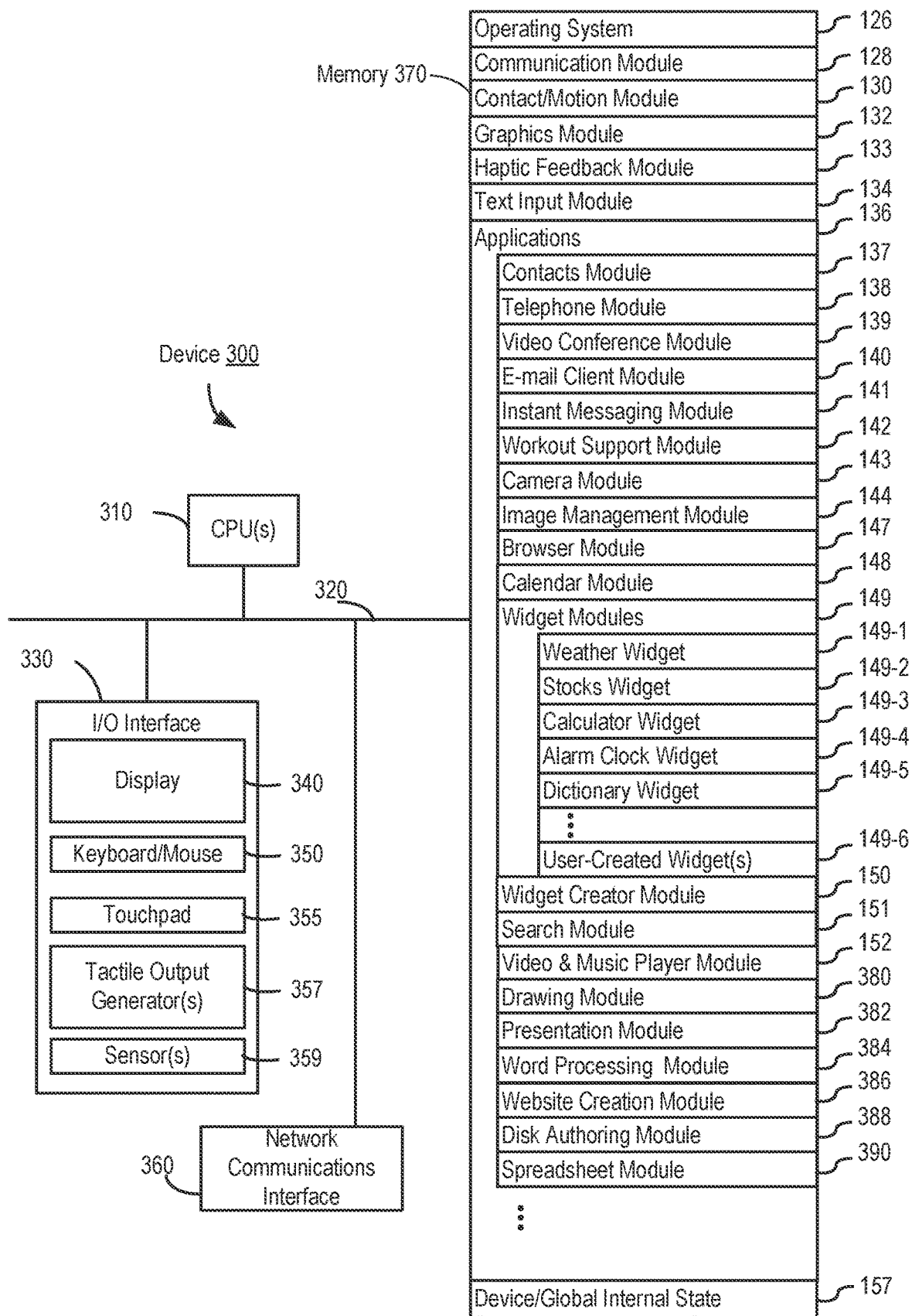
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
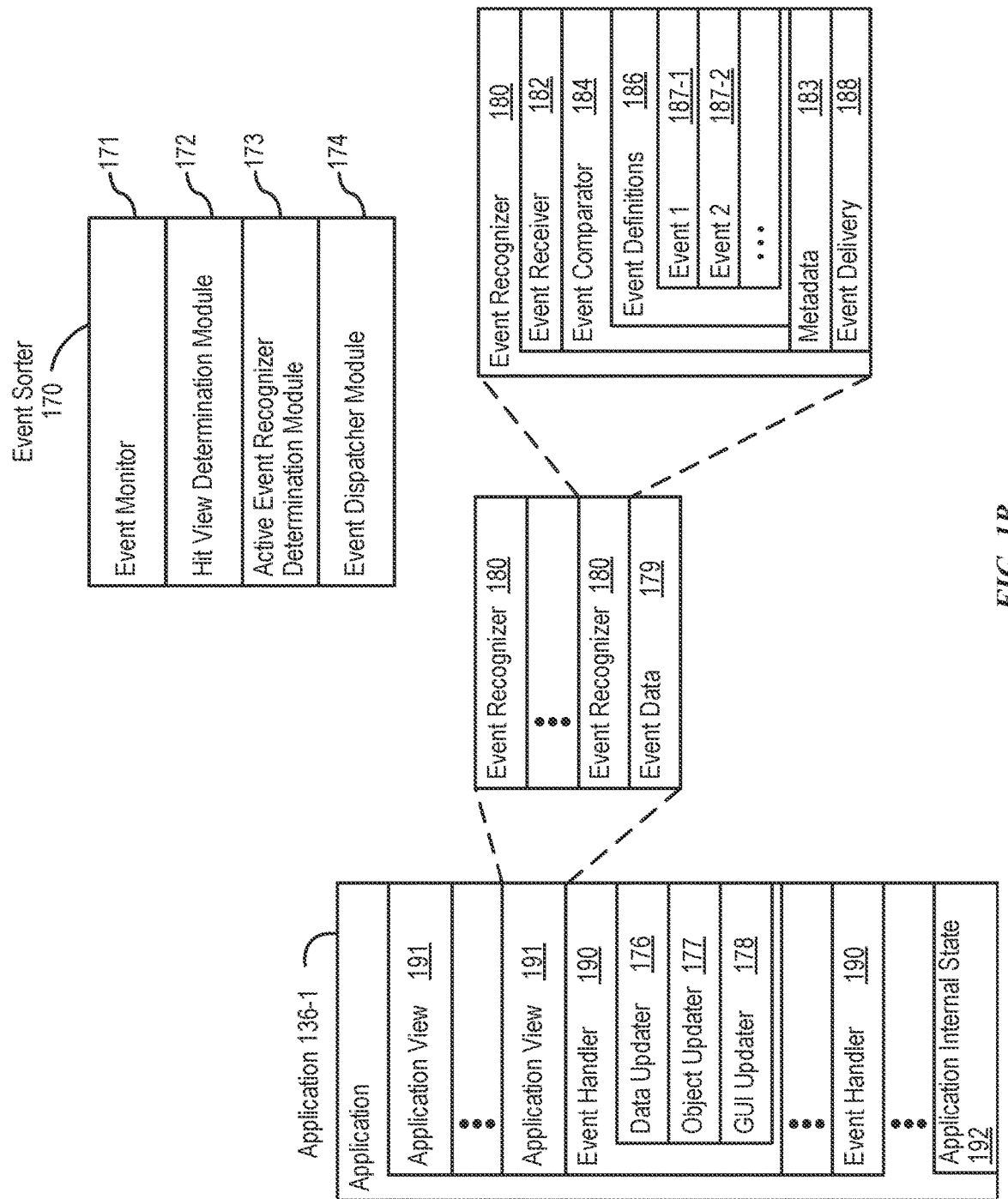
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
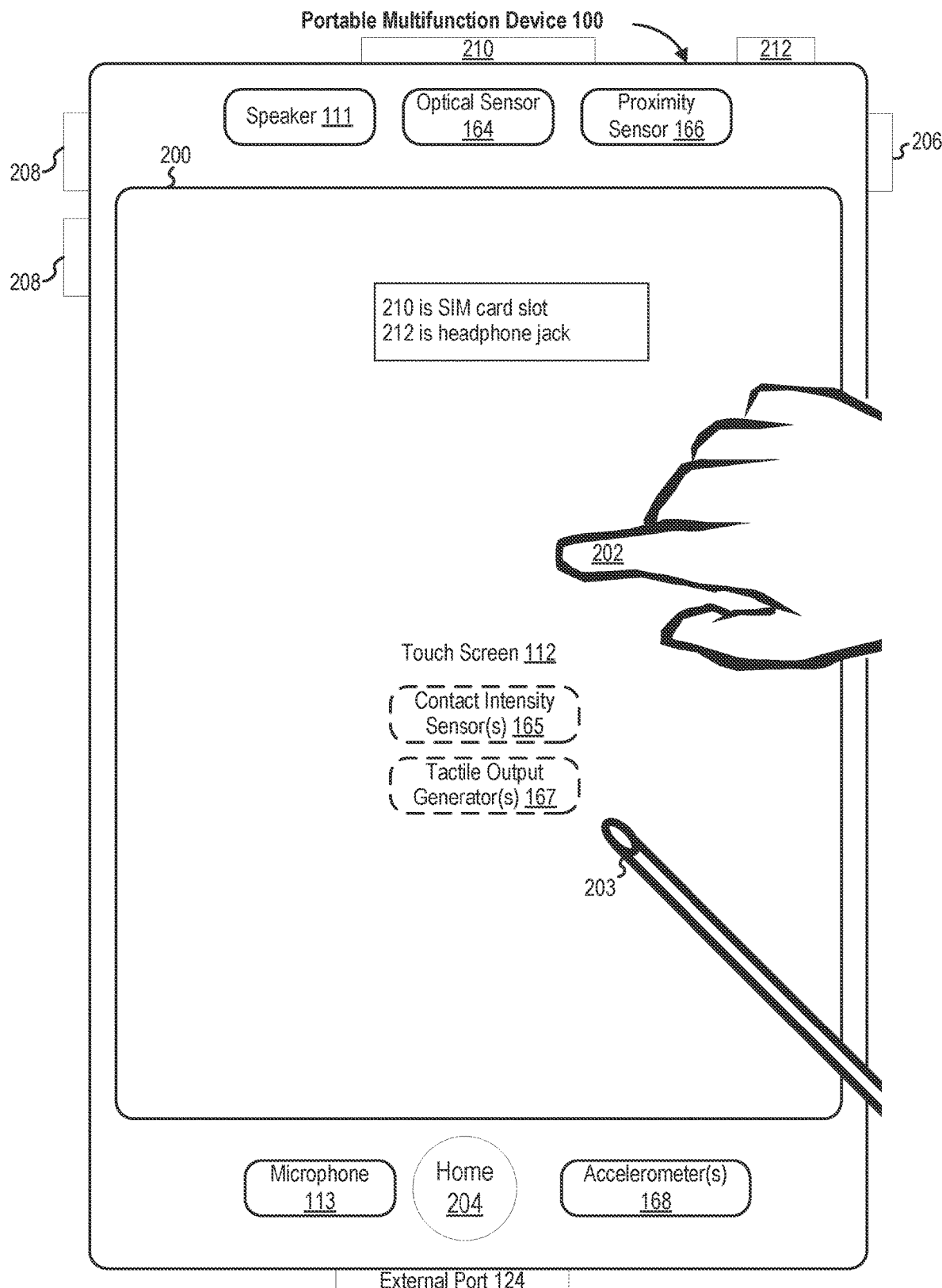
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
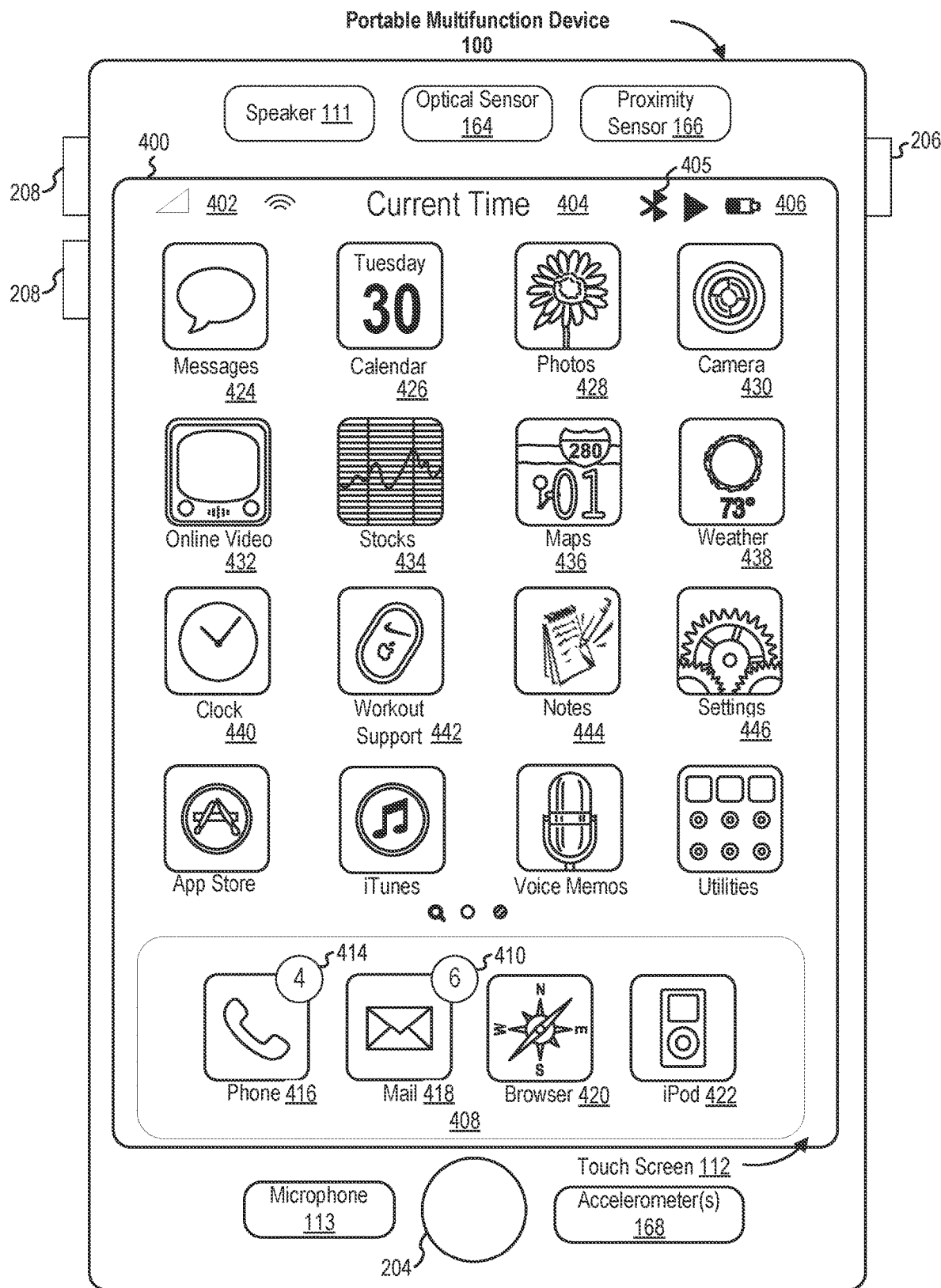
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
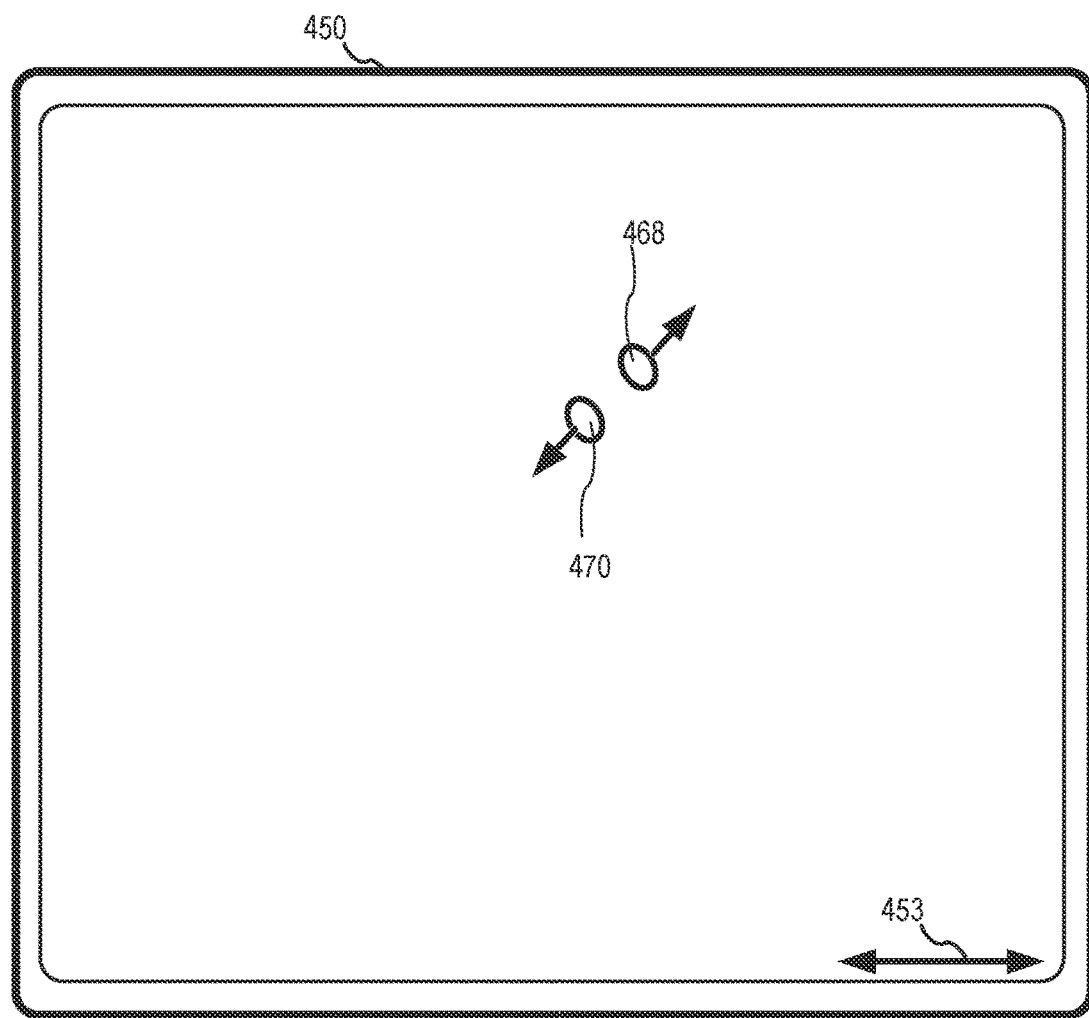
FIG. 4B illustrates an exemplary user interface for a multifunction device with a touch-sensitive surface that is separate from the display in accordance with some embodiments.
Figure 4B:
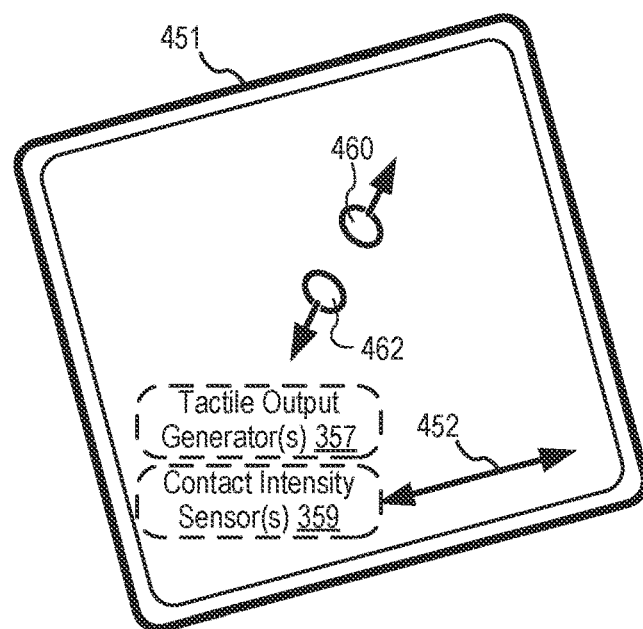

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
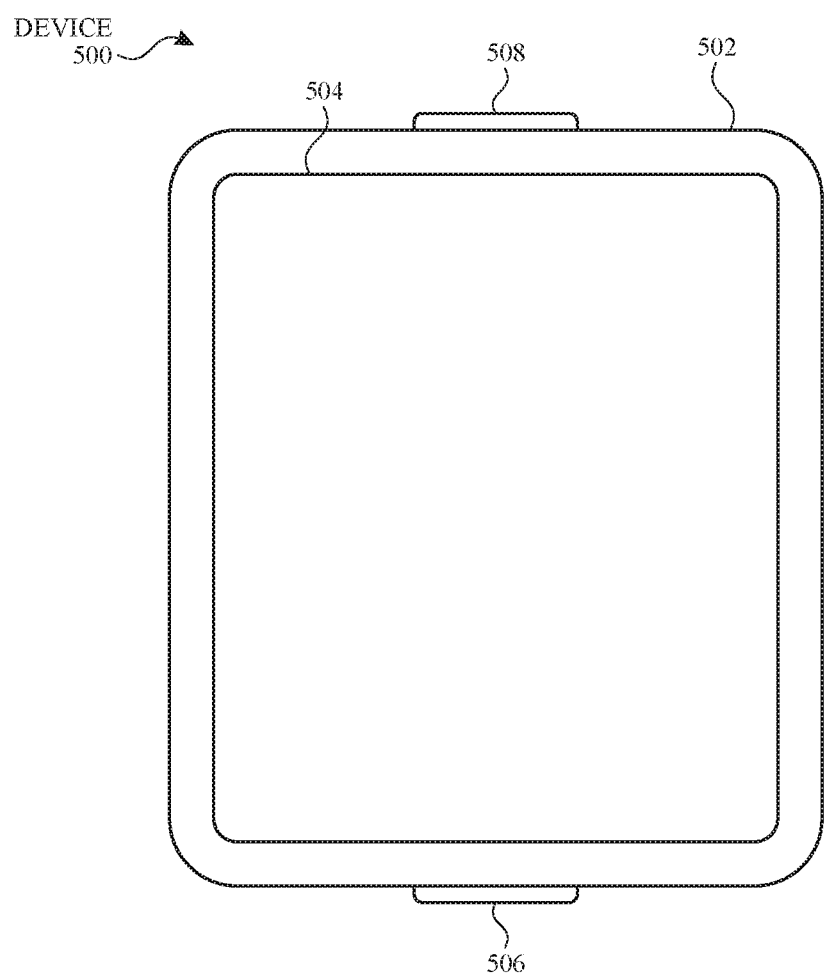
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
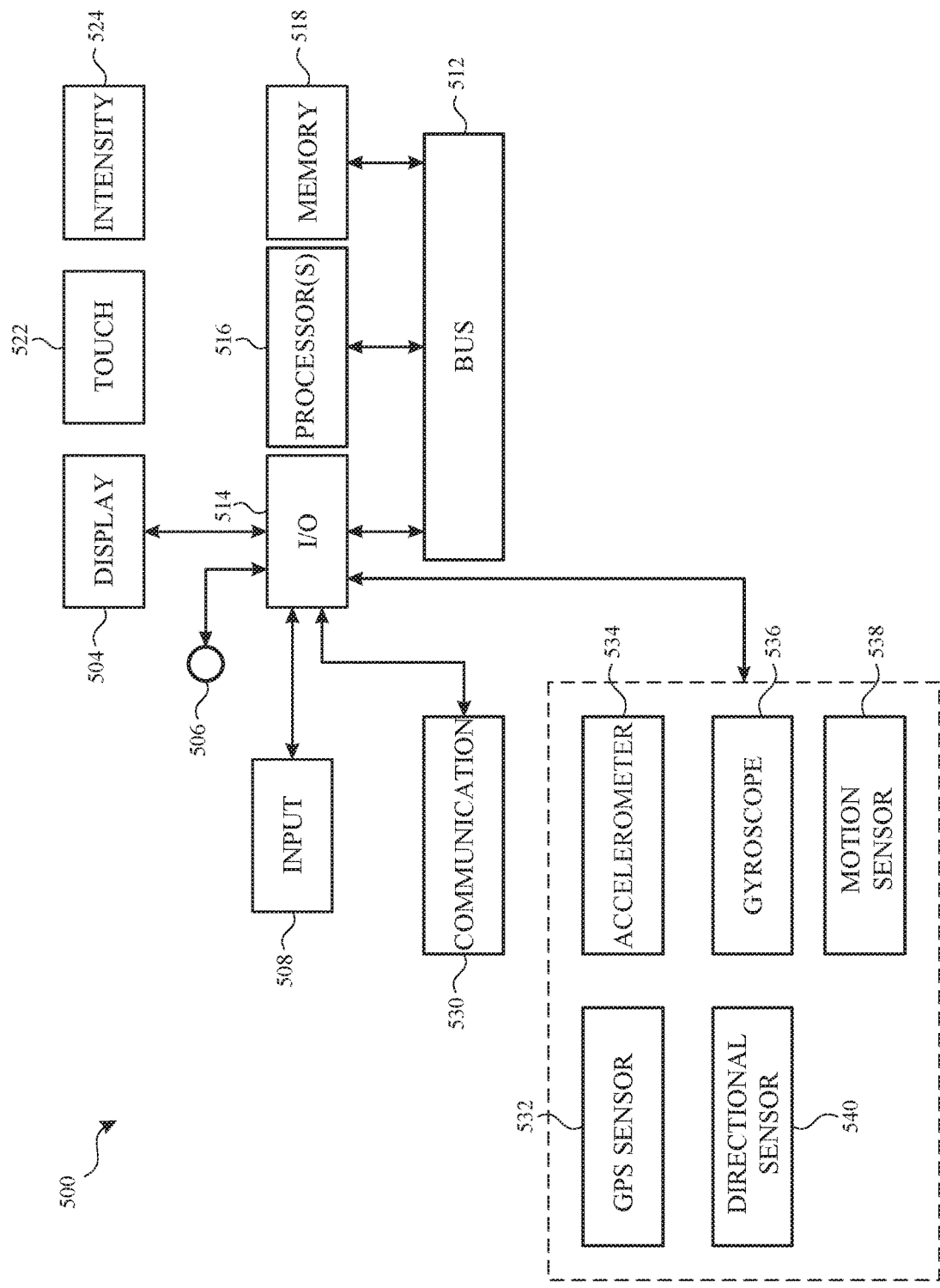
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Figure 7:
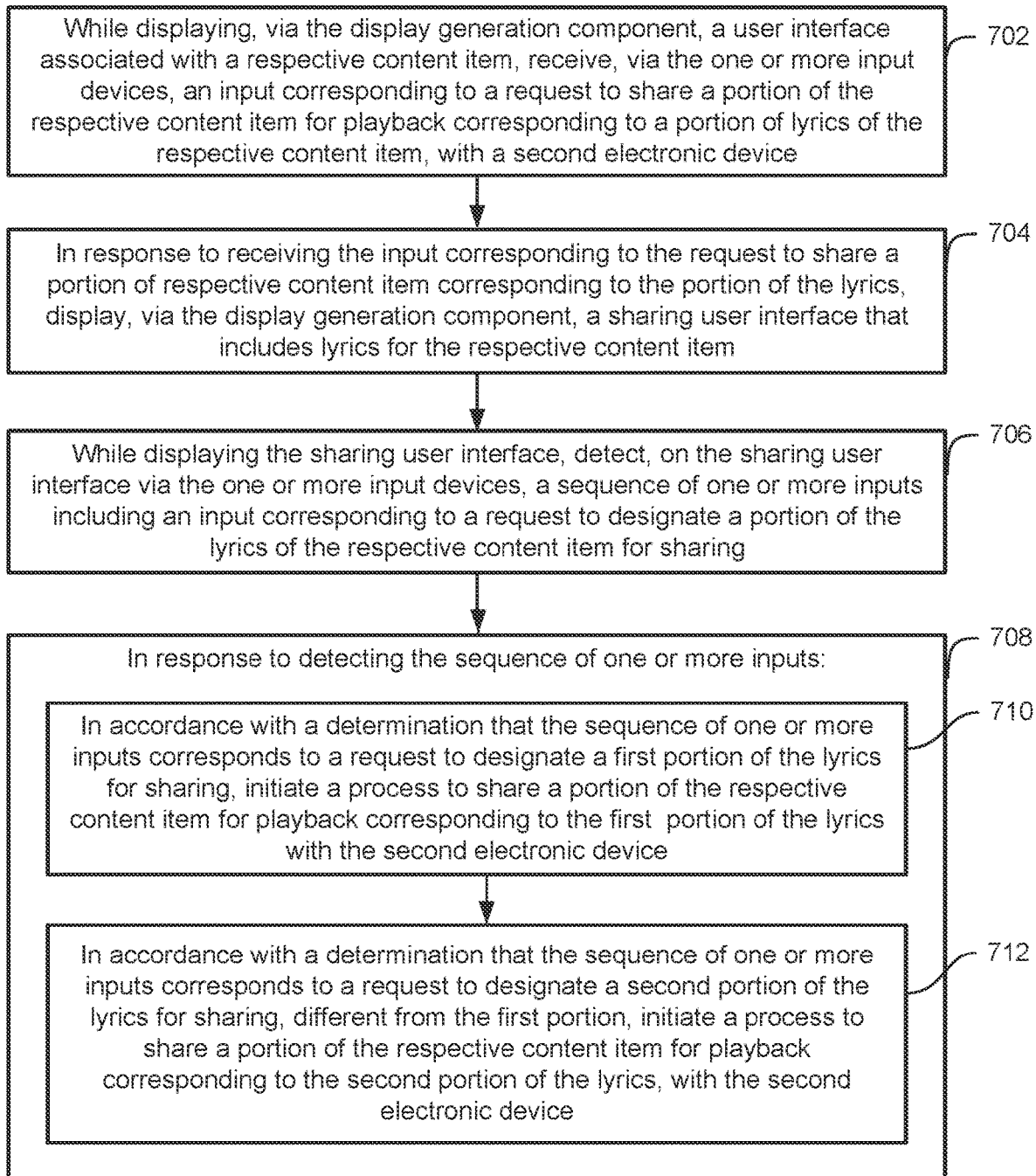
FIG. 7 is a flow diagram illustrating a method of sharing portions of content items corresponding to selected lyrics of the content items with another electronic device in accordance with some embodiments.
Figure 8A:
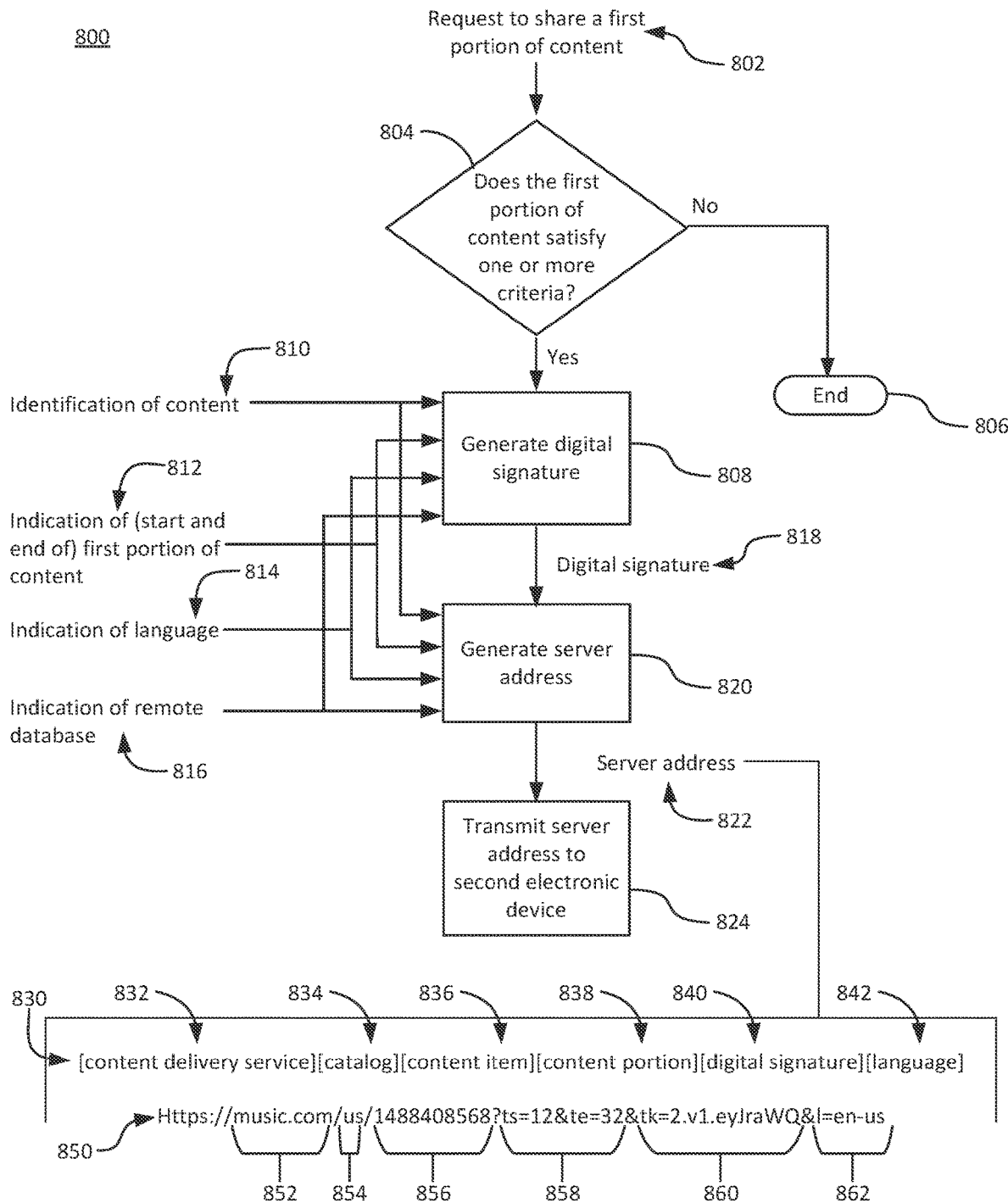
FIG. 8A illustrates an exemplary flow chart of a method of generating a server address for sharing a portion of content according to some embodiments.
Figure 9A:
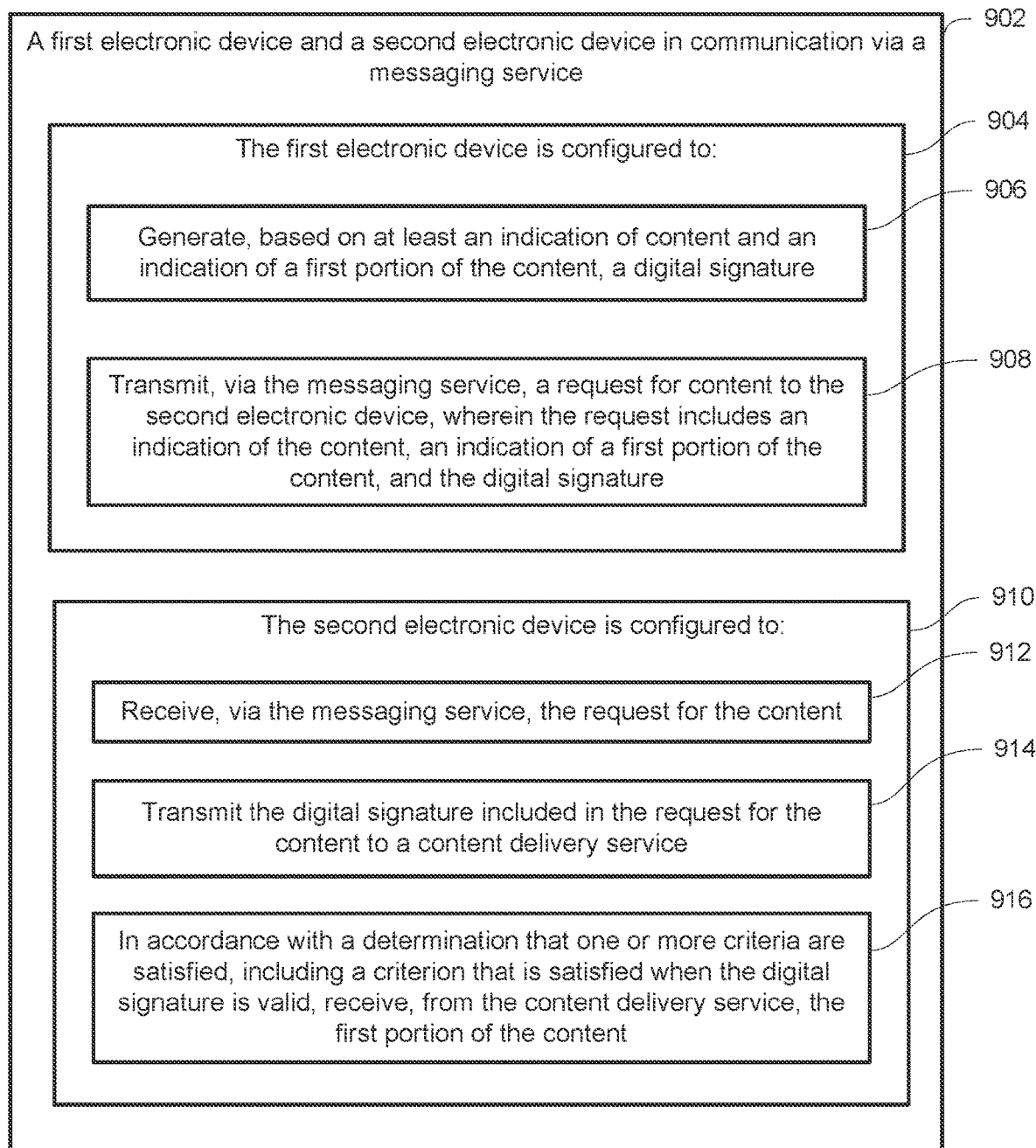
FIG. 9A is a block diagram illustrating a system that securely shares portions of content items in accordance with some embodiments of the disclosure.
Figure 9B:
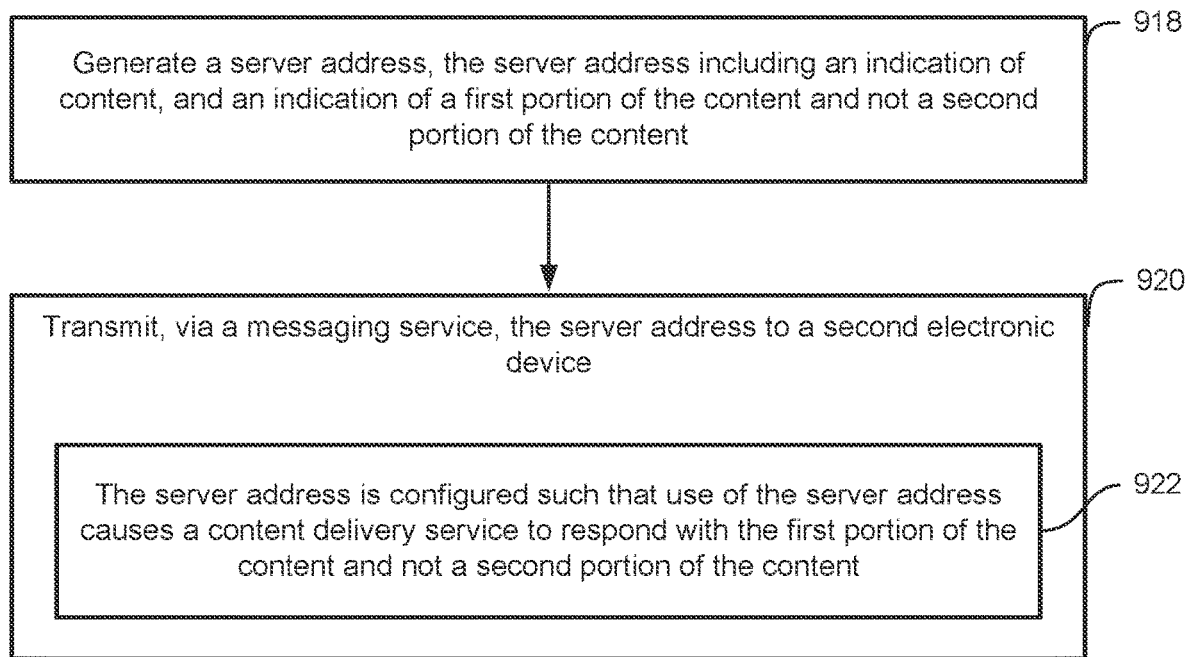
FIG. 9B is a flow diagram illustrating a method of securely sharing a portion of a content item in accordance with some embodiments of the disclosure.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, and 901 (FIGS. 7, 8A and 9B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
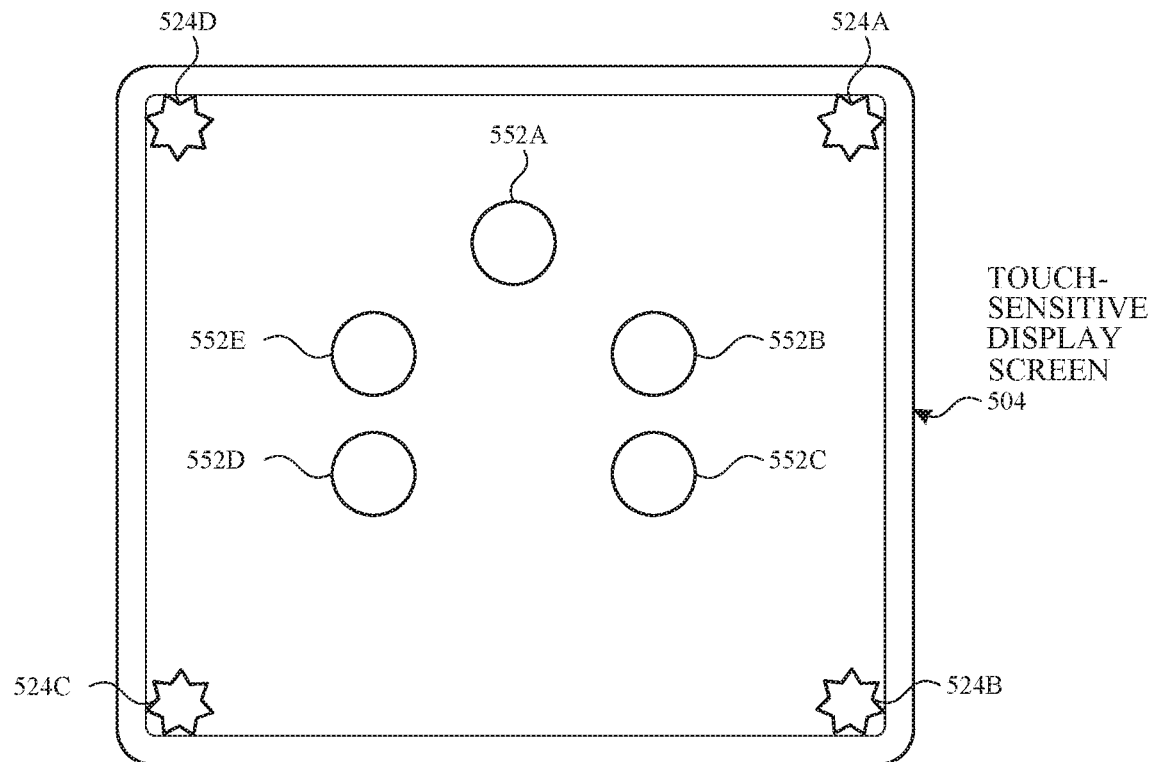
FIGS. 5C-5D illustrate exemplary components of a personal electronic device having a touch-sensitive display and intensity sensors in accordance with some embodiments.
Figure 5C:
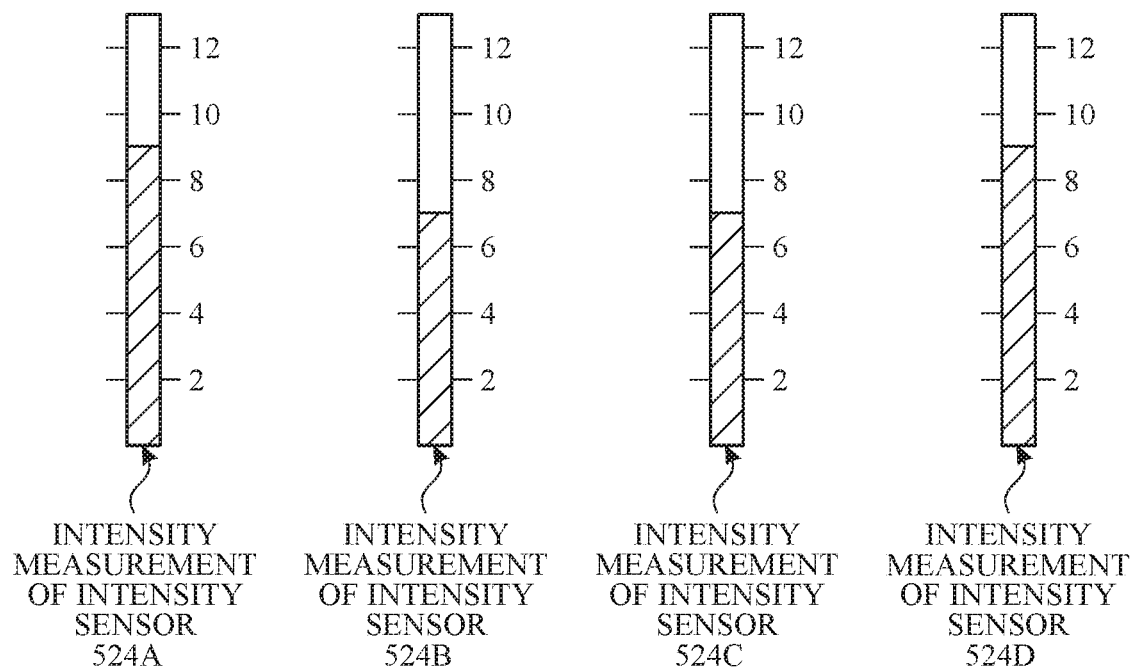
Figure 5D:
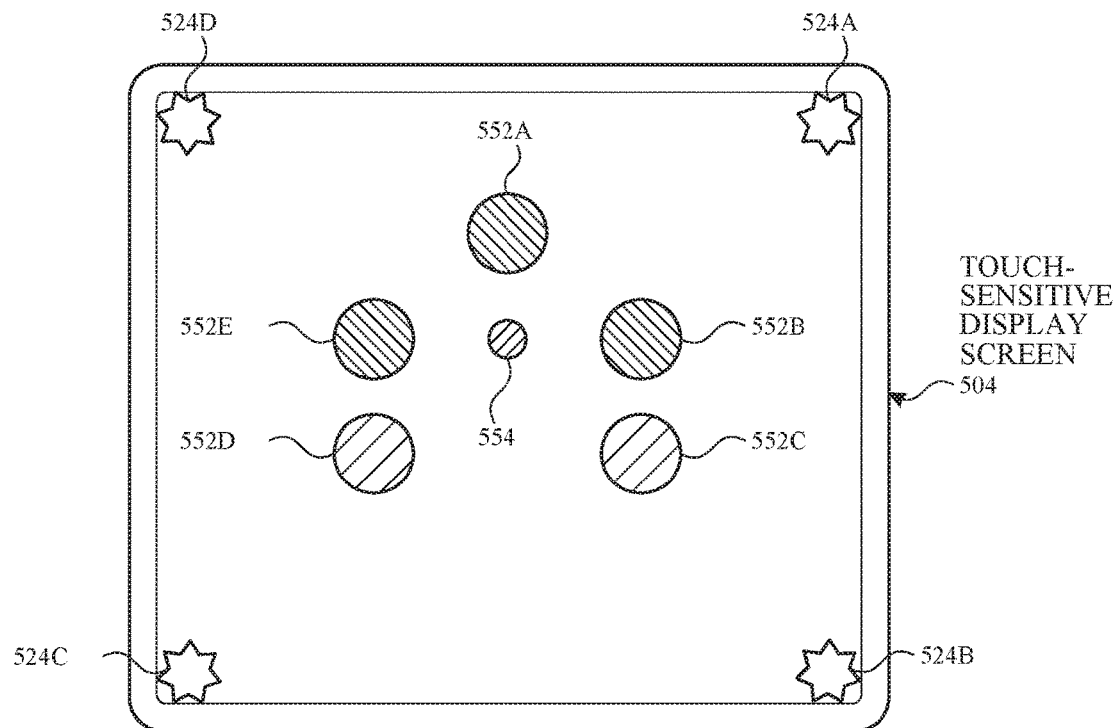
Figure 5D:
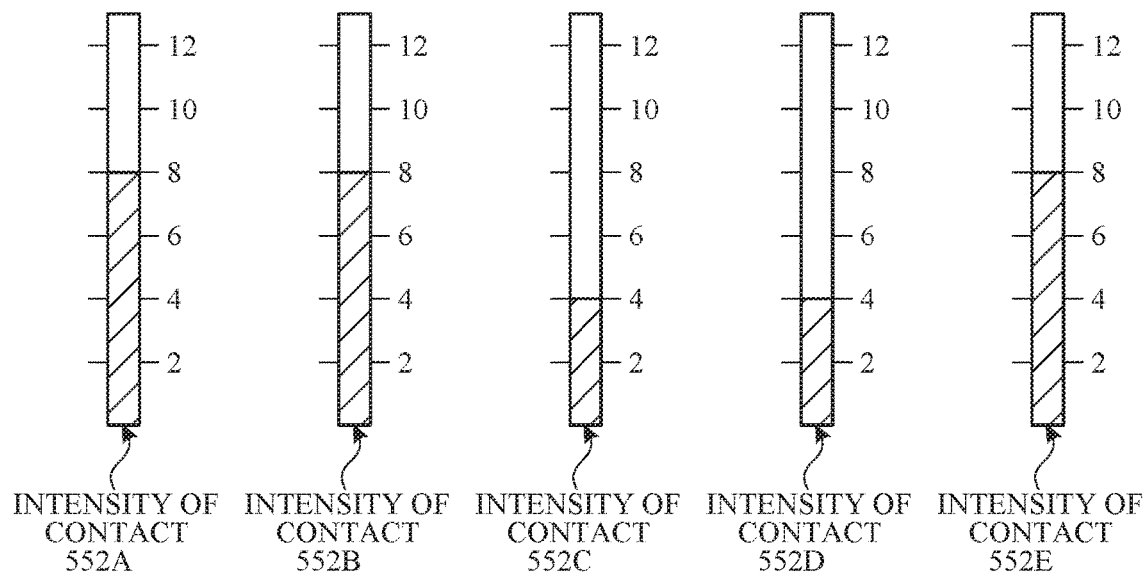

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
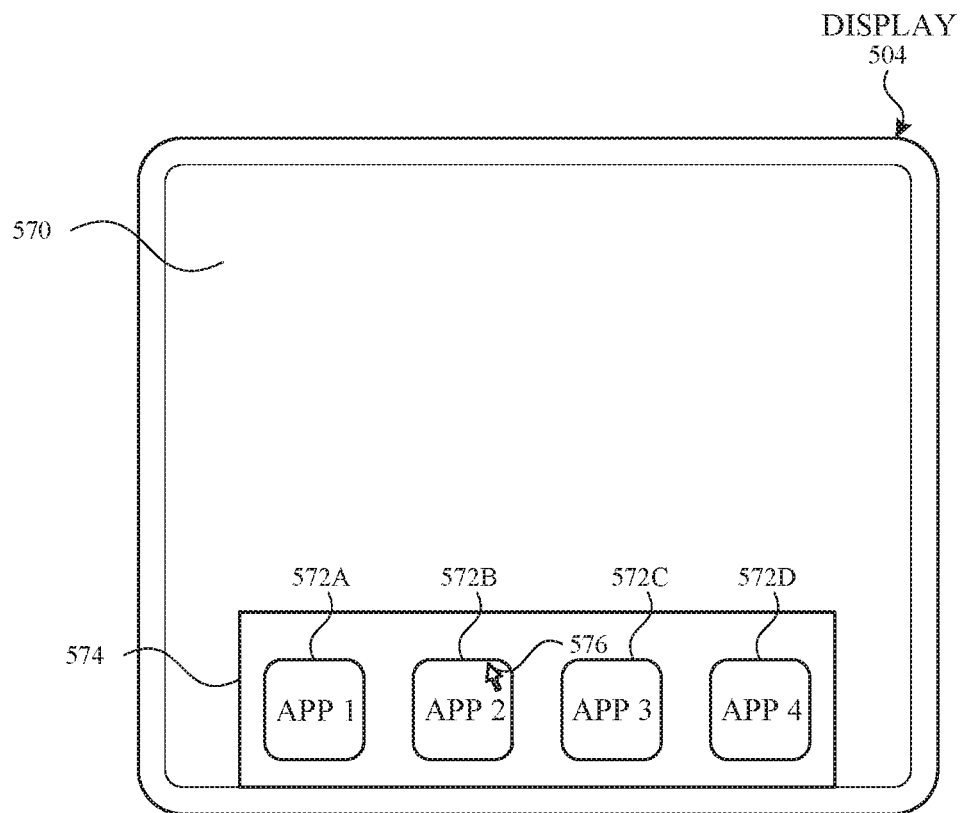
FIGS. 5E-5H illustrate exemplary components and user interfaces of a personal electronic device in accordance with some embodiments.
Figure 5E:
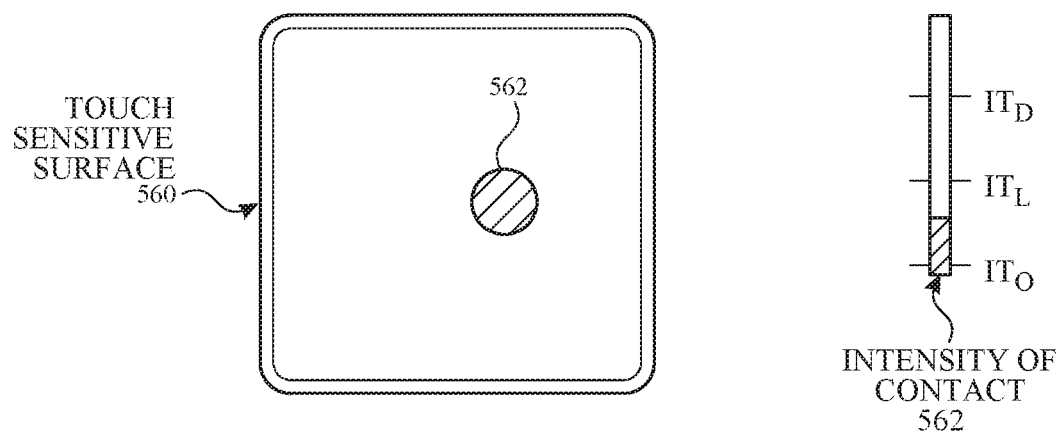
Figure 5F:
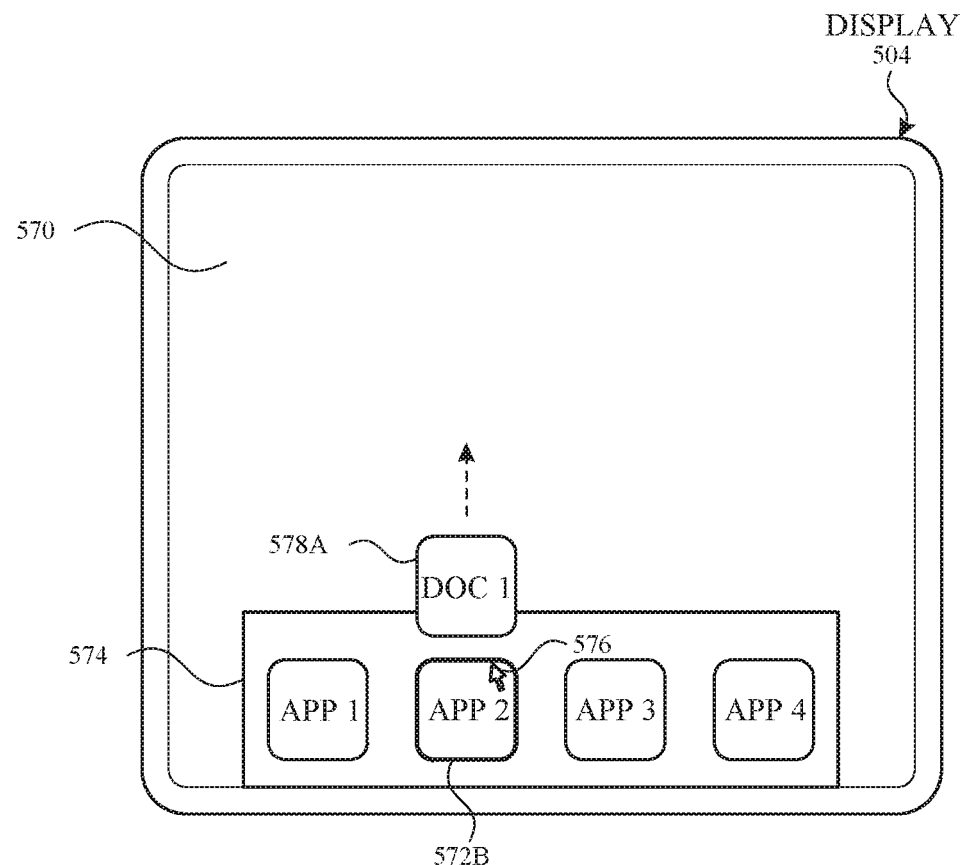
Figure 5F:
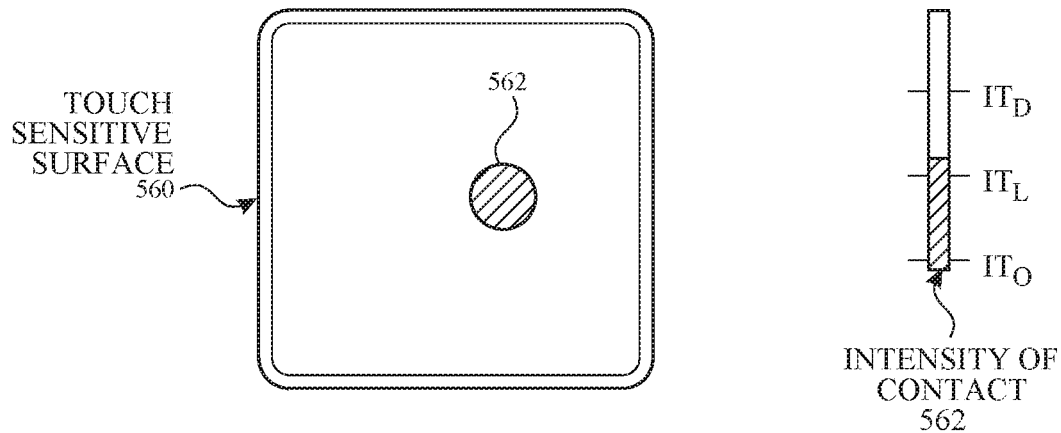
Figure 5G:
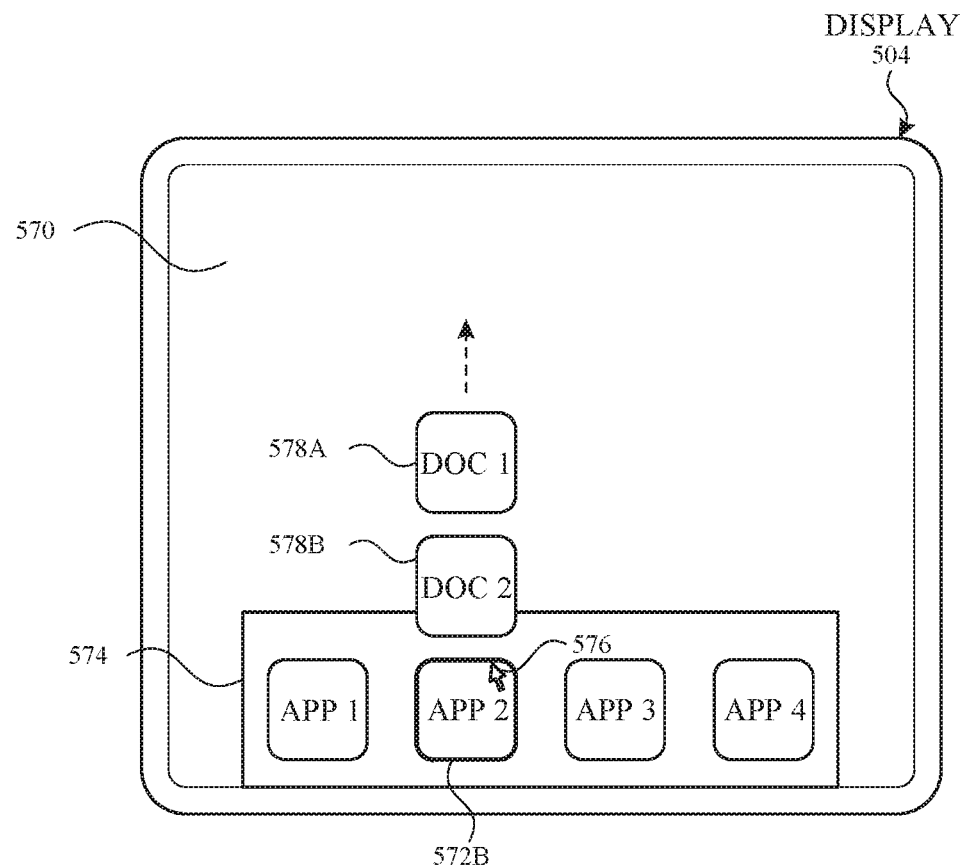
Figure 5G:
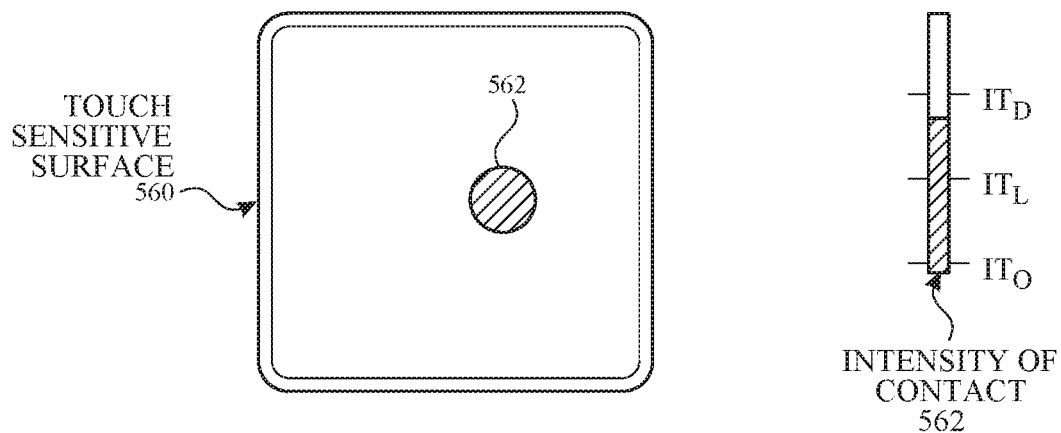
Figure 5H:
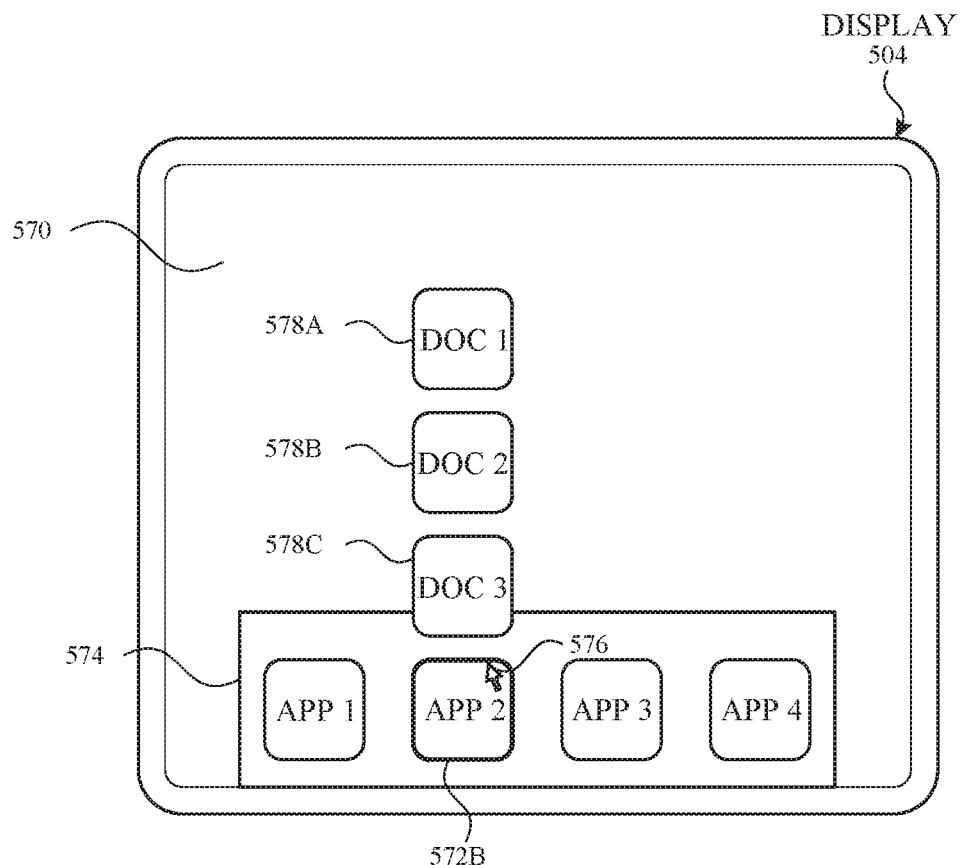
Figure 5H:
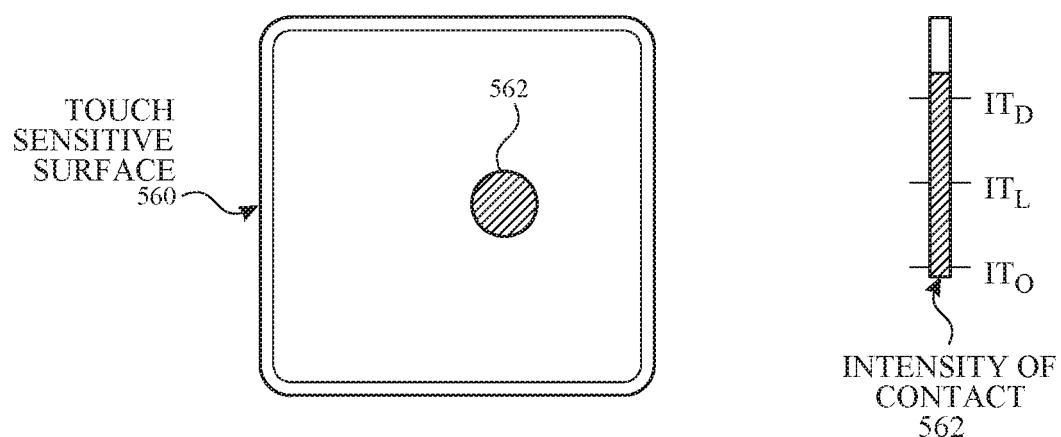

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "ITD") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITS"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

User Interfaces for Sharing Portions of Content Items

Users interact with electronic devices in many different manners, including using electronic devices to share items of content with other electronic devices. The embodiments described below provide ways in which an electronic device shares portion(s) of content items (e.g., music) corresponding to lyrics for the content items with other electronic devices. Providing efficient manners of sharing portion(s) of content items enhances interactions with a device, thus reducing the amount of time a user needs to share portion(s) of content items and reducing the power usage of the device, which increases battery life for battery-powered devices. It is understood that people use devices. When a person uses a device, that person is optionally referred to as a user of the device.

FIGS. 6A-6HH illustrate exemplary ways in which an electronic device 500a shares portions of content items corresponding to selected lyrics of the content items with another electronic device in accordance with some embodiments. The embodiments in these figures are used to illustrate the processes described below, including the processes described with reference to FIG. 7. Although FIGS. 6A-6HH illustrate various examples of ways an electronic device is able to perform the processes described below with reference to FIG. 7, it should be understood that these examples are not meant to be limiting, and the electronic device is able to perform one or more processes described below with reference to FIG. 7 in ways not expressly described with reference to FIGS. 6A-6HH.

FIGS. 6A-6HH illustrate various examples of sharing portions of content items (e.g., music content, other audio content) that correspond to lyrics of the content item. In some embodiments, an electronic device can similarly share portions of other content items corresponding to a portion of an audio transcript of the content items. For example, the electronic device 500 can share portions of video content that correspond to a selected portion of the audio transcript of the video content, share portions of non-music audio content (e.g., audiobooks, podcasts, other audio recordings) corresponding to a selected portion of the audio transcript of the video content. Thus, in some embodiments, one or more of the examples described below with respect to sharing portions of audio content corresponding to selected portions of the lyrics for the content item can apply more generally to sharing portions of other types of content items corresponding to selected portions of the audio transcript of the content items.

Figure 6B:
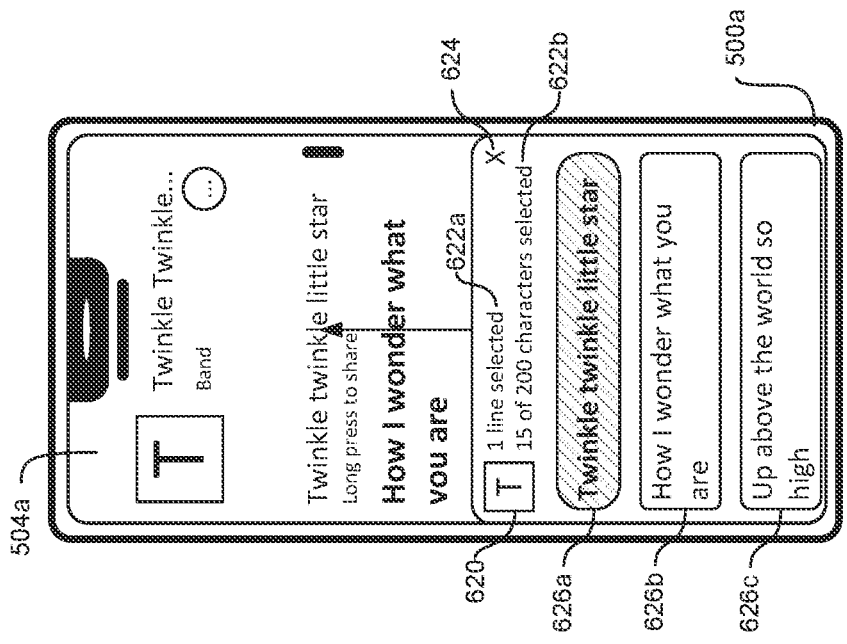
FIGS. 6A-6HH illustrate exemplary ways in which an electronic device shares portions of content items corresponding to selected lyrics of the content items with another electronic device in accordance with some embodiments.
Figure 6A:
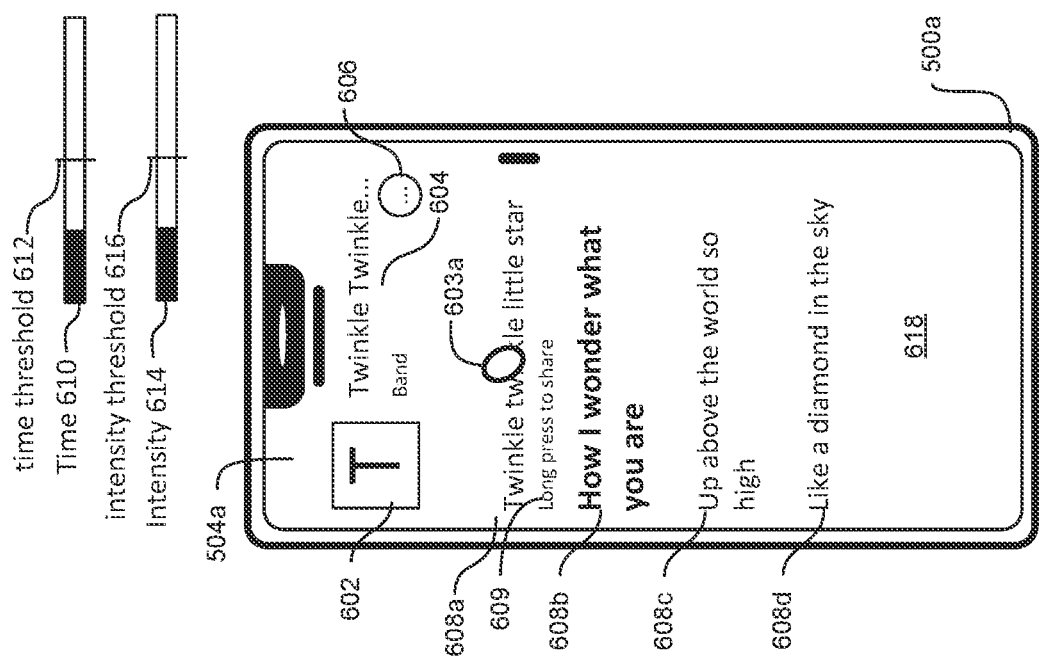

FIG. 6A illustrates device 500a displaying an exemplary content playback user interface via display generation component 504a (e.g., a touch screen). In some embodiments, the content playback user interface is a user interface of a content (e.g., browsing, playback, and/or streaming) application. In some embodiments, the electronic device 500a displays the content playback user interface while playing a respective content item with the content application. The content playback user interface can include artwork 602 associated with the respective content item, an indication 604 of the title and artist of the item of content that is currently playing, a menu option 606, and lyrics 608a-d of the respective content item. In some embodiments, the lyrics 608a-d are displayed on a background 618 that includes one or more of the colors included in the artwork 602 associated with the item of content.

In some embodiments, the electronic device 500a displays an indication 609 that the electronic device 500a is able to share a portion of the content item corresponding to a portion of lyrics in response to a "long press" detected on one of the portions of lyrics displayed by display generation component 504a. In some embodiments, a respective portion of lyrics can include a subset of a line of lyrics, a single line of lyrics, or multiple lines of lyrics of the content item. In some embodiments, the electronic device 500a displays a first portion of lyrics corresponding to a subset of a line of lyrics, a second portion of lyrics corresponding to one line of lyrics, and/or a third portion of lyrics corresponding to multiple lines of lyrics of the content item. In some embodiments, a "long press" is a contact (e.g., contact 603a) detected at a location at which a portion of lyrics 608a-d is displayed that is detected for a time 610 that exceeds a time threshold 612 (e.g., 0.1, 0.2, 0.3, 0.5, 1, 2, etc. seconds) and/or is detected with an intensity 614 that exceeds an intensity threshold 616. In some embodiments, the electronic device 500a displays the indication 609 proximate to a portion 608b of lyrics that correspond to the current playback position of the content item. In some embodiments, the electronic device displays the indication 609 proximate to each portion 608a-d of lyrics displayed by the electronic device 500a. In some embodiments, the electronic device 500a does not display the indication 609 unless and until an input is detected while displaying the user interface in FIG. 6A and then ceases display of the indication 609 once a predetermined time threshold (e.g., 1, 2, 3, 5, 10, etc. seconds) passes without further input being detected.

In FIG. 6A, the electronic device 500a optionally detects selection (e.g., with contact 603a) of portion 608a of lyrics. In some embodiments, once the selection is detected for a time 610 that exceeds a time threshold 612 (e.g., 0.1, 0.2, 0.3, 0.5, 1, 2, etc. seconds) and/or with an intensity 614 that exceeds an intensity threshold 616, the electronic device 500a displays the sharing user interface element illustrated in FIG. 6C. In some embodiments, prior to displaying the user interface in FIG. 6C, the electronic device 500a displays an animation of a sharing user interface element sliding onto the display generation component 504a, as shown in FIG. 6B. In some embodiments, instead of displaying the sharing user interface element illustrated in FIG. 6C in response to the user input illustrated in FIG. 6A, the electronic device 500a optionally pauses playback of the content item on the electronic device and enables the user to navigate the lyrics 608 and select one or more portions of the lyrics 608 for sharing while continuing to display the user interface illustrated in FIG. 6A. In some embodiments, the electronic device 500a updates the user interface illustrated in FIG. 6A to include one or more options to share the selected portions of lyrics.

Figure 6D:
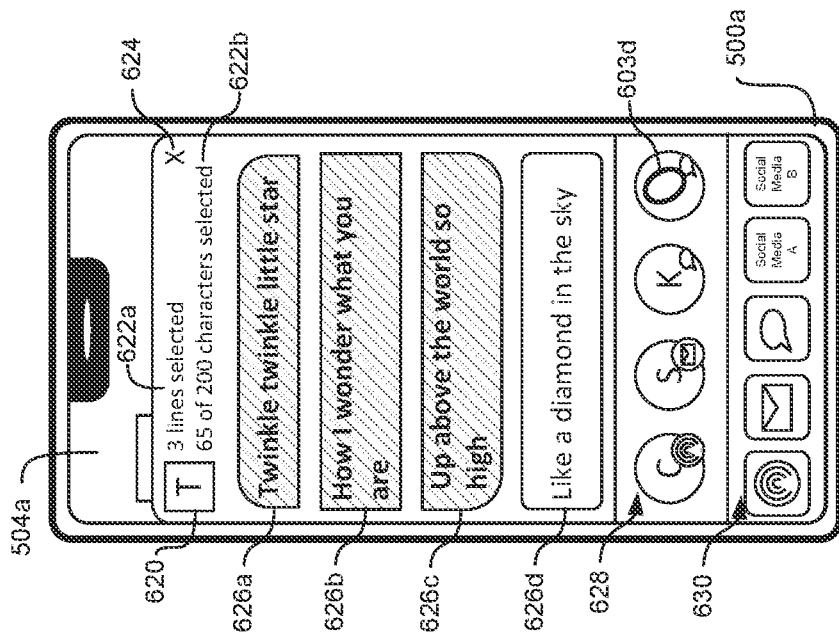
Figure 6C:
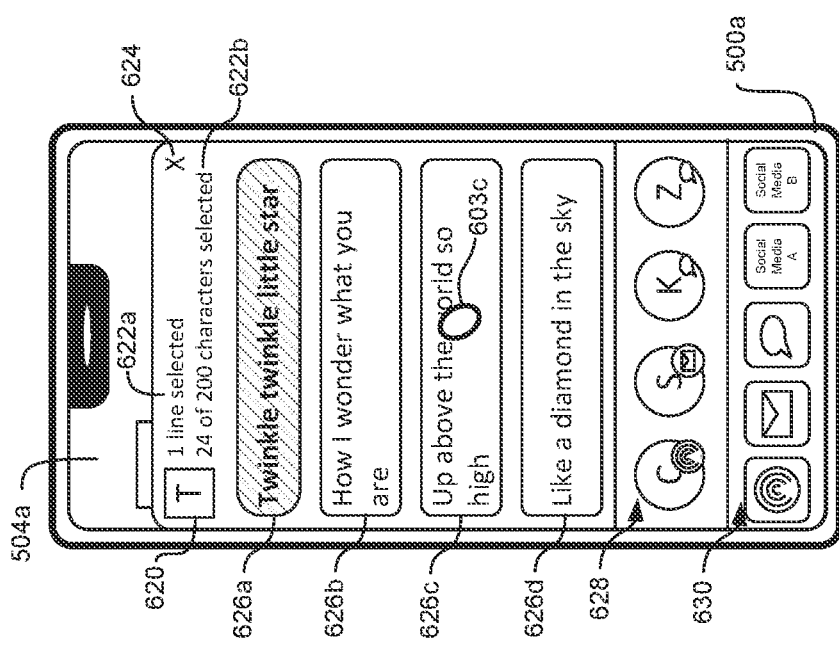

In FIG. 6C, the electronic device 500a displays the sharing user interface element overlaid on the user interface described above with reference to FIG. 6A in response to the input described above with reference to FIG. 6A. As shown in FIG. 6C, the sharing user interface element includes representations 626a-d of the lyrics of the content item, the artwork 620 associated with the content item, an indication 622a of the number of portions of lyrics selected by the user, an indication 622b of the number of characters in the selected lyrics and a limit of the number of characters that can be selected, selectable options 628 that, when selected, cause the electronic device to initiate a process to share a portion of the content item corresponding to the selected lyrics with another respective user via a respective sharing protocol, selectable options 630 that, when selected, cause the electronic device 500a to initiate a process to share the portion of the content item corresponding to the selected lyrics via a respective sharing protocol, and an option 624 to cease display of the sharing user interface element (e.g., without sharing lyrics and/or content with another device).

In some embodiments, the sharing user interface element may include indications of all of the lyrics of the content item. The display screen may not be large enough to show indications of all of the lyrics simultaneously on the screen. In some implementations, the indications may be accessible by navigating (e.g., scrolling) the lyrics in the sharing user interface element. Other ways of moving through the lyrics of the content item can be used. In some embodiments, each portion 626 of lyrics in the sharing user interface element can be displayed within a container that can have a boundary that distinguishes it from the background of the sharing user interface element and a background color, described in more detail below, that can contrast with the color of the text of the portion of lyrics.

In some embodiments, the sharing user interface element displays portion 626a of lyrics that were selected when the input to initiate the sharing process was received in FIG. 6A.

The portion 626*a* of lyrics may be displayed with an indication, e.g., highlight, shading, or other visual distinction, to show that the lyrics were selected. This portion may also display at the top of the sharing user interface element, e.g., the selected lyric is the first lyric displayed on the sharing user interface. Other lyrics that follow the selected lyric may then be displayed in the sharing user interface element without being selected. If the selected lyric is towards the end of a content item, the selected lyric may not be shown at the top of the sharing user interface element to show previous lyrics that may also be selected for sharing. If the user had selected a different portion of lyrics in FIG. 6A, a different portion of lyrics would be initially shown as selected in the sharing user interface element in FIG. 6C. As shown in FIG. 6C, the selected portion 626*a* of the lyrics is displayed with a different background color than the background color of the other portions 626*b-d* of lyrics. In some embodiments, the background color of the selected portion 626*a* of the lyrics includes one or more colors of the artwork 620 associated with the content item. Moreover, in some embodiments, the container of the selected lyrics 626*a* has rounded corners with larger radii than the radii of the corners of the containers of the portions 626*b-d* of lyrics that are not selected.

In some embodiments, options 628 each include a representation of another user and a representation of a sharing protocol and, in response to detecting selection of one of the options 628, the electronic device 500*a* initiates a process to share a portion of the content item corresponding to the selected lyrics via the sharing protocol indicated in the selected option 628 with the user indicated in the selected option 628. In some embodiments, the electronic device 500*a* determines which options 628 to display based on the communication history of the electronic device 500*a*. For example, options 628 include the most recently and/or most frequently used sharing protocols and recipients.

In some embodiments, options 630 each include a representation of a respective sharing protocol. In some embodiments, in response to detecting selection of one of the options 630, the electronic device 500*a* initiates a process to share the portion of the content item corresponding to the selected lyrics via the sharing protocol corresponding to the selected option 630. In some embodiments, once the electronic device 500*a* initiates the process to share the portion of the content item via the selected sharing protocol, the user is able to designate one or more recipients to receive the shared portion of the content.

As shown in FIG. 6C, in some embodiments, the electronic device 500*a* detects selection (e.g., with contact 603*c*) of one of the portions of lyrics, e.g., portion 626*c*, not currently selected in the sharing user interface element. In some embodiments, in response to the input illustrated in FIG. 6C, the electronic device 500*a* adds the selected portion 626*c* of lyrics and portion 626*b* of lyrics between portions 626*a* and 626*c* to the selection, as shown in FIG. 6D. In some embodiments, the electronic device 500*a* is configured to share consecutive portions of lyrics, so it is not possible to share portions 626*a* and 626*c* without sharing portion 626*b* also, though in some embodiments, the electronic device 500*a* is able to share portions of a content item corresponding to non-consecutive portions of lyrics (e.g., sharing portions 626*a* and 626*c* without sharing portion 626*b*).

FIG. 6D illustrates the sharing user interface element updated to indicate that portions 626*a-c* of the lyrics are designated for sharing in response to the input illustrated in FIG. 6C, for example. As shown in FIG. 6D, in some embodiments, the electronic device 500*a* displays the portions of lyrics designated for sharing with a background color different from the background color of the portion 626*d* of lyrics not designated for sharing. As described above, in some embodiments, the background of the portions 626*a-c* of lyrics designated for sharing includes the same colors as the colors of the artwork 620 associated with the content item. In some embodiments, the electronic device 500*a* displays the selected portions of lyrics such that the top corners of the first portion 626*a* of lyrics in the selection and the bottom corners of the last portion 626*c* of lyrics in the selection have larger corner radii than the corners of the other portions 626*b* of lyrics in the sharing user interface element. In some embodiments, the portion 626*b* of lyrics in the middle of the portion designated for sharing is displayed in a container with corners with smaller radii than the radii of the corners of the container of the portion 626*d* of lyrics not included in the portion of lyrics designated for sharing. In some embodiments, the bottom corners of the container of the first portion 626*a* of lyrics in the portion designated for sharing and the top corners of the container of the last portion 626*c* of lyrics in the portion designated for sharing also have radii that are less than the radii of the corners of the container of the portion 626*d* of lyrics not included in the portion of lyrics designated for sharing. In some embodiments, the above-described manner of displaying the selected portion of lyrics with rounded corners at the top and bottom of the selection visually distinguishes the selected portion of lyrics from the portions of lyrics not selected for sharing.

Figure 6H:
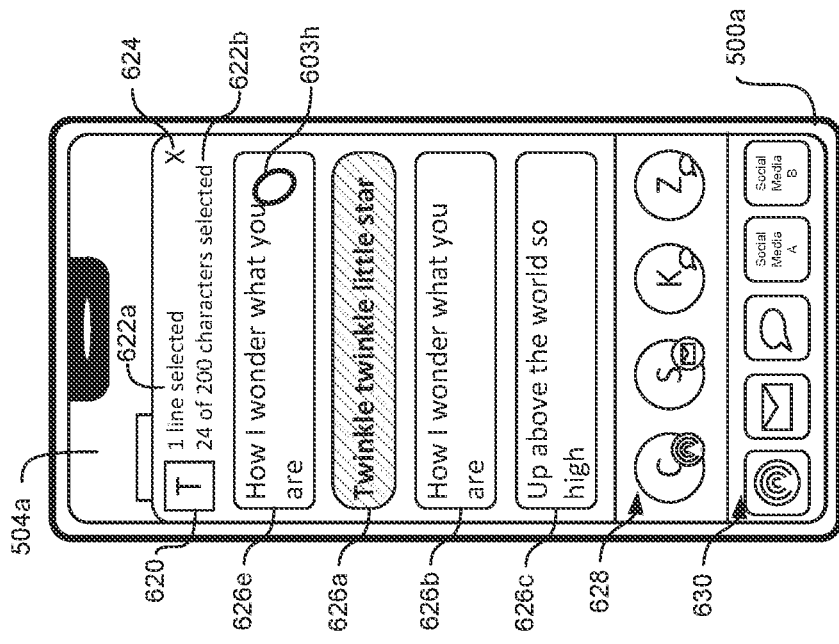
Figure 6G:
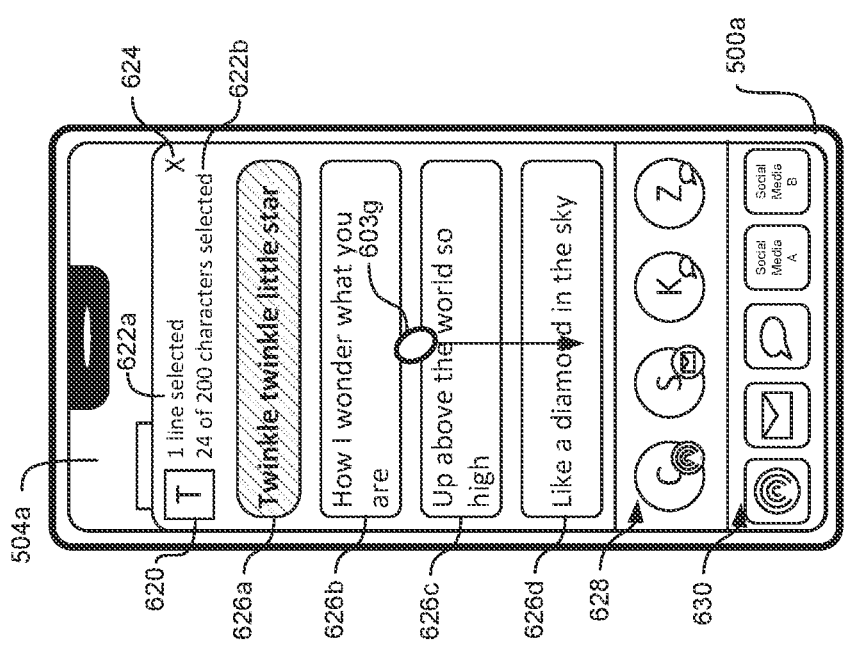
Figure 6J:
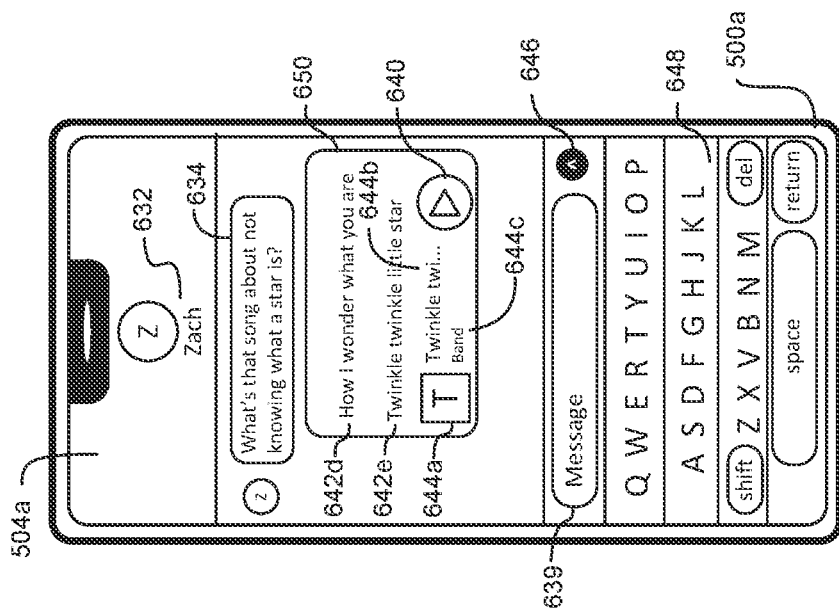
Figure 6I:
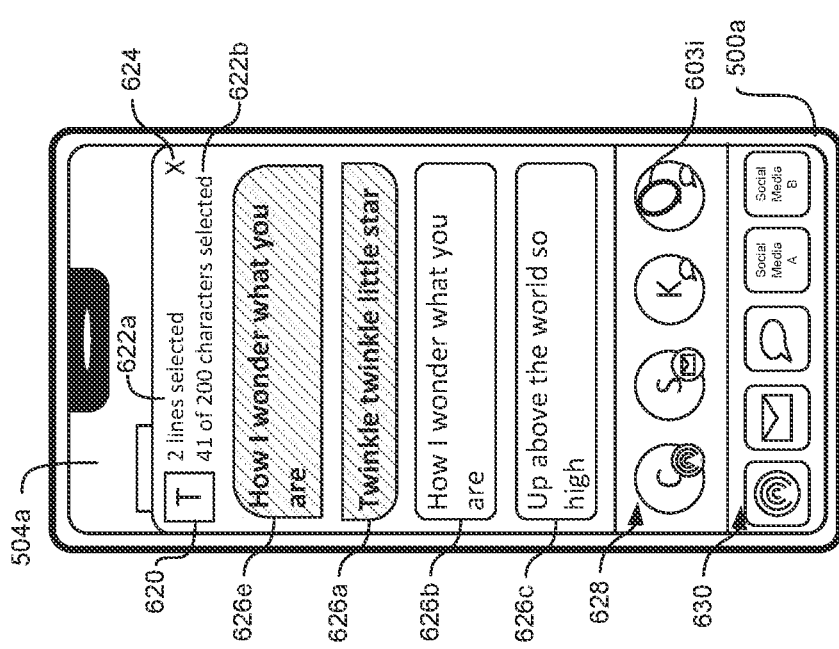
Figure 6L:
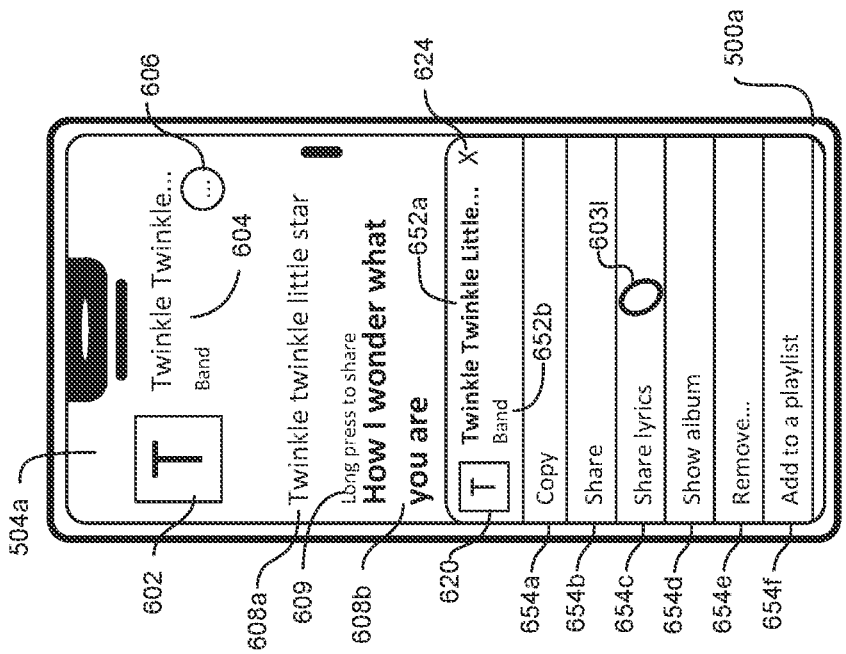
Figure 6K:
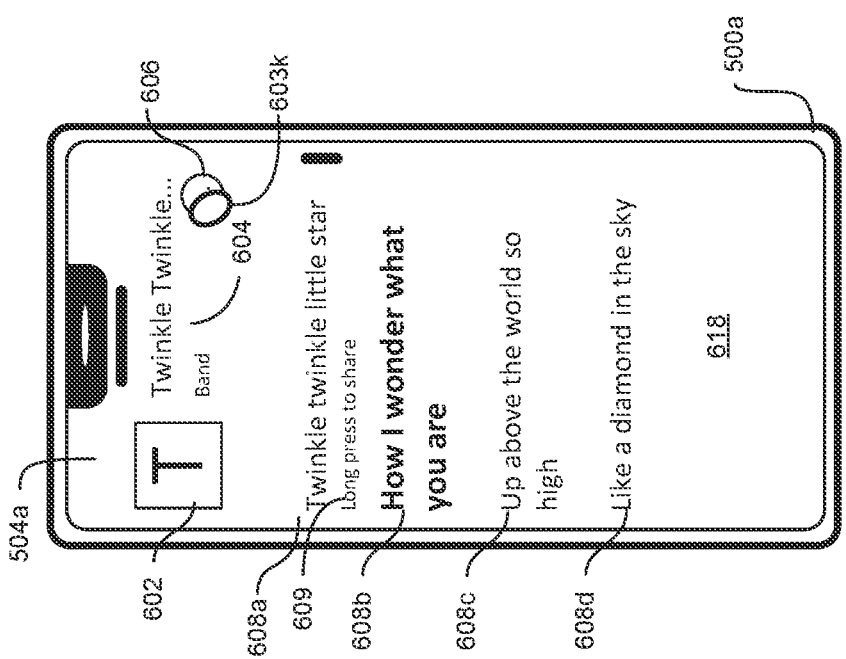
Figure 6N:
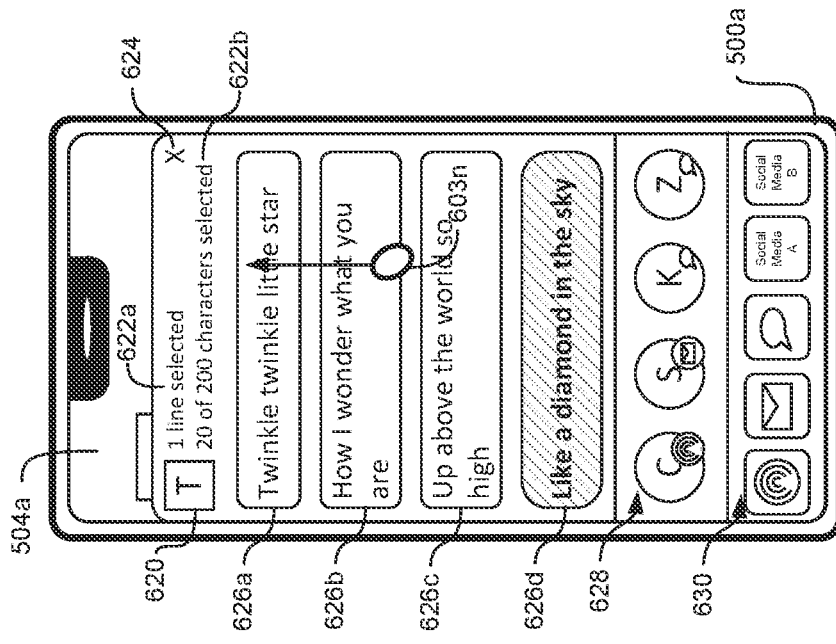
Figure 6M:
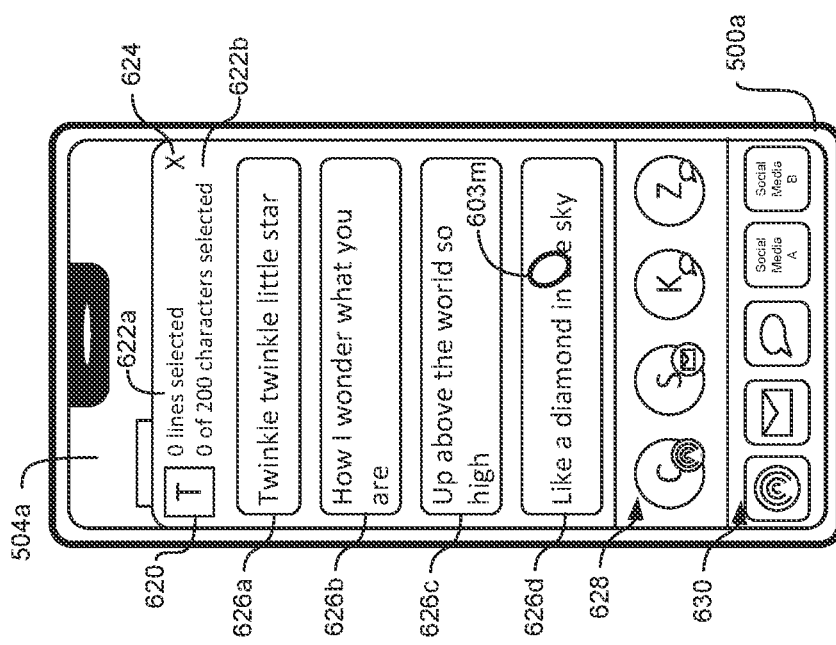
Figure 6P:
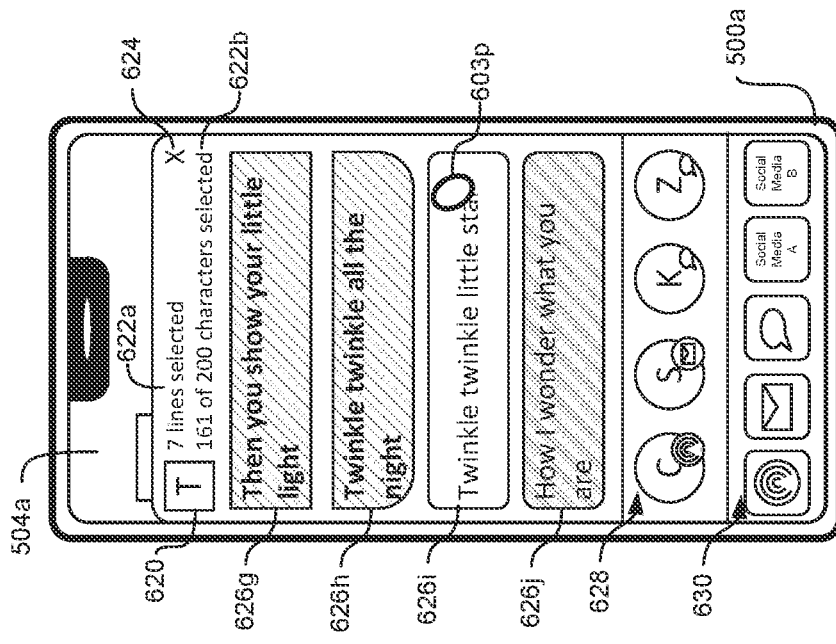
Figure 6O:
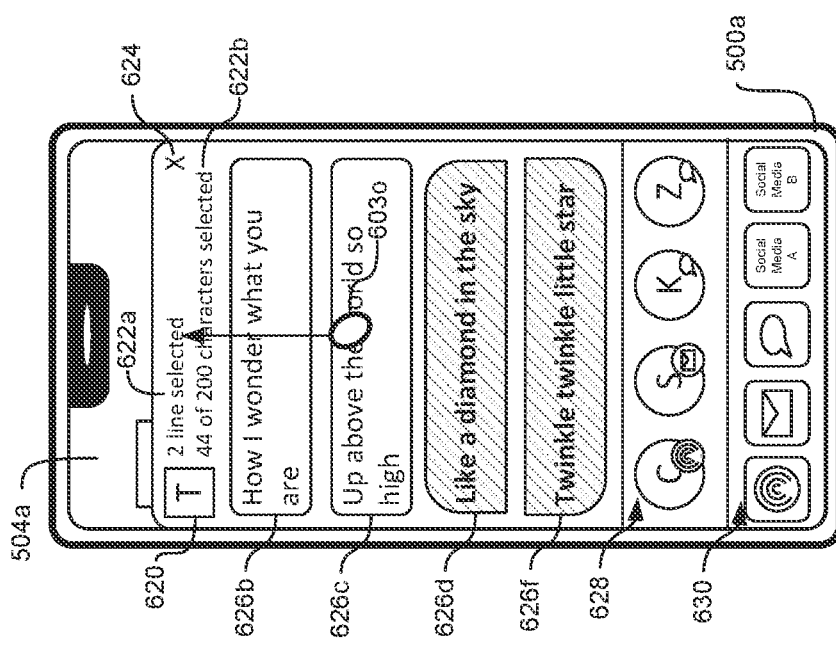
Figure 6R:
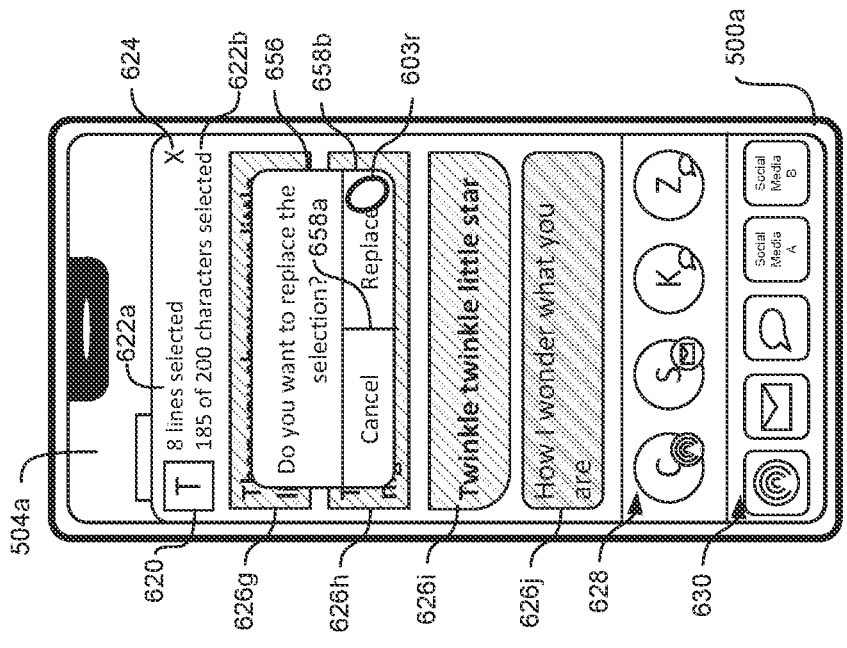
Figure 6Q:
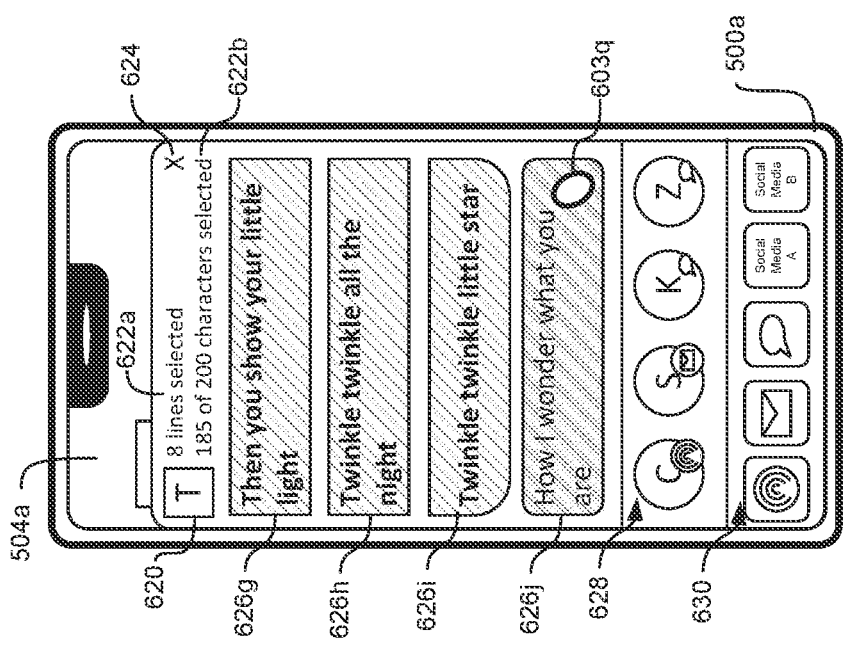
Figure 6T:
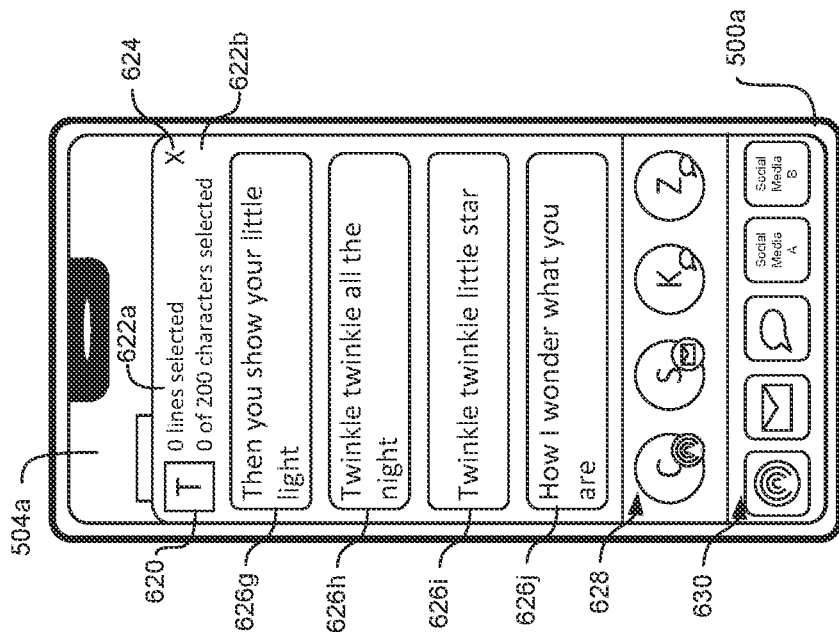
Figure 6S:
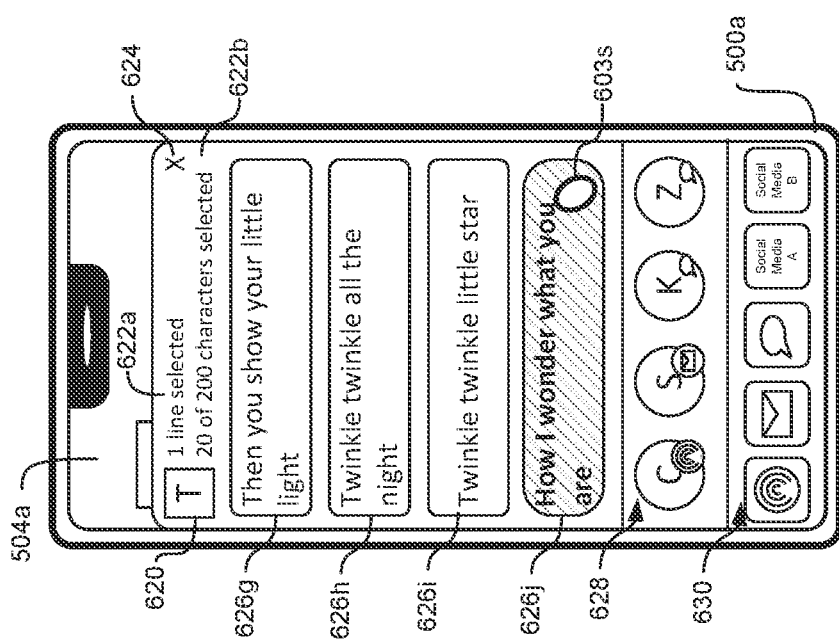
Figure 6V:
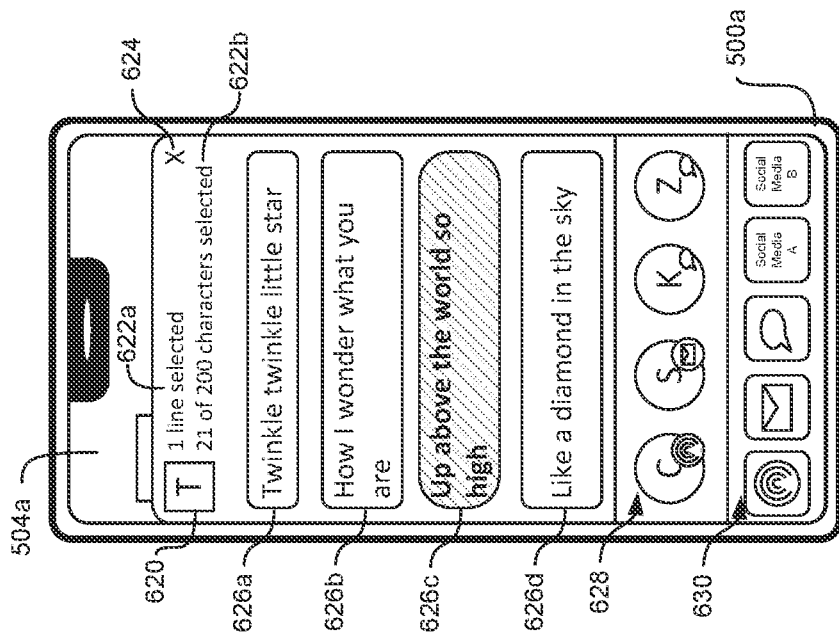
Figure 6U:
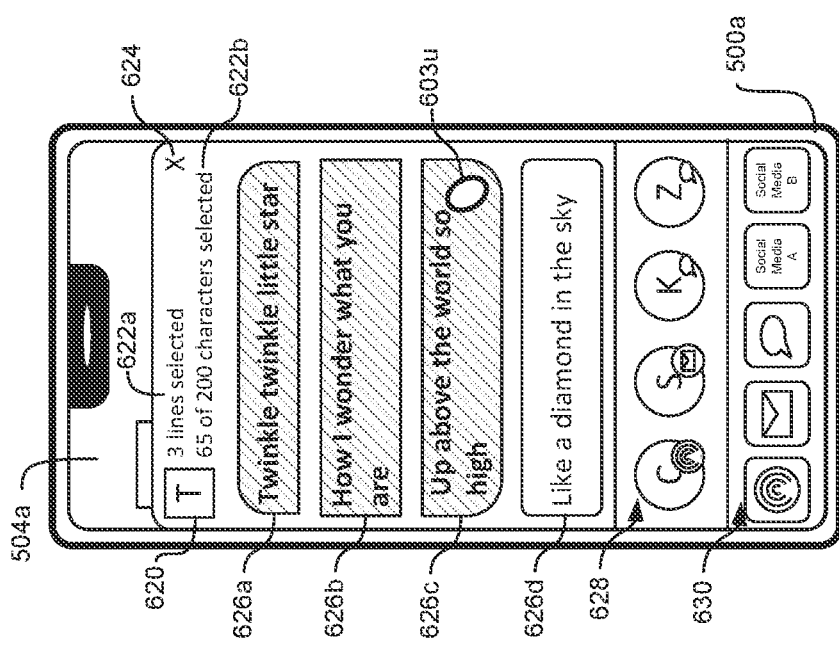
Figure 6X:
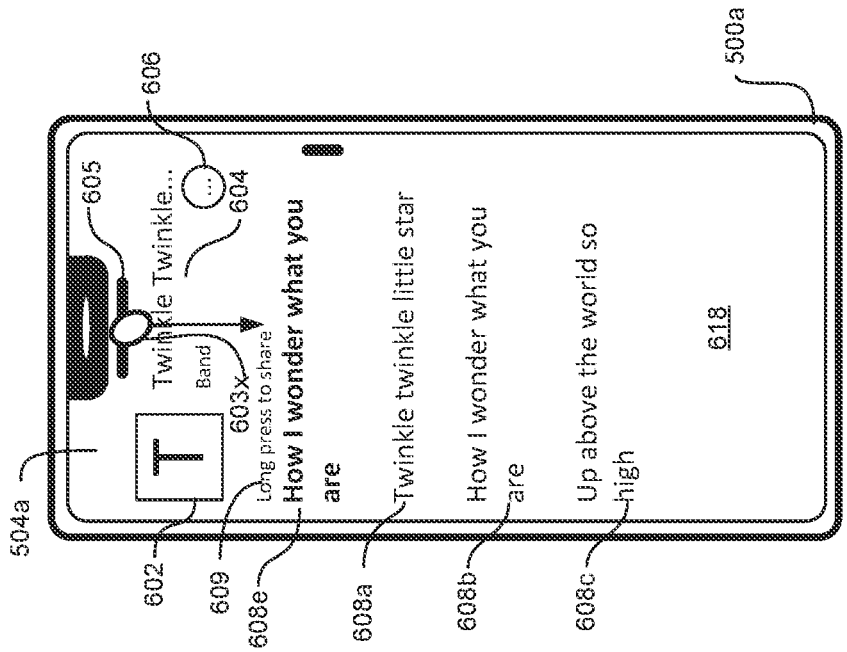
Figure 6W:
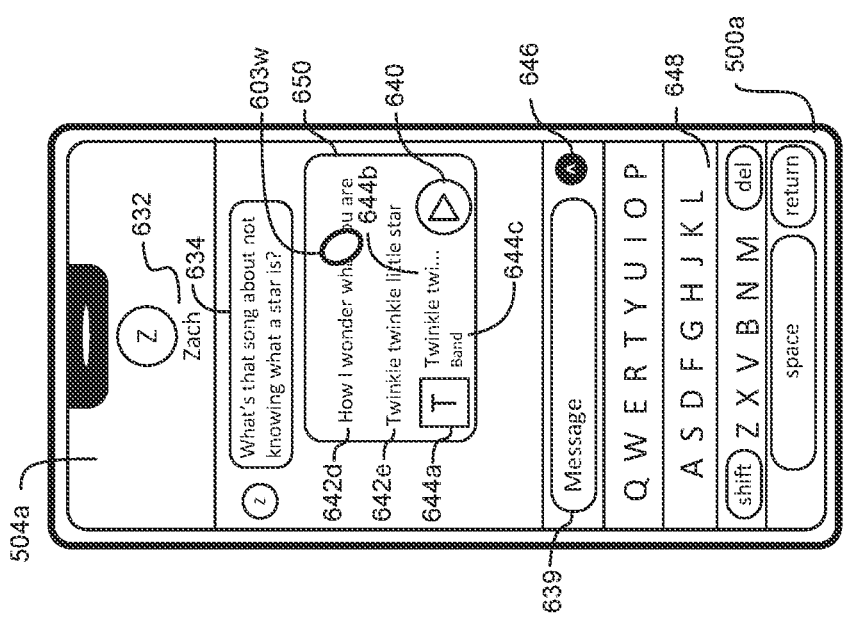
Figure 6D:
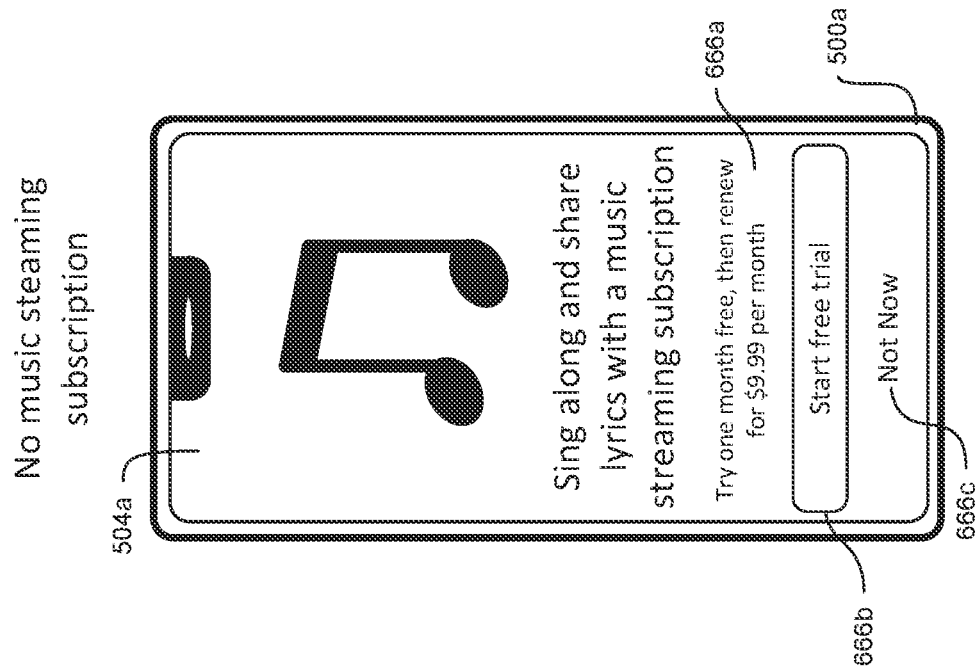
Figure 6C:
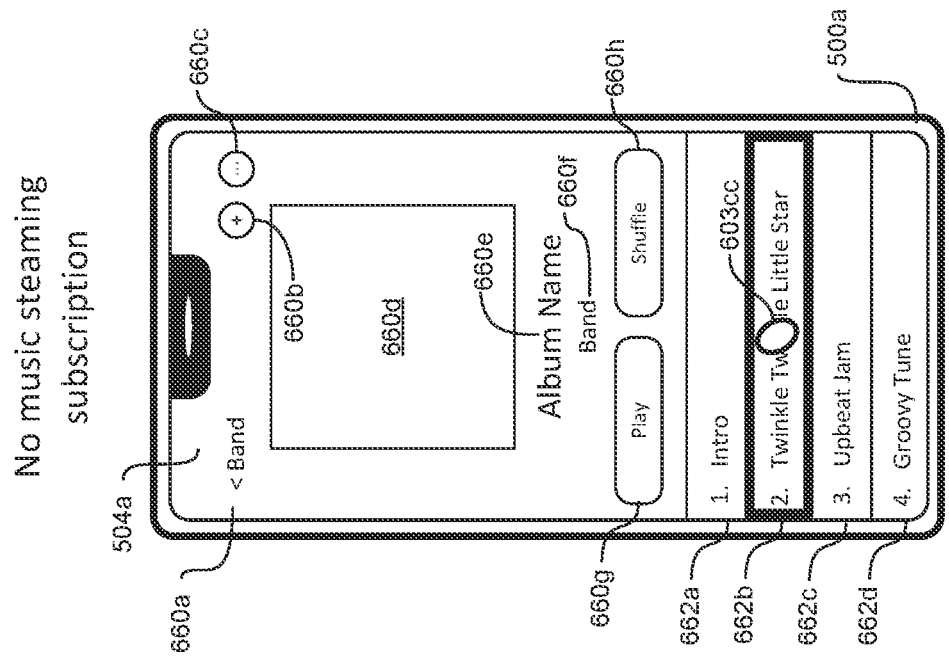

As shown in FIG. 6D, while portions 626*a*-626*c* of the lyrics are selected, the electronic device 500*a* optionally detects selection (e.g., with contact 603*d*) of one of the options 628 to share the portion of the content item corresponding to the portion of lyrics designated for sharing (e.g., portions 626*a-c* of the lyrics) with a respective other user via a respective sharing protocol. For example, the option 628 selected by the user in FIG. 6D is an option to share the portion of the content item using a messaging service of a messaging application. In response to the user's selection, the electronic device 500*a* displays the messaging user interface illustrated in FIG. 6E in some embodiments. In some embodiments, the user interface illustrated in FIG. 6E is associated with the respective sharing protocol indicated in the selected option 628. It should be understood that, in some embodiments, if the user had selected an option 628 or 630 associated with a different sharing protocol, the electronic device 500*a* would instead display a different user interface associated with the sharing protocol associated with the selected option 628 or 630.

FIG. 6E illustrates an exemplary messaging user interface optionally displayed in response to the user's selection in FIG. 6D. In some embodiments, the messaging user interface includes an indication 632 of the user with whom the portion of the content item corresponding to the selected portions of lyrics will be shared, a previous message 634 in the messaging conversation, a message entry field 639 with a preview 638 of the message to be sent when sharing the portion of the content item, an option 646 to send the message, and a soft keyboard 648. In some embodiments, the preview 638 of the message to be sent when sharing the portion of the content item includes the portions 642*a-c* of lyrics designated for sharing, the artwork 644*a* associated with the content item, an indication 644*b* of the title of the content item, an indication 644*c* of the artist of the content item, an option 640 to initiate playback of the portion of the content item in the messaging user interface, and an option 636 to remove the message 638 from the message entry field 639. As shown in FIG. 6E, the electronic device 500a optionally detects selection (e.g., via contact 603e) of the option 646 to send the message 638 to the other user via the messaging service, as shown in FIG. 6F.

Figure 6F:
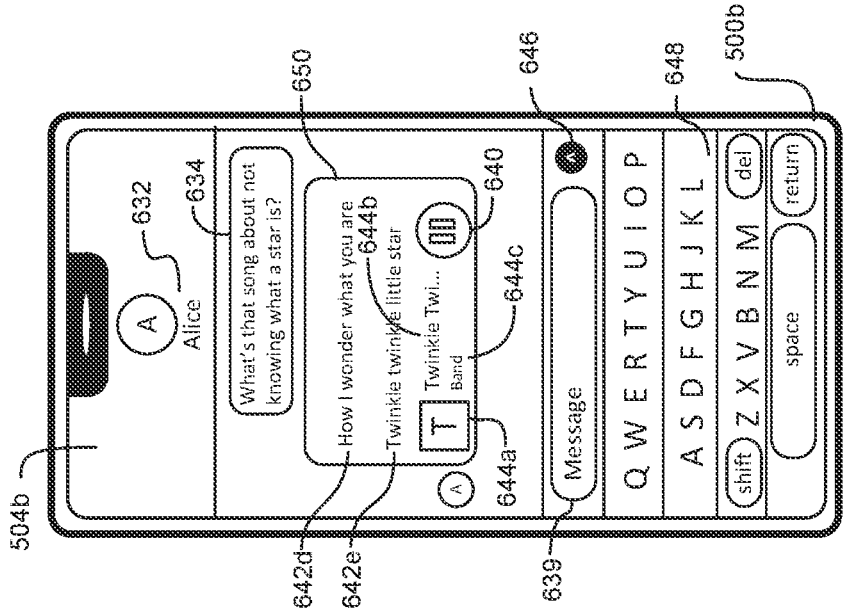
Figure 6E:
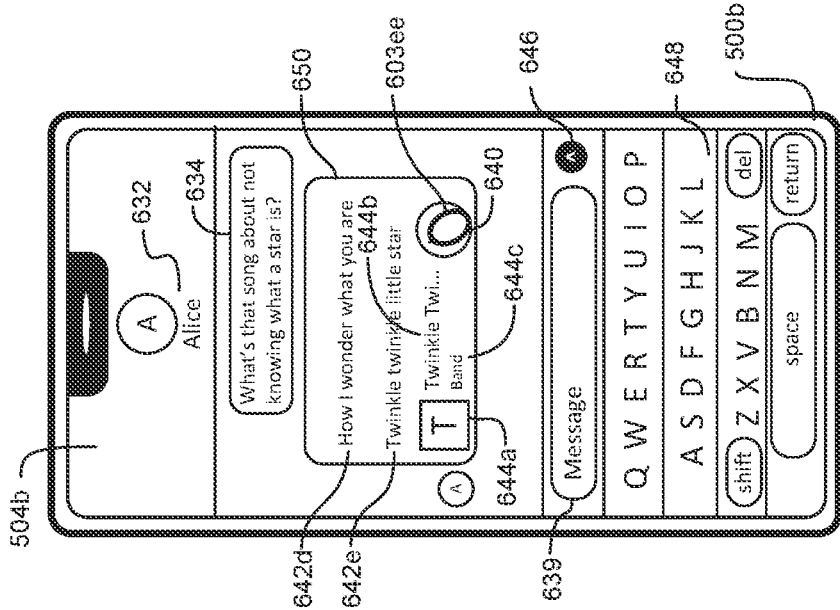
Figure 6H:
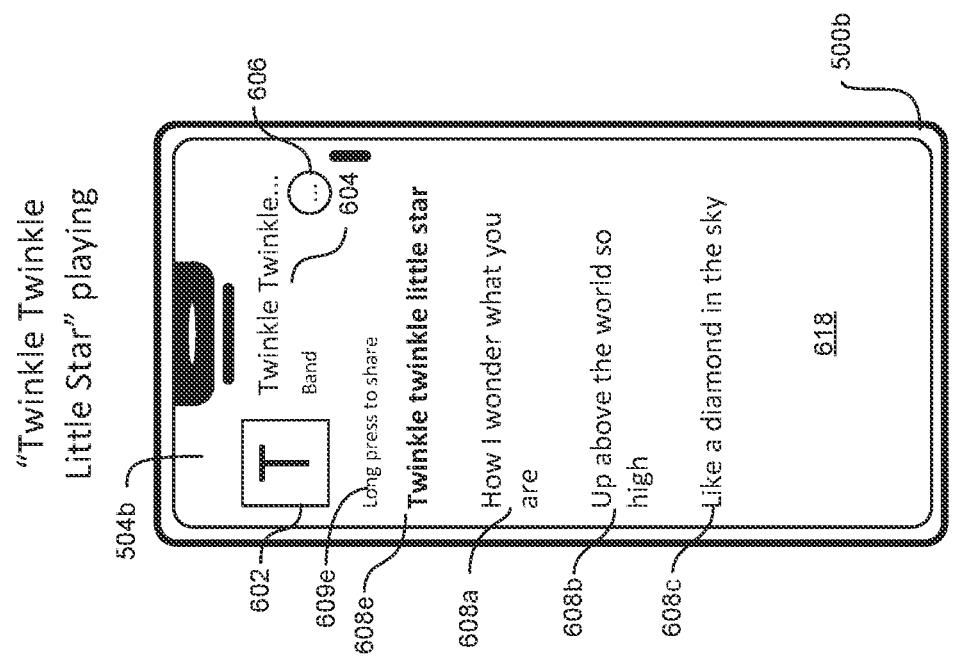
Figure 6G:
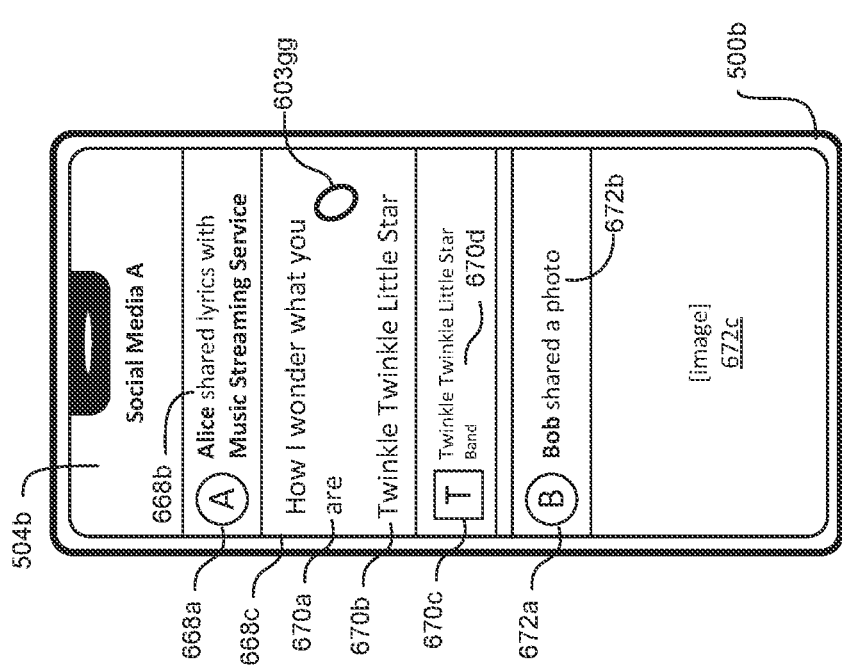

FIG. 6F illustrates the messaging user interface updated in response to the user's selection in FIG. 6E in some embodiments. In some embodiments, the electronic device 500a displays the message 638 including the portions 642a-c of lyrics corresponding to the shared portion of the content item. In some embodiments, message 638 includes the elements described above with reference to FIG. 6E. In some embodiments, in response to detecting selection of option 640, the electronic device 500a initiates playback of the shared portion of the content item (e.g., corresponding to the portions 642a-c of lyrics included in the message 638) while maintaining display of the messaging user interface. In some embodiments, in response to detecting selection of a region of the message 638 other than option 640, the electronic device 500a initiates playback of the content item starting at the shared portion while displaying a music application user interface (e.g., similar to the user interface illustrated in FIG. 6A) if the user of the electronic device 500a is subscribed to the content service of the user interface illustrated in FIG. 6A and the electronic device 500a is not currently playing other content. In some embodiments, if the electronic device 500a is currently playing other content or the user of the electronic device 500a is not subscribed to the content service, the electronic device 500a displays a different user interface of the music application without initiating playback of the shared content item in response to detecting selection of a region of the message 638 other than option 640. Interactions with the message including the shared portion of the content item are described in more detail below with reference to FIGS. 6X-6GG.

FIGS. 6G-6J illustrate another example of how the electronic device 500a shares a portion of the content item corresponding to lyrics selected by the user in the sharing user interface element. In FIG. 6G, the electronic device 500a displays the sharing user interface element with a portion 626a of lyrics designated for sharing in some embodiments. The electronic device 500a optionally detects movement of contact 603g that corresponds to a request to move through, e.g., navigate (e.g., scroll), the lyrics 626a-d of the content item in the sharing user interface element. In some embodiments, in response to the input illustrated in FIG. 6G, the electronic device 500a navigates the lyrics 626a-d of the content item in the sharing user interface element, as shown in FIG. 6H.

FIG. 6H illustrates an example of the sharing user interface element updated in accordance with the input illustrated in FIG. 6G. As a result of navigating the lyrics 626 of the content item, portion 626d in FIG. 6G is no longer visible in the sharing user interface element and portion 626e is now visible in the sharing user interface element. As shown in FIG. 6H, the electronic device 500a optionally detects selection (e.g., with contact 603h) of one of the portions 626e of lyrics not currently selected in the sharing user interface element. In some embodiments, in response to the selection illustrated in FIG. 6H, the electronic device 500a updates the sharing user interface element to indicate that portions 626e and 626a are designated for sharing, as shown in FIG. 6I.

FIG. 6I illustrates an example of the sharing user interface updated in response to, for example, the user input illustrated in FIG. 6H. The electronic device 500a indicates that portions 626e and 626a of the lyrics are designated for sharing by displaying portions 626e and 626a that are visually distinct from other portions of the lyrics. For example, the background color of the selected portions of a content item may be different than non-selected portions of the content item. Additionally or alternatively, the selected portions of a content item may display, e.g., in a container such as a text box, with visually distinct differences from non-selected items, e.g., the text box may have rounded corners. Other non-selected portions of the lyrics may display, e.g., in a container such as a text box, with regular corners. The electronic device 500a optionally detects selection (e.g., via contact 603i) of one of the options 628 to share the portion of the content item corresponding to portions 626e and 626a with another user.

In some embodiments, in response to the input illustrated in FIG. 6I, the electronic device 500a displays a messaging user interface similar to the messaging user interface illustrated in FIG. 6E. In some embodiments, instead of displaying a preview of a message 638 including the lyrics illustrated in FIG. 6E, the electronic device 500a displays a similar preview of a message including the portions of the content item selected in FIG. 6I. In some embodiments, while displaying the preview of the message including the portions of the content item selected in FIG. 6I, the electronic device 500a detects an input corresponding to a request to send the message (e.g., selection of option 646 illustrated in FIG. 6E). In some embodiments, in response to the input to send the message, the electronic device 500a sends the message and displays the messaging user interface illustrated in FIG. 6J.

FIG. 6J illustrates an exemplary messaging user interface after the user has shared a portion of the content item, e.g., corresponding to lyrics selected in FIG. 6I. In some embodiments, the messaging user interface includes a message 650 including the lyrics 642d-e corresponding to the shared portion of the content item. Other than including a different portion of the content item, e.g., corresponding to different lyrics, the message 650 in FIG. 6J can be the same as message 638 described above with reference to FIGS. 6E-6F. For the sake of brevity, those details will not be repeated here.

As described above with reference to FIG. 6A, in some embodiments, the electronic device 500a initiates a process to share a portion of the content item that corresponds to a selected portion of lyrics in response to input directed to the portion of lyrics. In some embodiments, the electronic device 500a initiates the process to share a portion of the content item corresponding to a respective portion of lyrics in response to selection of a sharing option in a menu of actions related to the content item, as will be described below with reference to FIGS. 6K-6M.

FIG. 6K illustrates the content playback user interface described above with reference to FIG. 6A. In FIG. 6K, the electronic device 500a optionally detects selection of an option 606 to display a menu including a plurality of options for performing actions related to the content item. In some embodiments, in response to the selection in FIG. 6K, the electronic device 500a updates the content user interface as shown in FIG. 6L.

FIG. 6L illustrates an example of the content playback user interface that has been updated to include a menu of options 654 for performing actions related to the content item. In some embodiments, the electronic device 500a displays the user interface illustrated in FIG. 6L in response to the input illustrated in FIG. 6K. In some embodiments, the menu includes the artwork 620 associated with the content item, an indication 652a of the title of the content item, an indication 652*b* of the artist of the content item, an option 624 to cease display of the menu, an option 654*a* to copy the content item (e.g., or a link to the content item) to a virtual clipboard of the electronic device 500*a*, an option 654*b* to initiate a process to share the content item, an option 654*c* to share a portion of the content item corresponding to a selected portion of the lyrics for the content item, an option 654*d* to view a collection of content items (e.g., an album) including the content item, an option 654*e* to remove the content item from a content library of the user of the electronic device 500*a*, and an option 654*f* to add the content item to a collection of content items (e.g., a playlist) created by the user of the electronic device 500*a*. As shown in FIG. 6L, the electronic device 500*a* optionally detects selection (e.g., via contact 603*l*) of the option 654*c* to share a portion of the content item corresponding to a selected portion of the lyrics for the content item. In some embodiments, in response to the user's selection in FIG. 6L, the electronic device 500*a* displays the sharing user interface element as shown in FIG. 6M. In some embodiments, instead of displaying the sharing user interface element illustrated in FIG. 6M in response to the user input illustrated in FIG. 6L, the electronic device 500*a* optionally pauses playback of the content item on the electronic device and enables the user to navigate the lyrics 608 and select one or more portions of the lyrics 608 for sharing while continuing to display the user interface illustrated in FIG. 6K. In some embodiments, the electronic device 500*a* updates the user interface illustrated in FIG. 6K to include one or more options to share the selected portions of lyrics.

FIG. 6M illustrates an example of the sharing user interface element displayed, for example, in response to the user input illustrated in FIG. 6L. As shown in FIG. 6M, in some embodiments, because the input to display the sharing user interface element did not designate a portion of the lyrics for sharing, the sharing user interface element is displayed with the lyrics 626 navigated to the beginning of the lyrics without any of the lyrics 626*a-d* of the content item designated for sharing. In some embodiments, instead of displaying the lyrics navigated to the beginning with no lyrics designated for sharing, the electronic device 500*a* navigates the lyrics to the current playback position of the content item and initially designates for sharing the portion of lyrics corresponding to the playback position when the input to share the lyrics was detected. In some embodiments, in response to an input to display the sharing user interface element that includes designation of a portion of lyrics (e.g., the input illustrated in FIG. 6A), the electronic device 500*a* displays the lyrics of the song in the sharing user interface element navigated to the designated lyric with the designated lyric selected. The electronic device 500*a* optionally detects selection (e.g., via contact 603*m*) of one of the portions 626*d* of lyrics in the sharing user interface element. In some embodiments, in response to the input illustrated in FIG. 6M, the electronic device 500*a* updates the sharing user interface element as shown in FIG. 6N.

In FIG. 6N, the electronic device 500*a* optionally updates the sharing user interface element to indicate that the portion 626*d* of lyrics selected in FIG. 6M is designated for sharing. In some embodiments, the electronic device 500*a* displays the selected portion 626*d* of lyrics with a visual characteristic that distinguishes it from the portions 626*a-c* of lyrics that are not designated for sharing in the sharing user interface element. As described above, in some embodiments, the portion 626*d* of lyrics is displayed on a background with colors that match the colors of the artwork 620 associated with the content item in a container with rounded corners. As shown in FIG. 6N, the electronic device 500*a* detects movement of contact 603*n* corresponding to a request to navigate the lyrics in the sharing user interface element. In response to the input illustrated in FIG. 6N, the electronic device 500*a* updates the sharing user interface element to navigate the lyrics, as shown in FIG. 6O.

FIG. 6O illustrates the sharing user interface element after the user navigates the lyrics 626*b-d* and 626*f* and selects portion 626*f* to add portion 626*f* to the selected lyrics with portion 626*d*. In some embodiments, in response to the input to add portion 626*f* to the portion of the lyrics designated for sharing, the electronic device 500*a* displays portion 626*f* in a manner that is visually distinct from the portions 626*b-626c* of lyrics not designated for sharing in the sharing user interface element. For example, the electronic device 500*a* displays the portion 626*f* of lyrics in a container with a background that optionally has the same colors as the artwork 620 associated with the content item and has rounded bottom corners. The electronic device optionally updates the container of portion 626*d* to have bottom corners with a reduced corner radius while maintaining the rounded top corners. As shown in FIG. 6O, the electronic device optionally detects movement of contact 603*o* corresponding to a request to navigate the lyrics in the sharing user interface element. In some embodiments, in response to the input in FIG. 6O, the electronic device 500*a* navigates the lyrics for the content item in accordance with movement of contact 603*o* (e.g., and any further navigation inputs detected).

FIG. 6P illustrates the sharing user interface after navigating the lyrics in response to one or more inputs, including the input illustrated in FIG. 6O, for example. In some embodiments, after providing the navigation input in FIG. 6O and before the electronic device 500*a* displays the sharing user interface element as shown in FIG. 6P, the user selects additional portions of lyrics, including portions 626*g* and 626*h* in FIG. 6P and any portions of lyrics between portions 626*d* and 626*f* in FIG. 6O and portions 626*g* and 626*h* in FIG. 6P. In response to the selection of additional portions of lyrics, the electronic device 500*a* can update the indication 622*a* of the number of portions selected and the indication 622*b* of the number of characters selected, as shown in FIG. 6P.

In some embodiments, the sharing user interface element includes a portion 626*i* of lyrics that, if added to the selection of lyrics, would cause the number of characters in the selection to remain lower than a threshold number of characters and a portion of lyrics 626*j* that, if added to the selection of lyrics, would cause the number of characters in the selection to exceed the threshold number of characters. As shown in FIG. 6P, in some embodiments, the threshold number of characters in the selection can be 200 characters though it should be appreciated that, in some embodiments, the threshold number of characters can be a different value, such as 50, 100, 150, 250, 350, 500, etc. characters. In some embodiments, the threshold number of characters that the electronic device 500*a* can add to the selected lyrics can be determined based on licensing agreements between a content delivery service (e.g., associated with the content application through which the content item is accessible by the electronic device) and a creator of the content.

In some embodiments, the electronic device 500*a* distinguishes the portion 626*i* that the electronic device 500*a* can add to the selection without exceeding the character threshold from the portion 626*j* that the electronic device 500*a* cannot add to the selection without exceeding the character threshold by displaying the portions 626*i* and 626*j* with different background colors. For example, the portion 626j of lyrics that cannot be added to the selection without exceeding the character threshold can be displayed in a greyed out container, whereas portions 626g-h that are already selected are displayed in containers with a background color that corresponds to the artwork 620 associated with the content item, and a portion 626i that is available for selection is displayed in a container with a different color than the colors of portions 626g-h and portion 626j. Moreover, in some embodiments, the manner in which the electronic device 500a navigates (e.g., scrolls) lyrics that can be added to the selection without exceeding the character limit can differ from the manner in which the electronic device 500a navigates (e.g., scrolls) lyrics that cannot be added to the selection without exceeding the character limit. For example, the electronic device 500a can navigate (e.g., scroll) lyrics that can be added to the selection without exceeding the character limit with inertia by gradually decelerating the navigation (e.g., scrolling) in response to detecting liftoff of a contact that provided the navigation (e.g., scrolling) input (e.g., contact 603o in FIG. 6O). In this example, the electronic device 500a can navigate (e.g., scroll) lyrics that cannot be added to the selection without exceeding the character limit without inertia by (e.g., immediately, without a delay) ceasing navigation (e.g., scrolling) in response to detecting liftoff of a contact that provided the navigation (e.g., scrolling) input (e.g., contact 603o in FIG. 6O) or with decreased inertia (e.g., stopping more quickly than would be the case while navigating (e.g., scrolling) lyrics that are available for selection).

In FIG. 6P, the electronic device 500a can detect selection (e.g., with contact 603p) of an additional portion of lyrics 626i that the electronic device 500a is able to add to the selection without exceeding the character limit. In some embodiments, in response to the input illustrated in FIG. 6P, the electronic device 500a can add portion 626i to the portion of lyrics designated for sharing, as shown in FIG. 6Q.

FIG. 6Q illustrates an example of how the electronic device 500a can update the sharing user interface element in response to the user input illustrated in FIG. 6P, such as by displaying the portion 626i of lyrics that was selected in FIG. 6P in a manner that is visually distinct from the portion 626j of lyrics not designated for sharing in the sharing user interface element. In some embodiments, the electronic device 500a updates the portion 626i of lyrics selected in FIG. 6P to indicate that the portion 626i of lyrics is included in the portion of lyrics designated for sharing and updates the indication 622a of the number of portions in the selection and the indication 622b of the number of characters in the selection, which can still be less than the threshold number.

In some embodiments, if the user of the electronic device 500a selects additional portions of lyrics to add to the portion of lyrics designated for sharing that would cause the number of characters in the portion of the lyrics designated for sharing to exceed the threshold number of characters, the electronic device 500a can forgo adding the selected portions of lyrics to the portion of lyrics designated for sharing, as will be now be described with reference to FIGS. 6Q-6T. In FIG. 6Q, the electronic device 500a can detect selection (e.g., via contact 603q) of a portion 626j of lyrics that, if added to the selected portion of lyrics, would cause the number of characters in the selection to exceed a character limit for sharing lyrics. In some embodiments, in response to the input in FIG. 6Q, the electronic device 500a can present the indication (e.g., overlaid on the sharing user interface element) illustrated in FIG. 6R without adding the portion 626j to the portion of lyrics designated for sharing.

FIG. 6R illustrates an example of an indication 656 that the electronic device 500a can present in response to detecting the input illustrated in FIG. 6Q. In some embodiments, the input illustrated in FIG. 6Q corresponds to a request to designate a portion of lyrics for sharing that has more characters than a character limit for sharing. In some embodiments, the electronic device 500a is not able to select a portion of lyrics with more characters than the character limit, so the electronic device 500a can present indication 656 instead of adding the portion 626j to the selection. In some embodiments, the indication 656 can include an option 658a to dismiss the indication 656 without changing the portion of lyrics designated for sharing, and an option 658b to replace the selection with the portion of lyrics selected by the user in FIG. 6Q. As shown in FIG. 6R, the electronic device 500a optionally detects selection (e.g., with contact 603r) of the option 658b to replace the selection with the portion 626j selected in FIG. 6Q. In some embodiments, in response to the input illustrated in FIG. 6R, the electronic device 500a updates the sharing user interface element as shown in FIG. 6S.

FIG. 6S illustrates an example of how the electronic device 500a updates the sharing user interface element in response to the input illustrated in FIG. 6R. In some embodiments, the electronic device 500a displays the portion 626j of lyrics that was selected in FIG. 6Q to indicate that the portion 626j is designated for sharing by displaying the portion 626j of lyrics in a manner that is visually distinct from the manner in which the portions 626g-i of lyrics that are not designated for sharing are displayed. In some embodiments, the portion 626j of lyrics is displayed with a background with color(s) that match the color(s) of the artwork 620 associated with the content item and in a container with rounded corners. The other portions 626g-i of lyrics that are not designated for sharing can be displayed with background color(s) that do not match the color(s) of the artwork 620 associated with the content item, and in containers with corners that have smaller radii than the radii of the corners of the container of portion 626j.

In some embodiments, the electronic device 500a provides ways of quickly de-selecting one or more portions of lyrics designated for sharing in the content sharing user interface element, as will be described below with reference to FIGS. 6S-6V. For example, if a single portion of lyrics is designated for sharing and the electronic device 500a detects selection of that portion of lyrics, the electronic device 500a can clear the selection. As another example, if multiple portions of lyrics are designated for sharing and the electronic device 500a detects selection of one of the portions that is designated for sharing, the electronic device 500a can update the selection to include only the selected portion and exclude the other previously-selected portions.

In FIG. 6S, for example, the electronic device 500a can display the sharing user interface element with one portion 626j of lyrics designated for sharing. The electronic device 500a can detect selection (e.g., via contact 603s) of the portion 626j of lyrics that is designated for sharing. In some embodiments, in response to the selection in FIG. 6S, the electronic device 500a can update the sharing user interface element to no longer designate portion 626j (or any other portion) of lyrics for sharing, as shown in FIG. 6T.

FIG. 6T illustrates an example of how the electronic device 500a can update the sharing user interface element in response to the input illustrated in FIG. 6S. As shown in FIG. 6T, the electronic device 500a can remove the designation for sharing from portion 626*j*. For example, the electronic device 500*a* can display the portion 626*j* of lyrics with the same background color as the other portions 626*g-i* of lyrics not designated for sharing, can update the indication 622*a* of the number of portions designated for to indicate that no portions of lyrics are designated for sharing, and can update the indication 622*b* of the number of characters in the lyrics designated for sharing to indicate that no characters are designated for sharing.

FIGS. 6U-6V illustrate an exemplary way the electronic device 500*a* transitions from designating multiple portions for sharing to designating a single portion for sharing in response to selection of one of the portions of lyrics designated for sharing in some embodiments. For example, in FIG. 6U, the electronic device 500*a* displays the sharing user interface element with a plurality of portions 626*a-c* of lyrics designated for sharing. In some embodiments, the electronic device 500*a* indicates which portions 626*a-c* of lyrics are designated for sharing by displaying portions 626*a-c* with a visual characteristic that is distinct from the visual characteristic of the portion 626*d* of lyrics not designated for sharing (e.g., displaying portions 626*a-c* with background color(s) that match the color(s) included in the artwork 620 corresponding to the content item and displaying the container of portion 626*a* with rounded top corners and displaying the container of portion 626*c* with rounded bottom corners as described above). The sharing user interface element can include the indication 622*a* of the number of portions of lyrics designated for sharing and the indication 622*b* of the number of characters in the designation for sharing. As shown in FIG. 6U, the electronic device 500*a* can detect selection (e.g., with contact 603*u*) of one of the portions 626*c* of lyrics that is designated for sharing in the sharing user interface element. In some embodiments, in response to detecting the input illustrated in FIG. 6U, the electronic device 500*a* updates the sharing user interface element to remove portions 626*a* and 626*b* from the designation for sharing while maintaining designation of the portion 626*u* selected by the user in FIG. 6U, as shown in FIG. 6V.

For example, as shown in FIG. 6V, the electronic device 500*a* updates the sharing user interface element to indicate that only portion 626*c* is designated for sharing. In some embodiments, indicating the designation of portion 626*c* for sharing can include displaying the portion 626*c* of lyrics in a manner that is visually distinct from the manner in which the electronic device 500*a* displays portions 626*a-b* and 626*d* of lyrics not designated for sharing (e.g., displaying portion 626*c* of lyrics in a container with rounded corners and a background including the color(s) of the artwork 620 corresponding to the content item). The electronic device 500*a* can update the indication 622*a* of the number of portions of lyrics designated for sharing and the indication 622*b* of the number of characters in the portions of lyrics designated for sharing in accordance with the updated designation of lyrics.

FIGS. 6W-6HH illustrate various exemplary ways in which electronic devices 500*a* and 500*b* can interact with portions of content items shared according to one or more of the details described above with reference to FIGS. 6A-6V. Some of the examples are illustrated as being performed at electronic device 500*a* (e.g., the device that shared the portion of the content item corresponding to a selected portion of lyrics of the content item) and some of the examples are illustrated as being performed by a second electronic device 500*b* (e.g., the device that received the portion of the content item corresponding to a selected portion of lyrics of the content item). It should be understood that the second electronic device 500*b* is capable of performing the operations illustrated as being performed by electronic device 500*a* and that electronic device 500*a* is capable of performing the operations illustrated as being performed by electronic device 500*b*.

FIG. 6W illustrates an exemplary messaging user interface including a message 650 that includes a portion of the content item corresponding to portions 642*d* and 642*e* of lyrics of the content item. A detailed description of message 650 can be found above with reference to FIG. 6J. As show in FIG. 6W, the electronic device 500*a* can detect selection (e.g., with contact 603*w*) of the message 650 representing the shared portion of the content item (e.g., without selecting option 640) while the electronic device 500*a* is not playing any other audio content. In some embodiments, in response to the selection illustrated in FIG. 6W, the electronic device 500*a* can present a content playback user interface and initiate playback of the shared portion of the content item, as shown in FIG. 6X.

FIG. 6X illustrates an exemplary content playback user interface displayed in response to detecting the user input illustrated in FIG. 6W. In some embodiments, the content playback user interface is a user interface of an application other than the messaging application associated with the user interface in FIG. 6W. For example, the content playback user interface is a user interface of a content (e.g., playback, streaming, browsing) application associated with a content delivery service. In some embodiments, the electronic device 500*a* can display the content playback user interface while playing the shared portion of the content item (e.g., starting from the start of the shared portion of the content item, rather than at the start of the content item). In some embodiments, once the electronic device 500*a* plays the entire shared portion of the content item, the electronic device 500*a* can continue playing the content item, including portions not shared that follow the shared portion of the content item. The content playback user interface is optionally the same as or similar to the content playback user interface described above with reference to FIG. 6A. As shown in FIG. 6X, the electronic device 500*a* optionally detects downward movement of contact 603*x* from a location corresponding to user interface element 605. In some embodiments, the user interface element 605 can facilitate navigation away from the content playback user interface and, in response to detecting the input illustrated in FIG. 6X, the electronic device 500*a* can display the content collection user interface illustrated in FIG. 6Y.

FIG. 6Y illustrates an exemplary content collection user interface that the electronic device 500*a* can display in response to the input illustrated in FIG. 6X. In some embodiments, the content item can belong to a collection of content items, such as an album or playlist. The user interface in FIG. 6Y can be the user interface of an album that includes the content item. In some embodiments, the electronic device 500*a* can continue playback of the (e.g., shared portion of the) content item while displaying the content collection user interface in FIG. 6Y.

In some embodiments, the content collection user interface in FIG. 6Y can include artwork 660*d* associated with the content collection, an indication 660*e* of the name of content collection, an indication 660*f* of the artist of the content collection, an option 660*g* to play the content collection in a predefined order, an option 660*h* to play the content collection in a shuffled order different from the predefined order, representations 662*a-d* of content items included in the content collection, an option 660*a* to navigate to a user interface corresponding to the artist of the content collection, an option 660*b* to add the content collection to a content library associated with a user account on the electronic device 500*a*, and an option 660*c* to display a menu including a plurality of actions corresponding to the content collection. In some embodiments, instead of displaying an option 660*a* to navigate to the user interface corresponding to the artist of the content collection, the electronic device 500*a* presents an option to navigate backward in the user interface (e.g., to a previously-displayed user interface) or an option to view the content library of the user. In some embodiments, the representations 662*a-d* of the content items in the collection can include a representation 662*b* of the content item that was shared by the electronic device 500*a*. In some embodiments, the representation 662*b* can include an indication 664 that the content item is currently playing on the electronic device 500*a* while the electronic device 500*a* is playing the content item.

In some embodiments, if selection of the message including the portion of the content item is detected while the electronic device 500*a* is playing other audio content, the electronic device 500*a* displays the content collection user interface in response to the selection instead of displaying the content playback user interface and forgoes initiating playback of the content item. For example, in FIG. 6Z, the electronic device 500*a* can detect selection (e.g., with contact 603*z*) of the message 650 including the shared portion of the content item while the electronic device 500*a* is playing an item of audio content that is different from the shared content item. In some embodiments, in response to the input illustrated in FIG. 6Z, the electronic device 500*a* can display the content collection user interface illustrated in FIG. 6AA.

In some embodiments, the electronic device 500*a* can display the content collection user interface in FIG. 6AA in response to the user input illustrated in FIG. 6Z that was detected while the electronic device 500*a* was playing audio content other than the shared content item. The content collection user interface in FIG. 6AA can be the same as the content collection user interface described above with reference to FIG. 6Y except for the differences noted here. In some embodiments, the electronic device 500*a* emphasizes the representation 662*b* of the shared content item in the content collection user interface and does not include the indication that the shared content item is playing because the shared content item is not playing. In some embodiments, the emphasis of the representation 662*b* displayed by the electronic device 500*a* can be highlighting of the representation 662*b* (e.g., with an outline) and/or displaying representation 662*b* in a different color than the color of the representations 662*a* and 662*c-d* of the other content items in the content collection. In some embodiments, the electronic device 500*a* can initiate playback of the content item in response to detecting selection of the representation 662*b* of the content item. In some embodiments, the electronic device 500*a* plays the content item from the beginning. In some embodiments, the electronic device 500*a* plays the content item starting at the shared portion of the content item. In some embodiments, playback of the content item ends at the end of the shared portion of the content item. In some embodiments, playback of the content item continues to the end of the content item.

In some embodiments, the electronic device 500*a* can perform the actions described above with reference to FIGS. 6W-6AA while a user account associated with the electronic device 500*a* is entitled to access the shared content item. For example, the shared content item can be accessible via a subscription to a content delivery service (e.g., a music streaming service) and the user of the electronic device 500*a* has an active subscription to the content delivery service. As another example, a user account of the user of the electronic device 500*a* can own the rights to play the content item (e.g., the user previously purchased the content item through a content item store, such as a music store). In some embodiments, the electronic device 500*a* can forgo playing the content item in response to selection of the message including the content item if the user of the electronic device 500*a* is not entitled to access the shared content item, as will be described below with reference to FIGS. 6BB-6DD.

FIG. 6BB illustrates an exemplary messaging user interface according to some embodiments. In some embodiments, the messaging user interface can be the same as the messaging user interface described previously with reference to FIGS. 6W and 6Z except the electronic device 500*a* can present the messaging user interface while the user of the electronic device 500*a* is not entitled to access the shared content item (e.g., independently from the context of sharing). As shown in FIG. 6BB, the electronic device 500*a* can detect selection (e.g., via contact 603*bb*) of the message 650 including the shared portion of the content item (e.g., without detecting selection of option 640). In some embodiments, in response to the selection in FIG. 6BB, the electronic device 500*a* can display the content collection user interface illustrated in FIG. 6CC.

FIG. 6CC illustrates an exemplary content collection user interface that can be displayed in response to the user input described above with reference to FIG. 6BB. In some embodiments, the content collection user interface in FIG. 6CC can be the same as the content collection user interface described above with reference to FIG. 6AA, except the electronic device 500*a* can forgo playback of the content item in response to detecting selection of the representation 662*b* of the content item because the user is not entitled to access the content item. In some embodiments, instead of initiating playback of the content item in response to detecting selection of representation 662*b*, the electronic device 500*a* can display information about subscribing to a content delivery service that entitles the user to access the content item. For example, in FIG. 6CC, the electronic device 500*a* can detect selection (e.g., with contact 603*cc*) of the representation 662*b* of the shared content item and, in response, the electronic device 500*a* can display the user interface illustrated in FIG. 6DD.

FIG. 6DD illustrates an exemplary user interface that includes information about a content delivery service that entitles the user to access the shared content item that can be displayed in response to the input described above with reference to FIG. 6CC. In some embodiments, the content delivery service can be a music streaming service that entitles the user to stream the shared content item. In some embodiments, the user interface in FIG. 6DD can include information 666*a* about the subscription to the content delivery service, an option 666*b* to start a subscription to the content delivery service, and an option 666*c* to cease display of the user interface without subscribing to the content delivery service.

FIGS. 6EE-6FF illustrate examples of how electronic device 500*b* can play the shared portion of the content item while maintaining display of the messaging user interface with the message including the shared portion of the content item.

FIG. 6EE illustrates an exemplary messaging user interface including the message 650 including the shared content item. FIG. 6EE illustrates display of the messaging user interface by the second electronic device 500b with which electronic device 500a shared the portion of the content item. The second electronic device 500b can display the same message 650 that was displayed by the electronic device 500a, as described above with reference to FIGS. 6J, 6W, 6Z, and 6BB. As shown in FIG. 6EE, the second electronic device 500b can detect selection (e.g., with contact 603ee) of an option 640 to initiate playback of the shared portion of the content item within the messaging user interface (e.g., as opposed to detecting selection of message 650 without selection option 640, such as in FIGS. 6W, 6Z, and 6BB). In some embodiments, in response to the selection of the option 640, the electronic device 500b can play the shared portion of the content item while maintaining display of the messaging user interface, as shown in FIG. 6FF.

FIG. 6FF illustrates an example of the electronic device 500b playing the shared portion of the content item while maintaining display of the messaging user interface, for example, in response to the input illustrated in FIG. 6EE. In some embodiments, while the portion of the content item is playing, the electronic device 500b updates the option 640 to be an option to pause playback of the portion of the content item. In some embodiments, the electronic device 500b plays only the shared portion of the content item, starting playback from the start of the shared portion (e.g., as opposed to the beginning of the entire content item) and ceases playback of the shared content item at the end of the shared portion of the content item (e.g., as opposed to end of the entire content item) while displaying the messaging user interface. In some embodiments, if the electronic device 500b is playing other audio content while the input illustrated in FIG. 6EE is detected, the electronic device 500b ceases playback of the other content item, plays the shared portion of the content item, then resumes playback of the other content item. In some embodiments, the electronic device 500b uses a fade in/fade out transition between the other content item and the shared portion of the content item. In some embodiments, the electronic device 500b plays the shared portion of the content item while maintaining display of the messaging user interface in response to the input in FIG. 6EE irrespective of whether or not the user of the second electronic device 500b is entitled to access the entire content of the shared content item (e.g., via the content (e.g., browsing, playback, and/or streaming) application using a subscription). In some embodiments, if the user of the electronic device 500b is not entitled to access the shared content item, the electronic device 500b forgoes playback of the shared portion of the content item and optionally displays the user interface illustrated in FIG. 6DD instead.

Thus, in some embodiments, electronic devices 500a and 500b can access the shared portion of the content item through a messaging application as described above with reference to FIGS. 6W-6FF. In some embodiments, electronic devices 500a and 500b can share the shared portion of the content item through other sharing protocols, such as via social media. FIGS. 6GG-6HH illustrate examples of the electronic device 500b accessing a portion of a content item shared via social media.

FIG. 6GG illustrates an exemplary social media user interface presented by electronic device 500b in accordance with some embodiments. In some embodiments, the electronic device 500b navigates to the user interface illustrated in FIG. 6GG through a social media application or an internet browsing application. The social media user interface can include content shared by other users on the social media network, including lyrics 670a-670b corresponding to a portion of a content item shared by a first user and an image 672c shared by a second user. In some embodiments, the image 672c is displayed proximate to an indication 672a of the user that shared the image and text 672b indicting the sharing of the image. Likewise, in some embodiments, the lyrics 670a-670b corresponding to a shared portion of the content item can be displayed proximate to an indication 668a of a user that shared the portion of the content item, an indication 668b that the user shared the portion of the content item, artwork 670c corresponding to the shared content item, and an indication 670d of the title and artist of the content item. In some embodiments, the social media user interface does not include an option to play the shared portion of the content while maintaining display of the social media user interface. In some embodiments, the lyrics 670a-b corresponding to the shared portion of the content item can be displayed on a background 668c that optionally includes one or more colors included in the artwork 670c corresponding to the content item. As shown in FIG. 6GG, the electronic device 500b can detect selection (e.g., via contact 603gg) of the background 668c of the lyrics (or selection of the lyrics 670a-b). In some embodiments, in response to detecting selection of the background 668c of the lyrics, the electronic device 500b can display the content playback user interface illustrated in FIG. 6HH and initiate playback of the shared content item starting at the shared portion of the content item corresponding to lyrics 670a-670b. In some embodiments, the playback user interface in FIG. 6HH is a user interface of an application that is different from the application in which the social media user interface illustrated in FIG. 6GG was displayed. For example, the playback user interface is a user interface of a content application associated with a content delivery service and the social media user interface is a user interface of a social media application. In some embodiments, one or more of the content playback user interface and the social media user interface are user interfaces of an internet browsing application. In some embodiments, while displaying the content playback user interface in FIG. 6HH, the electronic device 500b plays the shared portion of the content item without playing other portions of the content item, plays the shared portion of the content item and then continues to play the rest of the content item to the end of the content item, or starts playback of the content item at the beginning of the content item and ceases playback of the content item at the end of the shared portion of the content item.

FIG. 6HH illustrates an exemplary content playback user interface that can be displayed in response to the user input illustrated in FIG. 6GG. In some embodiments, the content playback user interface in FIG. 6HH can be the same as the content playback user interface described above with reference to FIGS. 6A, 6K, and 6X. In some embodiments, the electronic device 500b displays the user interface in FIG. 6HH irrespective of whether or not the electronic device 500b is playing other content when the input in FIG. 6GG is detected. In some embodiments, if the electronic device 500b is playing other audio content when the input in FIG. 6GG is detected, the electronic device 500b instead displays a content collection user interface in the manner described above with reference to FIG. 6AA. In some embodiments, if the electronic device 500b is not entitled to access the shared content item, the electronic device 500b can display the user interfaces described above with reference to FIGS. 6CC-6DD in response to the input illustrated in FIG. 6GG or can initiate playback of only the shared portion of the content item (e.g., without playing the rest of the content item to the end of the content item after finishing playback of the shared portion of the content item).

FIG. 7 is a flow diagram illustrating a method of sharing portions of content items corresponding to selected lyrics of the content items with another electronic device in accordance with some embodiments. The method 700 is optionally performed at an electronic device such as device 100, device 300, device 500, device 500a, and device 500b as described above with reference to FIGS. 1A-1B, 2-3, 4A-4B and 5A-5H. Some operations in method 700 are, optionally combined and/or order of some operations is, optionally, changed.

As described below, the method 700 provides ways in which an electronic device shares portions of content items corresponding to portions of lyrics of the content items. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at a first electronic device 500a in communication with a display generation component 504a and one or more input devices (e.g., a mobile device (e.g., a tablet, a smartphone, a media player), a computer (e.g., a desktop computer, a laptop computer), or a wearable device (e.g., a watch, a head-mounted device), or a set-top box in communication with a display generation component (e.g., a television screen) and one or more input devices (e.g., a remote control)). In some embodiments, the display generation component is a display integrated with the electronic device (optionally a touch screen display) and/or an external display such as a monitor, projector, television, etc.).

In some embodiments, while displaying, via the display generation component, a user interface associated with a respective content item, such as in FIG. 6A, the electronic device 500a receives (702), via the one or more input devices, an input (e.g., contact 603a) corresponding to a request to share a portion of the respective content item for playback corresponding to a portion of lyrics of the respective content item, with a second electronic device (e.g., or a user account (e.g., e-mail address, phone number, etc.) associated with a second electronic device). In some embodiments, the user interface associated with the respective content items includes lyrics of the content item. For example, the content item is a song and the user interface includes the song lyrics. In some embodiments, the lyrics are presented in a manner that is synchronized to playback of the content item. In some embodiments, sharing the respective portion of the respective content item corresponding to the designated respective portion of the lyrics causes the electronic device to transmit an indication, to a second electronic device, of the content item including a visual indication of the respective lyrics. In some embodiments, sharing the portion of the respective content item corresponding to the designated respective portion of the lyrics causes the electronic device to share a rich link that, when selected by the second electronic device, causes the second electronic device to initiate playback of the content item from a playback position in the content item at which the respective lyrics are being played (e.g., a playback position a predetermined time (e.g., 0.5, 1, 2, 3, 5 etc. seconds) before the lyrics are played). In some embodiments, the request to share the respective content item includes identifying the portion of the lyrics that should be designated when the content item is shared. For example, the electronic device detects a secondary selection (e.g., long tap, force tap, right click) of the respective lyrics presented in the user interface associated with the respective content item followed by selection of an option to share the respective portion of content item corresponding to the respective lyrics.

In some embodiments, such as in FIG. 6C, in response to receiving the input corresponding to the request to share a portion of respective content item corresponding to the portion of the lyrics, the electronic device 500a displays (704), via the display generation component, a sharing user interface that includes lyrics (e.g., 626a-d) for the respective content item. In some embodiments, the lyrics are displayed with a visual indication identifying the respective lyrics the portion of the content item to be shared will correspond to. For example, each line of lyrics is displayed in a container with a background color and the background color of the respective lyrics is different from the background color of the other lyrics. In some embodiments, the sharing user interface includes all of the lyrics of the content item in a scrollable user interface element. In some embodiments, the sharing user interface element includes all of the lyrics of the respective content item. In some embodiments, the sharing user interface element includes a subset of all of the lyrics of the respective content item.

In some embodiments, such as in FIG. 6C, while displaying the sharing user interface, the electronic device 500a detects (706), on the sharing user interface via the one or more input devices, a sequence of one or more inputs including an input (e.g., contact 603c) corresponding to a request to designate a portion (e.g., 626c) of the lyrics of the respective content item for sharing. In some embodiments, the sequence of one or more inputs includes selection of an option to initiate the process to share the respective portion of the content item corresponding to the designated respective portion of the lyrics. In some embodiments, the sequence of one or more inputs include selection of an option to designate the sharing protocol (e.g., text message, enhanced data-based message, social media, e-mail, link generation) to be used to share the respective portion of the content item corresponding to the designated respective portion of lyrics. In some embodiments, the sequence of one or more inputs includes one or more inputs designating the user account (e.g., phone number, e-mail address, messaging screen name, social media account) or other electronic device (e.g., for a device-to-device sharing protocol) with which the content item is to be shared. In some embodiments, the sequence of one or more inputs includes selecting and/or designating one or more lyrics of the content item to be shared.

In some embodiments, such as in FIG. 6D, in response to detecting the sequence of one or more inputs (708), in accordance with a determination that the sequence of one or more inputs (e.g., via contact 603d) corresponds to a request to designate a first portion (e.g., 626a-c) of the lyrics for sharing, the electronic device 500a initiates (710) a process to share a portion of the respective content item for playback corresponding to the first portion (e.g., 626a-c) of the lyrics with the second electronic device. In some embodiments, while displaying the sharing user interface, the electronic device detects one or more inputs selecting the first respective portion of the lyrics such that the electronic device will share the portion of the respective content item corresponding to the first respective portion of the lyrics. For example, the sharing user interface includes selectable representations of each line of lyrics of the content item and detects selection of the first respective portion of lyrics. In some embodiments, the first respective portion of lyrics are already designated in the sharing user interface in response to the input corresponding to the request to share the respective content item (e.g., without receiving further inputs designating the first respective portion of the lyrics while the sharing user interface is displayed). In some embodiments, the electronic device initially presents the sharing user interface with respective lyrics designated and detects an input to instead designate the first respective portion of lyrics. For example, the input(s) correspond to a request to designate additional, alternative, or fewer portions of lyrics for sharing compared to the respective portion of lyrics originally designated for sharing in the sharing user interface.

In some embodiments, such as in FIG. 6I, in response to detecting the sequence of one or more inputs (708), in accordance with a determination that the sequence of one or more inputs (e.g., via contact 603*i*) corresponds to a request to designate a second portion (e.g., 626*a* and 626*e*) of the lyrics for sharing, different from the first portion, the electronic device 500*a* initiates (712) a process to share a portion of the respective content item for playback corresponding to the second portion (e.g., 626*a* and 626*e*) of the lyrics, with the second electronic device. In some embodiments, while displaying the sharing user interface, the electronic device detects one or more inputs selecting the second respective portion of the lyrics such that the electronic device will share the portion of the respective content item corresponding to the second respective portion of the lyrics. For example, the sharing user interface includes selectable representations of each line of lyrics of the content item and detects selection of the second respective portion of lyrics. In some embodiments, the second respective portion of lyrics are already designated in the sharing user interface in response to the input corresponding to the request to share the respective content item (e.g., without receiving further inputs designating the second respective portion of the lyrics while the sharing user interface is displayed). In some embodiments, the electronic device initially presents the sharing user interface with respective lyrics designated for sharing and detects an input to instead designate the second respective portion of lyrics. For example, the input(s) correspond to a request to designate additional, alternative, or fewer portions of lyrics for sharing compared to the respective portion of lyrics originally designated for sharing in the sharing user interface.

The above-described manner of determining which portion of lyrics to which the shared portion of the content item will correspond while displaying the sharing user interface provides an efficient way of allowing the user to adjust the portion of lyrics to be shared after providing the request to share the content item, which simplifies the interaction between the user and the electronic device and enhances the operability of the electronic device and makes the user-device interface more efficient (e.g., by reducing the number of inputs needed to change which portion of the content item should be shared), which additionally reduces power usage and improves battery life of the electronic device by enabling the user to use the electronic device more quickly and efficiently.

In some embodiments, such as in FIG. 6C, while displaying the sharing user interface that includes the lyrics for the respective content item, the electronic device 500*a* detects, on the sharing user interface via the one or more input devices, selection (e.g., via contact 603*c*) of a first line of lyrics (e.g., 626*c*) and selection of a second line of lyrics (e.g., 626*b*). In some embodiments, the electronic device presents the lyrics for the respective content item in the sharing user interface such that each line of lyrics is in a respective container. The electronic device optionally allows the user to select one or more lines of lyrics to designate for sharing. In some embodiments, when selecting multiple lines of lyrics, the lines of lyrics must be consecutive in the lyrics for the content item.

In some embodiments, in response to detecting the selection of the first line of lyrics (e.g., 626*c*) and the selection of the second line of lyrics (e.g., 626*b*), such as in FIG. 6C, the electronic device 500*a* designates the first line of lyrics (e.g., 626*c*) and the second line (e.g., 626*b*) of lyrics for sharing, such as in FIG. 6D. In some embodiments, the electronic device displays the first and second lines of lyrics in a first manner (e.g., with a first background color) and the remaining lines of lyrics not designated for sharing in a second manner (e.g., with a second background color different from the first background color).

In some embodiments, the first portion of the lyrics (e.g., 626*a-c*) includes the first line of lyrics (e.g., 626*c*) and the second line of lyrics (e.g., 626*b*), such as in FIG. 6D. In some embodiments, in response to the selection of the first and second lines of lyrics, the electronic device is configured to share a portion of the respective content item corresponding to the first and second lines of lyrics. In some embodiments, if there are one or more third lines of lyrics between the first and second lines of lyrics in the lyrics for the respective content item, in response to detecting selection of the first and second lines of lyrics, the electronic device also designates the one or more third lines of lyrics for sharing in addition to designating the first and second lines of lyrics for sharing.

The above-described manner of enabling the user to select multiple lines of lyrics to designate for sharing provides an efficient way of sharing multiple lines of lyrics at once, which simplifies the interaction between the user and the electronic device and enhances the operability of the electronic device and makes the user-device interface more efficient (e.g., by reducing the number of times the user must share portions of the respective content item in order to share a portion of the content item corresponding to multiple lines of lyrics), which additionally reduces power usage and improves battery life of the electronic device by enabling the user to use the electronic device more quickly and efficiently.

In some embodiments, such as in FIG. 6M, while displaying the sharing user interface, the electronic device 500*a* detects, on the sharing user interface via the one or more input devices, selection (e.g., via contact 603*m*) of a first portion of the lyrics (e.g., 626*d*). In some embodiments, the sharing user interface element includes the lyrics for the respective content item displayed with each line of lyrics in a selectable container. The electronic device optionally detects selection of one or more lines of lyrics and, in response to the selection, designates the selected lines of lyrics for sharing. In some embodiments, the first respective portion of the lyrics is one line of lyrics. In some embodiments, the first respective portion of lyrics includes more than one line of lyrics.

In some embodiments, in response to detecting the selection (e.g., with contact 603*m*) of the first portion (e.g., 626*d*) of the lyrics, such as in FIG. 6M, the electronic device 500*a* displays, via the display generation component, the first portion (e.g., 626*d*) of the lyrics with a visual characteristic having a first value (e.g., indicating that the first respective portion of the lyrics are designated for sharing) and an additional portion (e.g., 626c) of the lyrics with the visual characteristic (e.g., background color, text color, text size, text style, font, background container size, background container outline style, etc.) having a second value (e.g., indicating that the additional portion of the lyrics is not designated for sharing), different from the first value, such as in FIG. 6N. In some embodiments, the electronic device displays the lines of lyrics selected for sharing with a background color that matches the color(s) of artwork associated with the respective content item displays the lines of lyrics not selected for sharing with a different background color (e.g., black, white, grey, etc.). In some embodiments, the electronic device is configured to share a portion of the respective content item that corresponds to the selected lines of lyrics.

In some embodiments, such as in FIG. 6P, the electronic device 500a detects, on the sharing user interface via the one or more input devices, selection (e.g., via contact 603p) of the additional portion (626i) of the lyrics. The electronic device optionally detects selection of one or more lines of lyrics not included in the first respective portion of lyrics. In some embodiments, the additional portion of lyrics is consecutive to the first respective portion of lyrics in the lyrics for the respective content item.

In some embodiments, in response to detecting the selection of the additional portion (e.g., 626i) of the lyrics, such as in FIG. 6P, the electronic device 500a updates the sharing user interface to include the first respective portion (e.g., 626h) and the additional portion (e.g., 626i) of the lyrics displayed with the visual characteristic having the first value, such as in FIG. 6Q. In some embodiments, the electronic device updates the background color of the line(s) of lyrics included in the additional portion of lyrics to include the color(s) of the artwork associated with the respective content item. In some embodiments, the electronic device updates the background color of the line(s) of lyrics included in the additional portion of lyrics to be the same color as the background color of the line(s) of lyrics included in the first respective portion of lyrics. In some embodiments, while the first respective portion of the lyrics and the additional portion of the lyrics are selected in the sharing user interface element, the electronic device detects one or more inputs corresponding to a request to share a portion of the respective content item corresponding to the first respective portion of lyrics and the additional portion of lyrics. In some embodiments, in response to the input, the electronic device shares the portion of the respective content item corresponding to the first respective portion of lyrics and the additional portion of lyrics.

The above-described manner of displaying selected portions of the lyrics with a different visual characteristic than the portions of lyrics that are not selected in the sharing user interface element provides an efficient way of allowing the user to review the lyrics corresponding to the portion of the respective content item that will be shared before sharing the portion of the content item, which simplifies the interaction between the user and the electronic device and enhances the operability of the electronic device and makes the user-device interface more efficient (e.g., by reducing user errors and therefore reducing the number of inputs received to correct the portion of the content item that is shared), which additionally reduces power usage and improves battery life of the electronic device by enabling the user to use the electronic device more quickly and efficiently.

In some embodiments, such as in FIG. 6A, the input (e.g., via contact 603a) corresponding to the request to share the respective portion of respective content item corresponding to the designated respective portion of the lyrics includes designating the first respective portion (e.g., 608a) of the lyrics without designating an additional portion (e.g., 608b) of the lyrics. In some embodiments, the user interface associated with the respective content item includes at least a portion of the lyrics of the respective content item and, while displaying the user interface associated with the respective content item, the electronic device detects an input corresponding to a request to initiate a process to share a portion of the content item corresponding to the first respective portion of the lyrics. For example, the electronic device detects selection of the first respective portion of the lyrics for a period of time that exceeds a predetermined time threshold (e.g., 0.1, 0.3, 0.5, 1, 2, 3, etc. seconds) (e.g., a "long press" on a touch screen) and, in response, initiates a process to share the portion of the content item corresponding to the first respective portion of the lyrics. In some embodiments, the input includes designation of the first respective portion of lyrics without designation of the additional portion of the lyrics.

In some embodiments, such as in FIG. 6D, while displaying the sharing user interface, the electronic device 500a detects, on the sharing user interface via the one or more input devices, a sequence of one or more inputs (e.g., via contact 603d) corresponding to a request to initiate a process to share a portion of the respective content item for playback corresponding to the first portion (e.g., 626a) of the lyrics and the additional portion (e.g., 626b) of the lyrics (e.g., without sharing one or more portions of the lyrics other than the first respective portion of the lyrics and the additional portion of the lyrics). The electronic device optionally detects selection of the additional portion of lyrics in the sharing user interface element and, in response, adds the additional portion of lyrics to the selection that includes the first respective portion of the lyrics. In some embodiments, while the first respective portion of lyrics and additional portion of lyrics are selected in the sharing user interface element, the electronic device is configured to share a portion of the respective content item corresponding to the first respective portion of lyrics and the additional portion of lyrics in response to a sequence of one or more inputs (e.g., selection of a sharing protocol and an input confirming sharing of the respective content item).

In some embodiments, in response to the sequence of one or more inputs (e.g., via contact 603d) corresponding to the request to initiate the process to share the portion of the respective content item corresponding to the first portion (e.g., 626a) of the lyrics and the additional portion (e.g., 626b) of the lyrics, such as in FIG. 6D, the electronic device 500a displays, via the display generation component, a messaging (e.g., text message, e-mail, enhanced data-based message, instant message, social media, chat, etc.) user interface including a preview of a message (e.g., 639) sharing the portion of the respective content item for playback corresponding to the first respective portion (e.g., 642a) of the lyrics and the additional portion (e.g., 642b) of the lyrics, such as in FIG. 6E. The sequence of one or more inputs optionally includes an input selecting a messaging service as the protocol to be used to share the portion of the respective content item. In some embodiments, the preview of the message includes the first portion of lyrics, the additional portion of lyrics, the title of the respective content item, the artist of the respective content item, and artwork corresponding to the respective content item. In some embodiments, the electronic device concurrently displays the preview of the message and an option that, when selected, causes the electronic device to transmit the message including the portion of the content item. In some embodiments, the user interface associated with the respective content item and the sharing user interface element are user interfaces of a first application (e.g., a content playback, browsing, and/or streaming application) and the user interface including a preview of the message is a user interface of a second application (e.g., a messaging application).

The above-described manner of enabling the user to edit the selected portion of lyrics in the sharing user interface element and preview the message including the portion of the respective content item provides an efficient way of allowing the user to confirm which portion of the respective content item should be shared before sharing the respective portion of the content item, which simplifies the interaction between the user and the electronic device and enhances the operability of the electronic device and makes the user-device interface more efficient (e.g., by reducing user errors and therefore reducing the number of user inputs detected to correct the errors) which additionally reduces power usage and improves battery life of the electronic device by enabling the user to use the electronic device more quickly and efficiently.

In some embodiments, such as in FIG. 6A, the user interface associated with the respective content item includes a third portion (e.g., 608*b*) of the lyrics of the respective content item and a visual indication (e.g., 609) indicating that it is possible to share a portion of the respective content item for playback corresponding to the third portion of the lyrics, wherein the visual indication (e.g., 609) is displayed proximate to the third respective portion (e.g., 608*b*) of the lyrics. In some embodiments, the electronic device displays the visual indication over each line of lyrics displayed in the user interface associated with the respective content item. In some embodiments, the electronic device displays the lyrics of the respective content item in a manner that is time-synchronized with playback of the respective content item and displays the visual indication proximate to the line of lyrics that corresponds to the current playback position of the respective content item. In some embodiments, the visual indication is displayed proximate to every line of lyrics while the user interface associated with the respective content item is displayed. In some embodiments, while the electronic device is displaying time-synchronized lyrics, the electronic device displays the indication proximate to the portion of the lyrics that corresponds to the current playback position in the respective content item and, in response to a user input corresponding to a request to scroll the lyrics (e.g., display the lyrics in accordance with the scrolling instead of in accordance with the playback of the respective content item), the electronic device displays the visual indication proximate to every line of lyrics for the respective content item. In some embodiments, the visual indication includes instructions for providing an input to initiate a process to share the portion of the content item corresponding to the third respective portion of the lyrics (e.g., text that says "long press to share").

The above-described manner of displaying the visual indication indicating that it is possible to share the portion of the respective content item corresponding to the third respective portion of lyrics provides an efficient way of instructing the user how to request to share the portion of the content item, which simplifies the interaction between the user and the electronic device and enhances the operability of the electronic device and makes the user-device interface more efficient (e.g., by reducing the number of inputs received as part of a user's trial and error to share the portion of the respective content item corresponding to the third respective portion of lyrics or look up (e.g., on the internet) how to share the portion of the respective content item corresponding to the third respective portion of lyrics), which additionally reduces power usage and improves battery life of the electronic device by enabling the user to use the electronic device more quickly and efficiently.

In some embodiments, the input corresponding to the request to hare the respective portion of the respective content item corresponding to the designated respective portion of lyrics includes selection of the respective portion of the lyrics, wherein the selection satisfies one or more criteria. In some embodiments, the one or more criteria include a criterion that is satisfied in response to detecting a selection input directed to the respective portion of the lyrics for a period of time that is greater than a predetermined threshold period of time (e.g., 0.5, 1, 2, 3, 4, 5, etc. seconds). For example, the electronic device detects, via a touch screen, a contact at a location at which the respective portion of lyrics are displayed for at least the threshold period of time and, in response, displays the sharing user interface.

In some embodiments, such as in FIG. 6K, the user interface associated with the respective content item includes a selectable user interface element (e.g., 606) that, when selected, causes the electronic device to display a menu that includes a selectable option (e.g., 654*c*) that is selectable to display the sharing user interface, such as in FIG. 6L. In some embodiments, the menu includes additional selectable options related to the respective content item, such as copying a URL associated with the respective content item, sharing the entire content item, showing a collection of content items (e.g., an album, a playlist) that includes the respective content item, adding or removing the respective content item from a content library of the user, and/or adding the respective content item to a collection of content items (e.g., a playlist).

In some embodiments, detecting the input corresponding to the request to share the respective portion of the respective content item corresponding to the designated respective portion of lyrics of the respective content item includes detecting, via the one or more input devices, selection of the selectable option (e.g., 654*c*), such as in FIG. 6L. In some embodiments, in response to detecting selection of the selectable option, the electronic device displays the sharing user interface element. In some embodiments, the sharing user interface element includes selectable representations of the lines of lyrics for the respective content item. The electronic device optionally detects selection of one or more lines of lyrics and a request to share a portion of the respective content item corresponding to the selected one or more lines of lyrics.

The above-described manner of displaying the menu including the option to display the sharing user interface provides an efficient way of guiding the user inputs for sharing the portion of the content item corresponding to the designated respective portion of lyrics, which simplifies the interaction between the user and the electronic device and enhances the operability of the electronic device and makes the user-device interface more efficient (e.g., by reducing the time and inputs needed for the user to determine how to share the portion of the content item corresponding to the designated respective portion of lyrics), which additionally reduces power usage and improves battery life of the electronic device by enabling the user to use the electronic device more quickly and efficiently.

In some embodiments, in response to detecting selection of the selectable option (e.g., 654*c*) and prior to displaying the sharing user interface, such as in FIG. 6L, the electronic device 500*a* displays, such as in FIG. 6B, via the display generation component, an animated transition (e.g., from not displaying the sharing user interface element) to displaying the sharing user interface. In some embodiments, the electronic device displays an animation of the sharing user interface element sliding into view from an edge of the display generation component (e.g., and overlaid on the prior-displayed user interface) and, once the animation is complete, the electronic device displays the sharing user interface element at the edge of the display generation component.

In some embodiments, such as in FIG. 6A, while displaying the user interface associated with the respective content item (e.g., without displaying the sharing user interface element), the electronic device 500*a* receives, via the one or more input devices, selection (e.g., via contact 603*a*) of the first respective portion (e.g., 608*a*) of lyrics, wherein the selection of the first respective portion (e.g., 608*a*) of the lyrics satisfies one or more criteria (e.g., that, when satisfied, correspond to a request to share the respective portion of the content item corresponding to the first respective portion of the lyrics). In some embodiments, the one or more criteria include a criterion that is satisfied when selection of the first respective portion of the lyrics is maintained for a predetermined time threshold (e.g., 0.1, 0.2, 0.3, 0.5, 1, 2, 3, etc. seconds). For example, the electronic device displays the lyrics of the respective content item in the user interface associated with the respective content item on a touch sensitive display and the electronic device detects a contact at a location of the first respective portion of the lyrics for at least the threshold period of time.

In some embodiments, in response to detecting the selection of the first respective portion (e.g., 608*a*) of the lyrics satisfying the one or more criteria, such as in FIG. 6A, the electronic device 500*a* displays, via the display generation component, the animated transition (e.g., from not displaying the sharing user interface element) to displaying the sharing user interface, such as in FIG. 6B. In some embodiments, the electronic device displays the same animated transition to displaying the sharing user interface element irrespective of whether the request to share the portion of the content item corresponding to the designated respective portion of the lyrics is selection of a sharing option in a menu or selection of the designated respective portion of lyrics in a way that satisfies the one or more criteria.

The above-described manner of displaying the same animated transition to displaying the sharing user interface element regardless of how the request to share the portion of the content item is received provides an efficient way of enabling the user to confirm that both types of inputs initiate a process to share the portion of the content item which simplifies the interaction between the user and the electronic device and enhances the operability of the electronic device and makes the user-device interface more efficient (e.g., by reducing user inputs provided by the user to figure out how to share the portion of the content item), which additionally reduces power usage and improves battery life of the electronic device by enabling the user to use the electronic device more quickly and efficiently.

In some embodiments, while displaying the user interface associated with the respective content item and while receiving the input (e.g., via contact 603*k*) corresponding to the request to share the portion of respective content item for playback corresponding to the designated respective portion of the lyrics, such as in FIG. 6K, the electronic device 500*a* plays the respective content item. In some embodiments, the electronic device plays the respective content item using one or more speakers in communication with the electronic device. In some embodiments, the input corresponding to the request to share the respective portion of the respective content item includes selection of a sharing option displayed in a menu (e.g., as opposed to selection of a respective line of lyrics) and/or is detected while the device is playing the respective content item.

In some embodiments, while displaying the user interface associated with the respective content item and while receiving the input (e.g., via contact 603*k*) corresponding to the request to share the portion of respective content item for playback corresponding to the designated respective portion of the lyrics, such as in FIG. 6K, the electronic device 500*a* displays, via the display generation component, a third portion (e.g., 608*b*) of the lyrics corresponding to a portion of the respective content item that is currently playing, such as in FIG. 6K. In some embodiments, the user interface associated with the respective content item includes displaying the lyrics for the respective content item in a time-synchronized manner in which the electronic device displays portions of the lyrics corresponding to the current playback position of the respective content item while the respective content item plays. In some embodiments, displaying the sharing user interface that includes the lyrics for the respective content item includes displaying, via the display generation component, the third portion of the lyrics with a visual characteristic (e.g., background color, text color, text size, text style, font, background container size, background container outline style, etc.) having a first value and an additional portion of the lyrics with the visual characteristic (e.g., background color, text color, text size, text style, font, background container size, background container outline style, etc.) having a second value, different from the first value, such as displaying the sharing user interface in FIG. 6M with portion 626*b* of the lyrics designated for sharing in response to the sequence of inputs illustrated in FIGS. 6K-6L. In some embodiments, the electronic device is configured to share a portion of the respective content item corresponding to the portion(s) of lyrics displayed with the visual characteristic having the first value in response to an input to share the respective content item. For example, the electronic device is configured to share the portion of the respective content item corresponding to the third respective portion of the lyrics. In some embodiments, the third respective portion of lyrics is displayed in a container having a first color (e.g., one or more colors included in artwork associated with the respective content item) and the additional portion of lyrics is displayed in a container having a second color (e.g., black, white, grey, etc.), optionally not based on the artwork associated with the respective content item.

The above-described manner of displaying the sharing user interface with the third respective portion of lyrics displayed differently from the additional portion of lyrics provides an efficient way of indicating to the user that the third respective portion of lyrics are selected for sharing, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 6Y, the user interface associated with the respective content item includes a representation (e.g., 662*b*) of the respective content item. In some embodiments, the user interface includes representations of additional content items included in a collection of content items that includes the respective content item. For example, the user interface includes representations of songs included in a playlist or album, including a representation of the respective content item.

In some embodiments, the input corresponding to the request to share the respective portion of the respective content item for playback corresponding to the designated respective portion of lyrics of the respective content item includes selection of the representation (e.g., 662b) of the respective content item, such as in FIG. 6Y. In some embodiments, while displaying the representation of the respective content item, the electronic device detects an input corresponding to a request to display a menu of options related to the respective content item, including an option to share a portion of the content item corresponding to a selected portion of the lyrics for the respective content item. In some embodiments, the input includes detecting selection of the representation of the content item for a time that exceeds a predetermined time threshold (e.g., 0.1, 0.2, 0.3, 0.5, 1, 2, 3, etc. seconds) (e.g., a "long press" on a touch screen).

In some embodiments, in response to receiving the input corresponding to the request to share the respective portion of respective content item for playback corresponding to the designated respective portion of the lyrics, the electronic device displays the sharing user interface that includes the lyrics for the respective content item without a respective portion of the lyrics designated for sharing, such as in FIG. 6M. In some embodiments, the sharing user interface element includes the lyrics of the respective content item with each line of lyrics displayed in a respective selectable container. In some embodiments, in response to detecting selection of one or more lines of lyrics, the electronic device is configured to share a portion of the respective content item corresponding to the selected lines of lyrics. In some embodiments, when the sharing user interface element is initially displayed in response to the input including selection of the representation of the respective content item, none of the lines of lyrics are initially selected.

In some embodiments, such as in FIG. 6M, the sequence of one or more inputs corresponding to the request to designate the first respective portion of the lyrics for sharing includes selection (e.g., via contact 603m) of the first respective portion (e.g., 626d) of the lyrics in the sharing user interface. In some embodiments, in response to detecting selection of the first respective portion of lyrics, the electronic device displays the line(s) included in the first respective portion of lyrics on a different background color than the background color of the line(s) of lyrics that are not selected and is configured to share the portion of the content item corresponding to the first respective portion of lyrics in response to an input corresponding to a request to share a portion of the respective content item corresponding to the selected lines of lyrics.

In some embodiments, such as in FIG. 6H, the sequence of one or more inputs corresponding to the request to designate the second respective portion of the lyrics for sharing includes selection (e.g., via contact 603h) of the second respective portion (e.g., 626e) of the lyrics in the sharing user interface. In some embodiments, in response to detecting selection of the second respective portion of lyrics, the electronic device displays the line(s) included in the second respective portion of lyrics on a different background color than the background color of the line(s) of lyrics that are not selected and is configured to share the portion of the content item corresponding to the second respective portion of lyrics in response to an input corresponding to a request to share a portion of the respective content item corresponding to the selected lines of lyrics.

The above-described manner of allowing the user to initiate sharing of a portion of the respective content item corresponding to selected lyrics from a user interface including a representation of the respective content item provides an efficient way of sharing the respective content item while browsing content items and/or while playing a different content item on the electronic device, which simplifies the interaction between the user and the electronic device and enhances the operability of the electronic device and makes the user-device interface more efficient (e.g., by reducing the inputs needed to initiate sharing while browsing content items and/or playing a different content item), which additionally reduces power usage and improves battery life of the electronic device by enabling the user to use the electronic device more quickly and efficiently.

In some embodiments, electronic devices of various types, such as smartphones, tablets, and personal computers are able to perform one or more of the processes described herein. In some embodiments, the manner in which one or more user interface elements are displayed varies across electronic devices of different types. For example, a smartphone displays the sharing user interface element overlaid on a first portion of the content of the user interface associated with the respective content item whereas a table displays the sharing user interface element overlaid on a second portion of the content of the user interface associated with the respective content item, wherein the second portion is a subset of the first portion.

In some embodiments, such as in FIG. 6D, displaying the lyrics for the respective content item in the sharing user interface with the designated respective portion of lyrics designated for sharing includes, in accordance with a determination that the designated respective portion of the lyrics includes a plurality of lines of the lyrics, displaying a first line (e.g., 626a) and a last line (e.g., 626c) of the designated respective portion of the lyrics with a first visual characteristic. In some embodiments, each line of lyrics is displayed in a respective container in the sharing user interface element and the first and last lines of the designated respective portion of the lyrics are displayed with one or more rounded corners (e.g., external to the other lines of the designated respective portion of lyrics) with a larger corner radius than the corner radii of the containers of other lines of the lyrics. For example, the first line of the designated respective portion of lyrics is displayed in a container with rounded top corners and square bottom corners and the last line of the designated respective portion of lyrics is displayed in a container with rounded bottom corners and square bottom corners. In some embodiments, the square corners have a corner radius that is less than the corner radius of the rounded corners.

In some embodiments, such as in FIG. 6D, displaying the lyrics for the respective content item in the sharing user interface with the designated respective portion of lyrics designated for sharing includes, in accordance with a determination that the designated respective portion of the lyrics includes a plurality of lines of the lyrics, displaying one or more middle lines (e.g., 626b) of the designated respective portion of the lyrics with a second visual characteristic, different from the first visual characteristic. In some embodiments, the one or more middle lines of the designated respective portion of lyrics, if any, are displayed in containers with corners having a smaller corner radius than the corner radius of the round corners of the containers of the first and last lines of lyrics in the designated respective portion of the lyrics. In some embodiments, portions of the lyrics not included in the designated respective portion are displayed in containers having rounded corners with a greater corner radius than the corner radius of the containers of the middle lines of the designated respective portion of the lyrics and a smaller corner radius than the corner radius of the rounded corners of the first and last lines of the designated respective portion of the lyrics (e.g., displayed with the visual characteristic having a third value). In some embodiments, if the designated respective portion of lyrics is two lines of lyrics, the first line and last (e.g., second) line in the selection are displayed with the visual characteristic having the first value as described above and the electronic device does not display any lines of lyrics with the visual characteristic having the second value.

The above-described manner of displaying the first and last lines of the designated respective portion of the lyrics with a visual characteristic having a first value and displaying the middle lines of the designated respective portion of the lyrics with the visual characteristic having a second value provides an efficient way of indicating the boundaries of the selected lyrics in the sharing user interface element, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 6C, displaying the lyrics for the respective content item in the sharing user interface with the designated respective portion of lyrics designated for sharing includes, in accordance with a determination that the designated respective portion of the lyrics is a single line of lyrics, displaying the single line (e.g., 626*a*) of lyrics with the first visual characteristic. In some embodiments, the single line of lyrics is displayed in a container with rounded corners (e.g., both the top and bottom corners, or all of the corners, are rounded). In some embodiments, the other lines of lyrics in the sharing user interface element are displayed in containers that have corner radii that are less than the corner radius of the container of the single line of lyrics.

The above-described manner of displaying the single line of lyrics with the visual characteristic having the first value provides an efficient way of indicating to the user the boundary of the selected portion of lyrics, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 6C, displaying the sharing user interface includes: displaying, via the display generation component, a visual indication of a number of lines of the lyrics included in the designated portion of the lyrics (e.g., 622*a*) or a number of characters included in the designated portion of the lyrics (e.g., 622*b*). In some embodiments, in response to detecting an input corresponding to a request to select one or more additional lines of lyrics, the electronic device updates the indication of the number of lines and/or number of characters in the selection. In some embodiments, in response to detecting an input corresponding to a request to remove one or more lines of lyrics from the selection, the electronic device updates the indication of the number of lines and/or number of characters in the selection. In some embodiments, the electronic device also displays an indication of a threshold number of lines (e.g., 5, 10, 15, 20, etc. lines) or a threshold number of characters (e.g., 100, 150, 200, 250, 300, etc.) that the device is able to share. In some embodiments, the thresholds are based on licensing terms between a music streaming service and content creators.

The above-described manner of displaying an indication of the number of lines of lyrics or the number of characters in the selection provides an efficient way of indicating how many additional lines of lyrics the user is able to select before reaching a limit, which simplifies the interaction between the user and the electronic device and enhances the operability of the electronic device and makes the user-device interface more efficient (e.g., by reducing the number of inputs needed to capture the desired selection that does not exceed a line or character limit), which additionally reduces power usage and improves battery life of the electronic device by enabling the user to use the electronic device more quickly and efficiently.

In some embodiments, such as in FIG. 6A, the user interface associated with the respective content item includes artwork (e.g., 602) associated with the respective content item, the artwork displayed with a first artwork visual characteristic (e.g., color, colors, color palette). In some embodiments, the artwork is album artwork for the album that the content item is included in.

In some embodiments, such as in FIG. 6C, displaying the sharing user interface includes displaying, via the display generation component, the designated respective portion (e.g., 626*a*) of the lyrics with the first artwork visual characteristic. In some embodiments, the designated respective portion of lyrics is displayed in containers for each line of the designated respective portion of lyrics and the containers have the same colors as (and/or colors based on) the artwork associated with the respective content item.

In some embodiments, such as in FIG. 6C, displaying the sharing user interface includes displaying, via the display generation component, an additional portion (e.g., 626*b*) of the lyrics not included in the designated respective portion of the lyrics with a second artwork visual characteristic different from the first artwork visual characteristic. In some embodiments, the lines of lyrics not included in the designated respective portion of the lyrics are displayed in containers with a background color that is different from the color(s) of the containers of the lyrics in the designated respective portion of the lyrics. In some embodiments, the color of the containers of the lyrics not included in the designated respective portion of the lyrics is not based on the artwork associated with the respective content item. For example, the color of the containers of the lyrics not included in the designated respective portion of the lyrics is based on a color scheme of an operating system user interface of the electronic device.

The above-described manner of displaying the designated respective portion of lyrics with the same visual characteristic as the artwork associated with the respective content item and displaying portions of the lyrics not included in the designated respective portion with a different visual characteristic provides an efficient way of indicating which lyrics are selected for sharing in the sharing user interface element, which simplifies the interaction between the user and the electronic device and enhances the operability of the electronic device and makes the user-device interface more efficient (e.g., by reducing the number of inputs needed to review which lyrics are selected), which additionally reduces power usage and improves battery life of the electronic device by enabling the user to use the electronic device more quickly and efficiently.

In some embodiments, such as in FIG. 6U, while displaying the sharing user interface with the first portion (e.g., 626a-626c) of the lyrics designated for sharing, wherein the first respective portion (e.g., 626a-626c) of the lyrics includes a first line (e.g., 626c) of lyrics and a second line of lyrics (e.g., 626a), the electronic device 500a detects, via the one or more input devices, a first selection (e.g., via contact 603u) of a first line (e.g., 626c) of the first portion of the lyrics. In some embodiments, the first respective portion of lyrics are displayed with a visual characteristic that distinguishes the lyrics designated for sharing from the lyrics not designated for sharing, as described above.

In some embodiments, in response to detecting the first selection of the first line of lyrics, such as in FIG. 6U, the electronic device 500a updates the sharing user interface to display the sharing user interface with the first line of lyrics (e.g., 626c) being designated for sharing without the second line (e.g., 626a) of lyrics being designated for sharing, such as in FIG. 6V. In some embodiments, if the first respective portion of lyrics includes one or more lines of lyrics in addition to the first and second lines of lyrics, the electronic device updates the sharing user interface element to designate the first line of lyrics for sharing without the second line of lyrics or the one or more lines of lyrics in addition to the first and second lines of lyrics being designated for sharing. In some embodiments, while multiple lines of lyrics are designated for sharing in the sharing user interface element, in response to detecting selection of one of the designated lines of lyrics, the electronic device updates the selection to include only the selected line of lyrics.

In some embodiments, such as in FIG. 6S, while displaying the sharing user interface with the first line (e.g., 626j) of lyrics being designated for sharing without the second line (e.g., 626i) of lyrics being designated for sharing, the electronic device 500a detects, via the one or more input devices, a second selection (e.g., via contact 603s) of the first line (e.g., 626j) of lyrics. In some embodiments, while displaying the sharing user interface element with a single line of lyrics designated for sharing (e.g., with no other lines of lyrics designated for sharing), the electronic device detects selection of the line of lyrics that is designated for sharing.

In some embodiments, in response to detecting the second selection (e.g., with contact 603s) of the first line of lyrics (e.g., 626j), such as in FIG. 6S, the electronic device 500a updates the sharing user interface to display the sharing user interface without the first line (e.g., 626j) of lyrics or the second line (e.g., 626i) of lyrics being designated for sharing, such as in FIG. 6T. In some embodiments, while displaying the sharing user interface element with a single line of lyrics designated for sharing, in response to detecting selection of the single line of lyrics designated for sharing, the electronic device updates the sharing user interface element to display the lyrics without any lines of lyrics designated for sharing. In some embodiments, in response to detecting an input to share a portion of the content item corresponding to the designated lyrics, the electronic device initiates a process to share the portion of the content item corresponding to the designated lyrics.

The above-described manner of updating the designated portion of the lyrics to be a selected line of lyrics in response to detecting selection of one of multiple designated lines of lyrics and updating the designated portion of lyrics to be none of the lyrics in response to detecting selection of a designated line of lyrics that is the only designated line of lyrics provides an efficient way of updating the designated portion of lyrics, which simplifies the interaction between the user and the electronic device and enhances the operability of the electronic device and makes the user-device interface more efficient (e.g., by reducing the number of inputs needed to change which portion of the content item to share), which additionally reduces power usage and improves battery life of the electronic device by enabling the user to use the electronic device more quickly and efficiently.

In some embodiments, such as in FIG. 6P, while displaying the sharing user interface with the first portion (e.g., 626g-h) of lyrics designated for sharing, the electronic device 500a detects, via the one or more input devices, selection of a respective line (e.g., 626i) of lyrics not included in the first portion (e.g., 626g-h) of the lyrics. In some embodiments, the electronic device displays the lines of lyrics included in the first respective portion of the lyrics with a visual characteristic having a first value and displays the lines of lyrics not included in the first respective portion of lyrics with the visual characteristic having a second value, as described above.

In some embodiments, in response to detecting selection of the respective line of lyrics, in accordance with a determination that a total number of characters of the first portion (e.g., 626g-h) of the lyrics and the respective line of lyrics (e.g., 626i) (and any lines of lyrics between the first respective portion of lyrics and the respective line of lyrics) is less than a predetermined character threshold, the electronic device 500a designates the respective line (e.g., 626i) of lyrics (and any lines of lyrics between the first respective portion of lyrics and the respective line of lyrics) for sharing and maintains designation of the first portion (e.g., 626g-h) of lyrics for sharing, such as in FIG. 6Q. In some embodiments, the predetermined character threshold (e.g., 20, 50, 100, 200, 400, 500, etc. characters) is based on a licensing agreement between a music streaming service and content creators. In some embodiments, in accordance with a determination that the number of characters of the first respective portion of lyrics plus the number of characters of the respective line of lyrics (and the number of characters of any lines of lyrics between the first respective portion and the respective line of lyrics) is less than the predetermined character threshold, the electronic device adds the respective line (and any lines between the first respective portion of lyrics and the respective line) to the designated respective portion of the lyrics designated for sharing. In some embodiments, the sharing user interface element includes one or more options that, when selected, cause the electronic device to initiate a process to share a portion of the respective content item corresponding to the designated respective portion of lyrics (e.g., the portion of lyrics selected in the sharing user interface element). In some embodiments, in response to detecting selection of the respective line of lyrics, the electronic device designates the respective line of lyrics and any lines of lyrics between the first respective portion of lyrics and the respective line of lyrics for sharing.

In some embodiments, in response to detecting selection (e.g., via contact 603q) of the respective line (e.g., 626j) of lyrics, such as in FIG. 6Q, in accordance with a determination that the total number of characters of the first portion (e.g., 626g-i) of the lyrics and the respective line (e.g., 626j) of lyrics (and any lines of lyrics between the first respective portion of lyrics and the respective line of lyrics) is greater than the predetermined threshold, the electronic device 500a designates the respective line (e.g., 626j) of lyrics for sharing and removes the designation of the first respective portion (e.g., 626g-i) of lyrics for sharing. In some embodiments, in response to detecting the selection of the first respective line of lyrics and in accordance with the determination that the total number of characters of eth first respective portion of the lyrics and the respective line of lyrics (and any lines of lyrics between the first respective portion of lyrics and the respective line of lyrics), the electronic device presents a prompt asking the user if they wish to replace the designation of the first respective portion of lyrics with designation of the respective line of lyrics. In some embodiments, in response to detecting selection of an option included in the prompt to confirm the replacement of the selection, the electronic device designates the respective line of lyrics for sharing and removes the designation of the first respective portion of lyrics for sharing.

The above-described manner of adding the respective line of lyrics to the selected lyrics if the character limit is not exceeded or replacing the selection with the respective line of lyrics if adding the respective line of lyrics to the selection would exceed the character limit provides an efficient way of enforcing the character limit when the user modifies the portion of the lyrics that is designated for sharing, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 6O, while displaying the sharing user interface with the first respective portion (e.g., 626d and 626f) of lyrics designated for sharing without the respective line of lyrics designated for sharing, the electronic device 500a detects, via the one or more input devices, a request (e.g., via contact 6030) to scroll the lyrics for the respective content item to the respective line of lyrics.

In some embodiments, in response to detecting the request to scroll the lyrics, such as in FIG. 6O, in accordance with a determination that a total number of characters of the first respective portion (e.g., 626g and 626h) of the lyrics, one or more lines of lyrics between the first respective portion of the lyrics and the respective line of lyrics, and the respective line (e.g., 626i) of lyrics is less than a predetermined character threshold (e.g., 20, 50, 100, 200, 300, 500, etc. characters), the electronic device 500a displays the respective line (e.g., 626i) of lyrics with a first visual characteristic, such as in FIG. 6P (e.g., background color, text color, text size, text style, font, background container size, background container outline style, etc.). In some embodiments, a portion of the content item including the one or more lines of lyrics between the first respective portion of lyrics and the respective line of lyrics is played back between playback of a portion of the content item including the first respective portion of lyrics and a playback of a portion of the content item corresponding to the respective line of lyrics when the content item is played. In some embodiments, the electronic device does not allow designation of multiple lines of lyrics for sharing that are not directly sequential with each other. For example, if there is at least one line of lyrics between the first respective portion of lyrics and the respective line of lyrics, it is not possible to designate the first respective portion of lyrics and the respective line of lyrics for sharing without designating the at least one line of lyrics between the first respective portion of lyrics and the respective line of lyrics too. In some embodiments, displaying the respective line of lyrics with the visual characteristic having the first value indicates that the respective line of lyrics is available for selection to add to the designated respective portion of the lyrics for sharing. In some embodiments, the visual characteristic is the color of the background of the line of lyrics and/or the color of the text of the lyrics. In some embodiments, the character threshold is determined based on a licensing agreement between a content streaming service and the content creator(s).

In some embodiments, in response to detecting the request to scroll the lyrics, such as in FIG. 6O, in accordance with a determination that the total number of characters of the first respective portion of the lyrics (e.g., 626g-h), one or more lines of lyrics (e.g., 626i) between the first respective portion (e.g., 626g-h) of the lyrics and the respective line (e.g., 626j) of lyrics, and the respective line (e.g., 626j) of lyrics is greater than the predetermined character threshold, the electronic device 500a displays the respective line (e.g., 626j) of lyrics with a second visual characteristic different from the first visual characteristic. In some embodiments, displaying the respective line of lyrics with the visual characteristic having the second value indicates that the respective line of lyrics is not available for selection to add to the designated respective portion of the lyrics for sharing (but it is possible to replace the selection with the respective line of lyrics as described above). In some embodiments, the visual characteristic is the color of the background of the line of lyrics and/or the color of the text of the lyrics. For example, displaying the respective line of lyrics with the visual characteristic having the first value includes displaying the respective line of lyrics in a container with high contrast between the container and the text of the lyrics (e.g., black text on a light grey background, white text on a dark grey or black background) and displaying the respective line of lyrics with the visual characteristic having the second value includes displaying the respective line of lyrics in a container with low contrast between the container and the text of the lyrics (e.g., using a grey background and/or text). In some embodiments, while the user is scrolling the lines of lyrics that are within the character limit of the selection, the electronic device scrolls the lyrics with inertia (e.g., gradually decelerating the scrolling when a scroll input ends (e.g., liftoff of a contact on a touch screen)). In some embodiments, once the user scrolls to one or more lines of lyrics that are outside of the character limit of the selection, the electronic device scrolls the lyrics without inertia (e.g., ceasing scrolling immediately when a scroll input ends (e.g., liftoff of a contact on a touch screen)).

The above-described manner of displaying the respective line of lyrics with a visual characteristic having a value based on whether or not it is possible to add the respective line of lyrics to the selection with the first respective portion of lyrics while remaining under the character threshold provides an efficient way of enforcing the character limit while the user selects the lines of lyrics for sharing, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 6P, while displaying the sharing user interface with the first respective portion (e.g., 626g-h) of lyrics designated for sharing without the respective line (e.g., 626i) of lyrics being designated for sharing, the electronic device 500a detects, via the one or more input devices, a request (e.g., via contact 603p) to designate the respective line (e.g., 603p) of lyrics for sharing (e.g., selection of the container that includes the respective line of lyrics).

In some embodiments, in response to detecting the request to designate the respective line (e.g., 626i) of lyrics for sharing, such as in FIG. 6P, in accordance with a determination that the respective line (e.g., 626i) of lyrics is consecutive with the first respective portion (e.g., 626g-h) of lyrics in the lyrics for the respective content item (e.g., there are no other lines of lyrics between the first respective portion of lyrics and the respective line of lyrics in the lyrics for the respective content item), the electronic device 500a designates the respective line (e.g., 626i) of lyrics for sharing and maintains designation of the first respective portion (e.g., 626g-h) of lyrics for sharing, such as in FIG. 6Q. In response to a further user input to share a portion of content item corresponding to the lyrics designated for sharing, the electronic device will share the portion of the content item corresponding to the first respective portion of the lyrics and the respective line of lyrics.

In some embodiments, in response to detecting the request (e.g., via contact 603c) to designate the respective line (e.g., 626c) of lyrics for sharing, such as in FIG. 6C, in accordance with a determination that the respective line (e.g., 626c) of lyrics is not consecutive with the first respective portion (e.g., 626c) of lyrics in the lyrics for the respective content item (e.g., there are one or more other lines of lyrics between the first respective portion of lyrics and the respective line of lyrics in the lyrics for the respective content item), the electronic device 500a displays, via the display generation component, a prompt (e.g., 626) to confirm designation of the respective line of lyrics for sharing without maintaining designation of the respective line of lyrics for sharing, such as in FIG. 6R. In some embodiments, the prompt includes a selectable option that, when selected, causes the electronic device to remove the designation from the first respective portion of lyrics and designate the first line of lyrics for sharing and a selectable option that, when selected, causes the electronic device to dismiss the prompt and maintain designation of the first respective portion of lyrics without designating the respective line of lyrics for sharing. In some embodiments, while the first line of lyrics are designated for sharing, in response to an input corresponding to a request to share a portion of the respective content item corresponding to the designated lyrics, the electronic device initiates a process to share a portion of the content item corresponding to the respective line of lyrics. In some embodiments, instead of presenting the prompt, in response to detecting selection of the respective line of lyrics that is not consecutive with the first respective portion of lyrics, the electronic device maintains designation of the first respective portion of lyrics and designates the first line of lyrics and one or more lines of lyrics between the first respective portion of lyrics and the respective line of lyrics for sharing.

The above-described manner of presenting the prompt to replace the selection in response to detecting selection of a respective line of lyrics that is not consecutive with the first respective portion of lyrics designated for sharing provides an efficient way of maintaining designation of consecutive lyrics without designating portions of the lyrics not selected by the user, which simplifies the interaction between the user and the electronic device and enhances the operability of the electronic device and makes the user-device interface more efficient (e.g., by reducing the number of inputs needed by the user to correct unpredictable device responses to user inputs), which additionally reduces power usage and improves battery life of the electronic device by enabling the user to use the electronic device more quickly and efficiently.

In some embodiments, such as in FIG. 6U, while displaying the sharing user interface with a first line (e.g., 626c) of the lyrics designated for sharing (e.g., the electronic device is configured to share a portion of the content item corresponding to the first line of lyrics in response to a request to share a portion of the content corresponding to the lyrics designated for sharing), the electronic device 500a detects, via the one or more input devices, selection (e.g., via contact 603u) of the first line (e.g., 626c) of the lyrics.

In some embodiments, in response to detecting selection (e.g., via contact 603u) of the first line of lyrics (e.g., 626c), such as in FIG. 6U, in accordance with a determination that a second line (e.g., 626b) of the lyrics different from the first line (e.g., 626c) of the lyrics is also designated for sharing (e.g., the electronic device is configured to share a portion of the content item corresponding to the first and second lines of lyrics in response to a request to share a portion of the content corresponding to the lyrics designated for sharing) such as in FIG. 6U, the electronic device 500a updates the sharing user interface to designate the first line (e.g., 626c) of lyrics for sharing and removes designation of the second line (e.g., 626b) of lyrics for sharing, such as in FIG. 6V (e.g., configuring the electronic device to share a portion of the content item corresponding to the first line of lyrics without sharing the portion of the respective content item corresponding to the second line of lyrics in response to a request to share a portion of the content corresponding to the lyrics designated for sharing).

In some embodiments, in response to detecting selection (e.g., via contact 603s) of the first line of lyrics (e.g., 626j), such as in FIG. 6S, in accordance with a determination that the second line (e.g., 626i) of lyrics is not designated for sharing (e.g., no lines of lyrics other than the first line of lyrics are designated for sharing), the electronic device 500a updates the sharing user interface to remove the designation of the first line (e.g., 626j) of lyrics for sharing, such as in FIG. 6T.

The above-described manner of updating the selection to the selected line if multiple lines of lyrics are designated for sharing or updating the selection to remove the selection if one line of lyrics is designated for sharing in response to detecting selection of a line of lyrics designated for sharing provides an efficient way of de-selecting multiple lines of lyrics at once or resetting the selection of lyrics, which simplifies the interaction between the user and the electronic device and enhances the operability of the electronic device and makes the user-device interface more efficient (e.g., by reducing the time and inputs needed to remove lyrics from the portion of lyrics designated for sharing), which additionally reduces power usage and improves battery life of the electronic device by enabling the user to use the electronic device more quickly and efficiently.

In some embodiments, the electronic device shares the portion of the respective content item corresponding to the designated respective portion of the lyrics via a messaging application (e.g., text messaging, instant messaging, enhanced data-based messaging, etc.). In some embodiments, the electronic device shares an interactive image including a visual indication of the designated respective portion of the lyrics and a play option in the messaging application. In some embodiments, in response to detecting selection of the play option, the electronic device initiates playback of the portion of the content item corresponding to the designated respective portion of the respective content item while maintaining display of the messaging application user interface. In some embodiments, in response to detecting selection of a region of the interactive image other than the play option, the electronic device initiates playback of the respective content item starting at the portion of the respective content item corresponding to the designated respective portion of the lyrics while displaying a music browsing and playback user interface. In some embodiments, the interactive image further includes artwork associated with the respective content item and indications of the title and artist of the respective content item.

In some embodiments, the electronic device 500*b* receives, from a second electronic device 500*a* in communication with the electronic device 500*b*, an indication of a portion of a second respective content item corresponding to a designated respective portion (e.g., 642*d*-*e*) of lyrics for the second respective content item, such as in FIG. 6EE. In some embodiments, the second electronic device shares the portion of the second respective content item corresponding to a designated respective portion of lyrics for the second respective content item in a manner similar to those described herein.

In some embodiments, such as in FIG. 6EE, after receiving the indication of the portion of the second respective content item corresponding to the designated respective portion of the lyrics for the second respective content item, the electronic device 500*b* displays, via the display generation component, a visual indication (e.g., 650) of the portion (e.g., 642*d*-*e*) of the second respective content item corresponding to the designated respective portion of the lyrics for the second respective content item in a messaging user interface. In some embodiments, the visual indication is displayed in a communication application (e.g., messaging, e-mail, social media, etc.) application that is different from another application (e.g., a content playback, browsing, and/or streaming application) in which the user interface associated with the respective content item and the sharing user interface element are displayed. In some embodiments, the visual indication includes the designated respective portion of the lyrics for the second respective content item, an indication of the title of the second respective content item, an indication of the artist of the second respective content item, and artwork associated with the second respective content item.

In some embodiments, such as in FIG. 6W, while displaying the messaging user interface, the electronic device 500*a* detects, via the one or more input devices, selection (e.g., contact 603*w*) of the visual indication (e.g., 650) of the portion of the second respective content item corresponding to the designated respective portion (e.g., 642*d*-*e*) of the lyrics for the second respective content item.

In some embodiments, in response to detecting selection (e.g., with contact 603*w*) of the visual indication (e.g., 650) of the portion of the second respective content item corresponding to the respective portion (e.g., 642*b*-*e*) of the lyrics for the second respective content item such as in FIG. 6W, the electronic device 500*a* displays, via the display generation component, a content playback user interface of a music application (e.g., other than the communication application), the content playback user interface associated with the second respective content item, such as in FIG. 6X. In some embodiments, the content playback user interface includes the lyrics of the second respective content item. In some embodiments, in response to the input, in addition to displaying the content playback user interface, the electronic device initiates playback of the second respective content item starting at the portion of the second respective content item corresponding to the designated respective portion of the lyrics for the second respective content item. In some embodiments, the second electronic device shares the designated respective portion of the second respective content item in a manner that is the same as or similar to the manner in which the electronic device shares portions of content items as described herein.

The above-described manner of displaying the content playback user interface in response to detecting selection of the visual indication of the portion of the second respective content item provides an efficient way of performing one or more actions (e.g., play, save to library, add to playlist, view more content items with the same artist) with respect to the second respective content item, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 6W, the electronic device 500*a* is not playing a third respective content item when selection (e.g., via contact 603*w*) of the visual indication (e.g., 650) of the portion of the second respective content item corresponding to the designated respective portion of the lyrics (e.g., 642*d*-*e*) for the second respective content item is detected. In some embodiments, the electronic device displays the content playback user interface in response to detecting selection of the visual indication of the portion of the second respective content item in accordance with a determination that the electronic device is not playing content while the selection is detected.

In some embodiments, such as in FIG. 6Z, while the electronic device 500*a* is playing a third respective content item, and while displaying the messaging user interface, the electronic device 500*a* detects, via the one or more input devices, second selection (e.g., with contact 603*z*) of the visual indication (e.g., 650) of the portion of the second respective content item corresponding to the designated respective portion (e.g., 642*d*-*e*) of the lyrics for the second respective content item.

In some embodiments, in response to detecting the second selection (e.g., with contact 603*z*) of the visual indication (e.g., 650) of the portion of the second respective content item corresponding to the designated respective portion (e.g., 642*d*-*e*) of the lyrics for the second respective content item, such as in FIG. 6Z, the electronic device 500*a* displays, via the display generation component, a content collection user interface of the music application, the content collection user interface associated with a content collection (e.g., music album) that includes the second respective content item, such as in FIG. 6AA. In some embodiments, the content collection user interface includes a representation of the second respective content item and one or more representations of additional content items included in the content collection (e.g., a playlist or album). In some embodiments, the representation of the second respective content item is visually distinguished (e.g., displayed in a different color, highlighted, outlined) from the other representations of the additional content items included in the content collection. In some embodiments, while displaying the content collection user interface in response to the second selection of the visual indication of the portion of the second respective content item, the electronic device continues playback of the third respective content item and does not initiate playback of the second respective content item. In some embodiments, the second electronic device shares the designated respective portion of the second respective content item in a manner that is the same as or similar to the manner in which the electronic device shares portions of content items as described herein.

The above-described manner of displaying the content collection user interface in response to detecting the second selection of the visual indication while playing the third respective content item provides an efficient way of maintaining playback of the third respective content item and providing an efficient way of taking one or more actions (e.g., playing, saving to library, adding to playlist, viewing other items of content with the same artist) with respect to the second respective content item, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 6X, while displaying the content playback user interface associated with the second respective content item, the electronic device 500a detects, via the one or more input devices, an input corresponding to a request to cease display of the content playback user interface (e.g., without exiting a content playback application of the content playback user interface).

In some embodiments, in response to the input corresponding to the request to cease display of the content playback user interface, such as in FIG. 6X, the electronic device 500a ceases display of the content playback user interface and displays, via the display generation component, a content collection user interface of the music application, the content collection user interface associated with a content collection that includes the second respective content item, such as in FIG. 6Y. In some embodiments, the content collection user interface includes a representation of the second respective content item and one or more representations of additional content items included in the content collection (e.g., a playlist or album).

The above-described manner of displaying the content collection user interface in response to the request to cease displaying the content playback user interface provides an efficient way of viewing representations of content items in the same collection as the second respective item of content, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, if the user of the electronic device does not have an active subscription to the music streaming service through which the music sharing is provided, the electronic device forgoes playback of the shared content item in response to detecting selection of visual indication of the portion of the shared content item. In some embodiments, in response to detecting selection of the visual indication of the portion of the shared content item, the electronic device displays the content collection user interface of the music application that corresponds to a content collection (e.g., album, playlist, etc.) including the shared content item. In some embodiments, in response to detecting selection of a representation of the shared content item displayed in the content collection user interface, the electronic device displays information about subscribing to the music streaming service without playing the shared content item. In some embodiments, the information about subscribing to the music streaming service includes a marketing message highlighting the lyrics sharing feature of the music streaming service and information about the subscription cost of the subscription to the music streaming service.

In some embodiments, the electronic device 500a is playing the respective content item while displaying the user interface associated with the respective content item, such as in FIG. 6A. In some embodiments, the electronic device 500a continues to play the respective content item while displaying the sharing user interface, such as in FIG. 6C. In some embodiments, if the electronic device is playing a second respective content item while a request to share a portion of the respective content item is received, the electronic device continues playback of the second respective content item while displaying the sharing user interface element.

The above-described manner of continuing playback of the respective content item while displaying the sharing user interface element provides an efficient way of continuing playback of the respective content item without a user request to do so, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in response to detecting the sequence of one or more inputs including the input corresponding to the request to initiate the process to share the respective portion of the respective content item corresponding to the designated respective portion of the lyrics, the electronic device 500a displays, via the display generation component, a preview of a message (e.g., 638) that includes a selectable user interface element (e.g., 640) that, when selected, causes a respective electronic device to initiate playback of the respective portion of the respective content item corresponding to the designated respective portion of the lyrics, such as in FIG. 6E. In some embodiments, the electronic device maintains display of a messaging user interface including the message while playing the portion of the respective content item in response to detecting selection of the selectable user interface element. In some embodiments, once the message is sent, the message includes the selectable option that is selectable to play the respective portion of the respective content item while maintaining display of the messaging user interface in which the message is displayed. In some embodiments, if the electronic device is playing a second content item when selection of the selectable option is detected, the electronic device ceases playback of the second content item, plays the respective portion of the respective content item, then resumes playback of the second content item once the respective portion of the respective content item is finished playing. In some embodiments, in response to detecting selection of the selectable user interface element, the electronic device initiates playback of the respective portion of the respective content item. In some embodiments, a second electronic device that receives the message plays the respective portion of the respective content item in response to detecting selection of the selectable user interface element.

The above-described manner of including the selectable option to initiate playback of the respective portion of the respective content item in the message provides an efficient way of playing the respective portion of the respective content item while continuing to view the message, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in response to detecting the sequence of one or more inputs including the input corresponding to the request to initiate the process to share the respective portion of the respective content item corresponding to the designated respective portion of the lyrics, in accordance with a determination that the request to initiate the process to share the respective portion of the respective content item includes a request to share the respective portion of the respective content item via a first sharing protocol (e.g., a messaging application, such as an application for text messages and/or enhanced data-based messaging), the electronic device 500*a* shares, via the first sharing protocol, a first indication (e.g., 638) of the respective content item that includes a selectable user interface element (e.g., 640) that, when selected, causes a respective electronic device to initiate playback of the respective portion of the respective content item while displaying a user interface associated with the first sharing protocol, such as in FIG. 6F. In some embodiments, the first indication is displayed in the user interface associated with the first sharing protocol and the electronic device maintains display of the user interface associated with the first sharing protocol (e.g., the user interface of the messaging application) while playing the respective portion of the respective content item. In some embodiments, if the electronic device is playing a second content item when selection of the selectable option is detected, the electronic device ceases playback of the second content item, plays the respective portion of the respective content item, then resumes playback of the second content item once the respective portion of the respective content item is finished playing. In some embodiments, the first indication includes a region other than the selectable user interface element that, when selected, causes the electronic device to initiate playback of the respective content item starting at the respective portion of the respective content item while displaying a user interface of a music streaming application.

In some embodiments, in response to detecting the sequence of one or more inputs including the input corresponding to the request to initiate the process to share the respective portion of the respective content item corresponding to the designated respective portion of the lyrics, in accordance with a determination that the request to initiate the process to share the respective portion of the respective content item includes a request to share the respective portion of the respective content item via a second sharing protocol, different from the first sharing protocol (e.g., e-mail, instant message, social media, copying and pasting a URL), the electronic device 500*a* shares, via the second sharing protocol, a second indication (e.g., 668*c*) of the respective content item that includes a selectable user interface element (e.g., 668*c*) that, when selected, causes the respective electronic device to display a user interface of a content application associated with the respective content item, such as in FIG. 6GG. In some embodiments, the electronic device initiates playback of the respective content item from the respective portion of the respective content item while displaying the user interface of the content application, other than the messaging application.

The above-described manner of displaying the selectable user interface element to initiate playback of the respective portion of the respective content item while displaying the user interface associated with the first sharing protocol provides an efficient way of continuing to review messages in the user interface associated with the first sharing protocol while playing the respective portion of the respective content item, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 901) are also applicable in an analogous manner to method 700 described above with respect to FIG. 7. For example, the ways of sharing portions of content items described above with reference to method 700 optionally have one or more of the characteristics of the ways of securely sharing portions of content items, etc., described herein with reference to other methods described herein (e.g., methods 800 and 901). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIG. 7 are, optionally, implemented by components depicted in FIGS. 1A-1B. For example, displaying operations 702 and 704 and detecting operation 706 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Securing Shared Portions of Content Items with Digital Signatures

Users interact with electronic devices in many different manners, including using an electronic device to share portions of content items. In some circumstances, the content items may be licensed (e.g., from content creator(s)), so the electronic device (or a remote device, such as a server)

may enforce restraints for shared portions of the content item(s) to avoid violating terms of licensing agreement(s). The embodiments described below provide ways in which a system validates a digital signature when a request to share a portion of content is received. Providing efficient and secure manners of sharing portions of content items enhances interactions with a device (e.g., allows for the sharing of portions of content items) while maintaining secure access to the content items.

FIG. 8A illustrates an exemplary flow chart of a method 800 of generating a server address for sharing a portion of content according to some embodiments. In some embodiments, method 800 is performed by electronic device 500a in conjunction with one or more steps of method 700. For example, electronic device 500a uses method 800 to generate a server address that, when accessed (e.g., by another electronic device, such as device 500b), causes the server to transmit (e.g., to the other electronic device 500b) a portion of a content item.

In some embodiments, at 802, the electronic device 500a detects a request to share a first portion of content. For example, the electronic device 500a receives a sequence of user inputs identifying a portion of a content item corresponding to a selected portion of lyrics for the content item, and a sharing protocol to use to share the portion of the content item according to one or more steps of method 700.

In some embodiments, at 804, the electronic device 500a determines whether the first portion of content satisfies one or more criteria. In some embodiments, the one or more criteria require that the number of characters in the portion of content to be shared is less than a predetermined threshold number of characters (e.g., 50, 100, 150, 200, 250, 500, etc. characters). The electronic device 500a optionally enforces a character limit for the portion of content to be shared by preventing the user from selecting a portion of content that includes more characters than the predetermined threshold number of characters. For example, in response to detecting an input corresponding to a request to add a portion (e.g., a line) of lyrics to the portion of lyrics designated for sharing, the electronic device 500a presents an option to forgo adding the selected portion of lyrics to the lyrics designated for sharing and an option to replace the portion of lyrics designated for sharing with the selected portion of lyrics, without presenting an option to add the selected portion of lyrics to the portion of lyrics designated for sharing. In some embodiments, in response to detecting the input corresponding to the request to add a portion (e.g., a line) of lyrics to the portion of lyrics designated for sharing, the electronic device 500a adds the portion of lyrics to the portion of lyrics designated for sharing and removes sharing designation from one or more portions of lyrics at the beginning of the portion of lyrics designated for sharing. Thus, in some embodiments, if the user attempts to designate a portion of lyrics for sharing that does not satisfy the one or more criteria (e.g., "No" at 804), the electronic device 500a terminates method 800 at end 806.

In some embodiments, if the first portion of content identified in the request to share the first portion of content satisfies the one or more criteria (e.g., "Yes" at 804), the electronic device 500a generates a digital signature. In some embodiments, the electronic device 500a generates the digital signature by creating a (e.g., one-way) hash of data including one or more of an identification 810 of the content, an indication 812 of (e.g., the start and end times of) the first portion of the content to be shared, an indication 814 of a language associated with the content, and/or an indication 816 of a remote database associated with the content.

The indication 810 of content is optionally an identification (e.g., number) associated with the content in a catalog of content. For example, the content is available through a content delivery (e.g., playback, browsing, streaming) service that includes a plurality of content items each associated with an identification (e.g., number) in a catalog of the content delivery service.

The indication of the first portion of content is optionally an indication of a start time and an indication of the end time of the first portion of content within the playback time of the content. For example, if the portion of the content starts 30 seconds into playback of the content (e.g., from the beginning of the content) and ends 37 seconds into the playback of the content (e.g., from the beginning of the content), the indication of the first portion of content includes an indication that the first portion starts 30 seconds into playback of the content and ends 37 seconds into playback of the content.

The indication 814 of the language associated with the content is optionally an indication of a language of the catalog associated with the content. In some embodiments, the content delivery service maintains multiple catalogs in a plurality of languages. Thus, in some embodiments, identifying the language of the content enables an electronic device (e.g., a server) to correctly match the identification 810 of the content with the desired content item.

The indication 816 of the remote database associated with the content is optionally an indication of a catalog associated with the content. In some embodiments, the content delivery service maintains multiple catalogs (e.g., remote databases) of content. Thus, in some embodiments, identifying the remote database of the content enables an electronic device (e.g., a server) to correctly match the identification 810 of the content with the desired content item.

In some embodiments, once the electronic device 500a generates (808) the digital signature, the electronic device 500a generates a server address 822 at 820. In some embodiments, the server address 822 is based on (e.g., includes) one or more of the identification 810 of content, the indication 812 of the (e.g., start and end) of the first portion of content, the indication 814 of a language associated with the content, an indication 816 of the remote database associated with the content, and/or the digital signature 820. In some embodiments, the server address 822 is the address of a server of the content delivery service that, when accessed, provides access to the first portion of content.

In some embodiments, the server address 822 has a structure 830 that includes one or more of an indication 832 of the content delivery service, an indication 834 of the catalog associated with the content (e.g., an indication 816 of the remote database), an indication 836 of the content item (e.g., an identification 810 of content), an indication 838 of the portion of the content being shared (e.g., an indication 812 of (e.g., the start and end of) the first portion of content), the digital signature 840 (e.g., digital signature 818), and/or an indication 842 of the language associated with the content (e.g., indication 814 of language). FIG. 8A illustrates an exemplary server address 850 in accordance with some embodiments. For example, the exemplary server address 850 includes the indication 852 of the content delivery service, the indication 854 of the catalog of the content item, the indication 856 of the content item, the indication 858 of the portion of the content, a digital signature 860 (e.g., as a token), and an indication 862 of the language associated with the content.

In some embodiments, once the electronic device 500a has generated the server address 822, the electronic device

500a transmits the server address 822 to a second electronic device 500b (e.g., as part of a lyric sharing process with the second electronic device 500b). In some embodiments, the first electronic device 500a transmits the server address 822 to the second electronic device 500b via a messaging service.

Figure 8B:
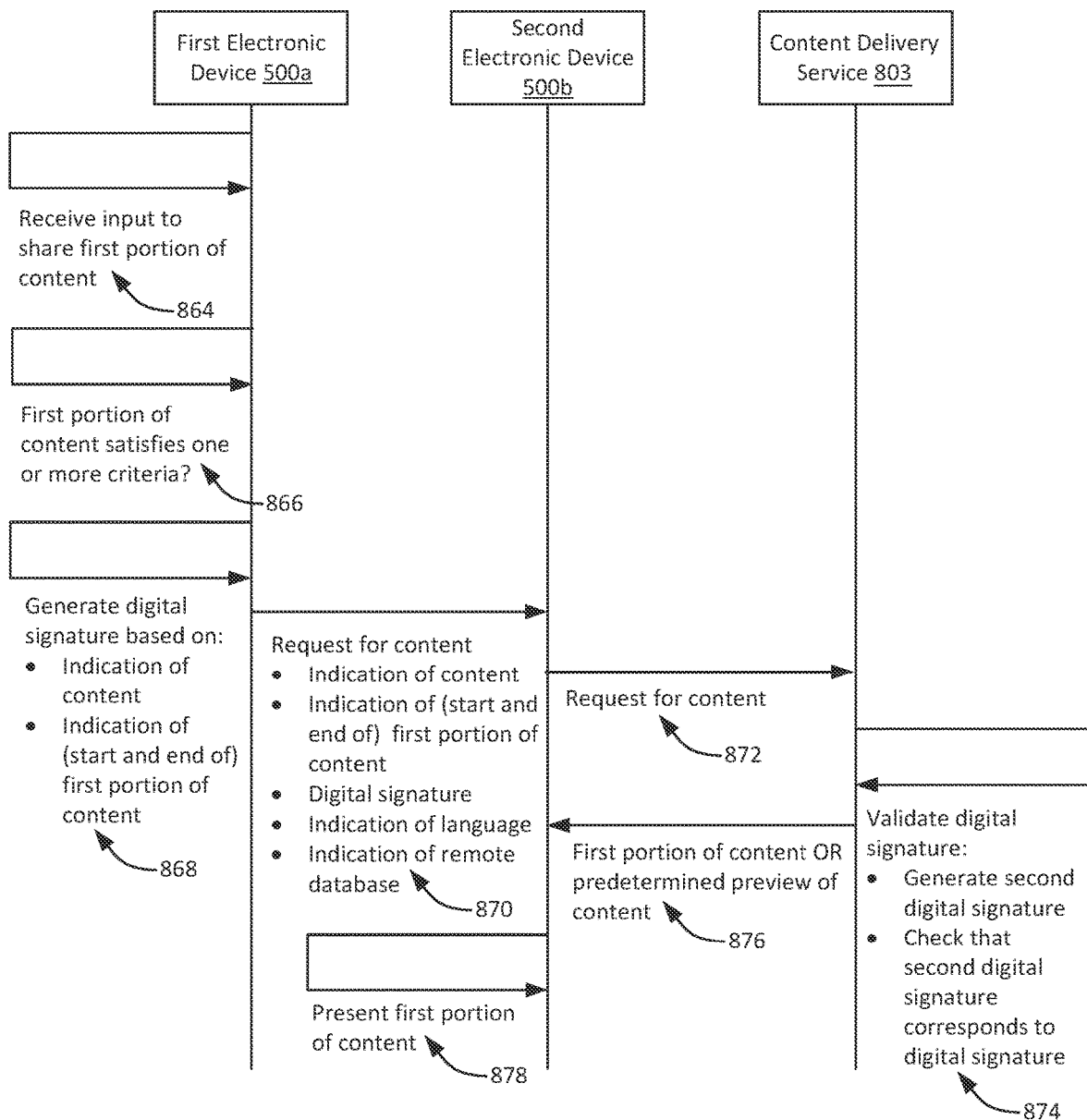
FIG. 8B is a data flow diagram of a system for sharing portions of content items according to some embodiments.

FIG. 8B is a data flow diagram of a system 801 for sharing portions of content items according to some embodiments. In some embodiments, (e.g., one or more devices included in) system 801 is able to perform one or more steps of methods 700 and/or 800. For example, first electronic device 500a and 500b share and access portions of content items corresponding to portions of lyrics of the content items as described above with reference to methods 700 and/or 800.

In some embodiments, system 801 includes a first electronic device 500a, a second electronic device 500b, and (e.g., one or more servers of) a content delivery service 803. In the example shown in FIG. 8B, the first electronic device 500a shares a portion of a content item with a second electronic device 500b, but it should be understood that, in some embodiments, the second electronic device 500b is capable of sharing portions of content items with the first electronic device 500a in a similar manner. In some embodiments, the first electronic device 500a and second electronic device 500b are one or more of a portable electronic device (e.g., smartphone, media player, tablet, wearable device (e.g., smart watch)), a computer (e.g., laptop or desktop computer), and/or a set-top box in communication with one or more speakers and a display generation component.

In some embodiments, at 864, the first electronic device 500a receives an input corresponding to a request to share a first portion of content (e.g., similar to the request to share a first portion of content 802 in FIG. 8A), such as the input (e.g., via contact 603e) described above with reference to FIG. 6E. For example, the electronic device 500a receives a sequence of user inputs identifying a portion of a content item corresponding to a selected portion of lyrics for the content item and a sharing protocol to use to share the portion of the content item according to one or more steps of method 700.

In some embodiments, at 866, the electronic device 500a determines whether the first portion of content satisfies one or more criteria (e.g., similar to decision 804 in FIG. 8A). In some embodiments, the one or more criteria require that the number of characters in the lyrics corresponding to the portion of content to be shared is less than a predetermined threshold number of characters (e.g., 50, 100, 150, 200, 250, 500, etc. characters). The electronic device 500a optionally enforces a character limit for the portion of lyrics designated for sharing by preventing the user from selecting a portion of lyrics that includes more characters than the predetermined threshold number of characters. For example, in response to detecting an input corresponding to a request to add a portion (e.g., a line) of lyrics to the portion of lyrics designated for sharing, the electronic device 500a presents an option to forgo adding the selected portion of lyrics to the lyrics designated for sharing and an option to replace the portion of lyrics designated for sharing with the selected portion of lyrics, without presenting an option to add the selected portion of lyrics to the portion of lyrics designated for sharing.

In some embodiments, if the first portion of content satisfies the one or more criteria at 866, the first electronic device 500a generates a digital signature at 868 (e.g., similar to generation 808 of digital signature 818 in FIG. 8A). The digital signature is optionally based at least on an indication of the content item (e.g., 810 in FIG. 8A) and an indication (e.g., 812 in FIG. 8A) of (e.g., the start and end of) the first portion of content. In some embodiments, the digital signature is further based on indications of a remote database (e.g., 816 in FIG. 8A) of the content and a language associated with the content (e.g., 814 in FIG. 8A). In some embodiments, the electronic device 500a generates the digital signature by creating a (e.g., one-way) hash of data including one or more of the identification of content, the indication of (e.g., the start and end times of) the first portion of the content, the indication of a language associated with the content, and/or the indication of a remote database associated with the content. In some embodiments, the electronic device 500a initiates generation of the digital signature from within a content application associated with the content delivery service 803.

In some embodiments, at 870, the first electronic device 500a generates (e.g., 820 in FIG. 8A) and transmits (e.g., 824 in FIG. 8A), to the second electronic device 500a, a request for content (e.g., similar to or the same as server address 822 in FIG. 8A). In some embodiments, the request for content includes the indication (e.g., 810, 836, 856 in FIG. 8A) of content, the indication (e.g., 812, 838, 858 in FIG. 8A) of (e.g., start and end of) the first portion of content, the digital signature (e.g., 818, 840, 860 in FIG. 8A), the indication (e.g., 814, 842, 862 in FIG. 8A) of language, and/or the indication (e.g., 816, 834, 854 in FIG. 8A) of the remote database (e.g., 870). In some embodiments, the request for content generated and transmitted at 870 in FIG. 8B is a server address, such as server address 822 described above with reference to FIG. 8A. In some embodiments, the first electronic device 500a initiates the process to generate the request for content from within a content application associated with the content delivery service 803. In some embodiments, at 870, the first electronic device 500a transmits the request for content to the second electronic device 500b through a messaging service associated with a messaging application that is different from the content application associated with the content delivery service 803.

The second electronic device 500b optionally transmits the request for content to the content delivery service 803 at 872. In some embodiments, the second electronic device 500b accesses the request for content through a messaging service.

At 874, in some embodiments, the content delivery service 803 validates the digital signature included in the request for content received from the second electronic device 500b. In some embodiments, the content delivery service 803 validates the digital signature by constructing a second digital signature and checking that the digital signature included in the request for content received from the second electronic device 500b matches the second digital signature. The content delivery service 803 optionally generates the second digital signature by creating a (e.g., one-way) hash of data including one or more of the indication of content, indication of (start and end of) first portion of content, indication of language associated with the content, and/or an indication of a remote database of the content included in the request for content received from the second electronic device 500b using the same (e.g., hashing and/or encryption) algorithms that were used by the first electronic device 500a to generate the digital signature.

In some embodiments, at 876, the content delivery service 876 transmits, to the second electronic device 500b, the first portion of content or a predetermined preview of the content. In some embodiments, if the content delivery service 803 is able to validate the digital signature (e.g., the second digital signature matches the digital signature included in the request for content received from the second electronic device 500*b*), the content delivery service 803 transmits the first portion of content to the second electronic device 500*b*.

In some embodiments, if the content delivery service 803 is not able to validate the digital signature (e.g., the second digital signature constructed by the content delivery service 803 does not match the digital signature included in the request for content received from the second electronic device 500*b*), the content delivery service 803 forgoes transmitting the first portion of content to the second electronic device 500*b*. In some embodiments, the content delivery service 803 transmits, to the second electronic device 500*b*, a predetermined preview of the content item instead of the first portion of the content item if the content delivery service 803 is not able to validate the digital signature. In some embodiments, the predetermined preview of the content item is a portion of the content item available without a subscription to the content delivery service 803.

In some embodiments, after receiving the first portion of content, the second electronic device 500*b* presents the first portion of content at 878, such as described above with reference to FIG. 6X or 6FF. In some embodiments, presenting the first portion of content includes displaying, via a display generation component of second electronic device 500*b*, the lyrics corresponding to the first portion of content. In some embodiments, presenting the first portion of content includes initiating playback of the first portion of content at the second electronic device 500*b*. In some embodiments, if the second electronic device 500*b* has a content application associated with the content delivery service 803 installed, the second electronic device 500*b* presents the first portion of content in the content application. In some embodiments, if the second electronic device 500*b* does not have the content application installed, the second electronic device 500*b* presents the first portion of content in an internet browsing application user interface.

FIG. 9A is a block diagram illustrating a system 900 that securely shares portions of content items in accordance with some embodiments of the disclosure. System 900 optionally includes one or more electronic devices, such as device 100, device 300, device 500, device 500*a*, and device 500*b* as described above with reference to FIGS. 1A-1B, 2-3, 4A-4B and 5A-5H.

As described below, the system 900 provides ways of securely sharing portions of content items between electronic devices. The method prevents users from sharing portions of the content items that exceed a predetermined length defined by licensing agreements, thus preventing unauthorized access to the content items.

In some embodiments, such as in FIG. 8B, a system includes a first electronic device 500*a* and a second electronic device 500*b* in communication via a messaging service (902). In some embodiments, the first electronic device is in communication with one or more first input devices and a first display generation component. In some embodiments, the second electronic device is in communication with one or more second input devices and a second display generation component. In some embodiments, the first electronic device and/or second electronic device is a mobile device (e.g., a tablet, a smartphone, a media player), a computer (e.g., a desktop computer, a laptop computer), or a wearable device (e.g., a watch, a head-mounted device), or a set-top box in communication with a display generation component (e.g., a television screen) and one or more input devices (e.g., a remote control). In some embodiments, the display generation component is a display integrated with the electronic device (optionally a touch screen display) and/or an external display such as a monitor, projector, television, etc. In some embodiments, the messaging service is a text messaging, social media, or enhanced data-based messaging service through which the first electronic device and second electronic device are able to transmit messages (e.g., text content, image(s), audio content, video content, internet links, etc.).

In some embodiments, such as in FIG. 8B, the first electronic device 500*a* is configured to (904) generate, based on at least an indication of content and an indication of a first portion of the content (e.g., and not the second portion of the content), a digital signature (906) (e.g., 868). In some embodiments, the first electronic device generates the digital signature by performing a (e.g., hashing and/or encryption) function using the indication of the content and the indication of the first portion of the content. In some embodiments, the digital signature is based on an indication of the region of the catalog associated with the content item and a language of the catalog associated with the content item.), (e.g., In some embodiments, the digital signature is based on an identification number associated with a content item (e.g., audio content (e.g., music, spoken word audio content), video content), an indication of a portion of the content item (e.g., timestamps of the beginning and end of the portion of the content item), an indication of a region (e.g., country) of a catalog associated with the content item, and a language of the catalog associated with the content item. In some embodiments, the digital signature is generated in response to a request to share a portion of a content item corresponding to a respective portion of lyrics of the content item in accordance with one or more steps of method 700. In some embodiments, the digital signature is created by the first electronic device by creating a (e.g., one-way) hash of data including one or more of the identification number associated with the content item, the indication of the portion of the content item, the indication of the region, or the language, and then encrypting the hash using a (e.g., private) key.

In some embodiments, such as in FIG. 8B, the first electronic device 500*a* is configured to (904) transmit, via the messaging service, a request for content (e.g., 870) to the second electronic device, wherein the request includes an indication of the content, an indication of a first portion of the content (e.g., and not a second portion of the content), and the digital signature (908). In some embodiments, the request for content is a URL (uniform resource locator) that includes one or more of an identification number associated with a content item or an indication of a portion of the content item (e.g., indications of the start and end times of the portion of the content item). In some embodiments, the URL includes the digital signature. In some embodiments, the request for content is transmitted via the messaging service in response to a request to share a portion of a content item corresponding to a respective portion of the lyrics from the content item in accordance with one or more steps of method 700. In some embodiments, the indication of the content is an identification number associated with the content. In some embodiments, the indication of the first portion of the content is a timestamp (e.g., within the playback time of the full content item) of the beginning of the portion and a timestamp (e.g., within the playback time of the full content item) of the end of the portion of the content. In some embodiments, the request further includes an indication of a region (e.g., country) of a catalog associated with the content item, and/or a language of the catalog associated with the content item.

In some embodiments, such as in FIG. 8B, the second electronic device 500b is configured to (910) receive, via the messaging service, the request for the content (912) (e.g., 870). In some embodiments, the second electronic device receives a message via the messaging service that includes the request for content (e.g., a URL that includes an indication of the content item, an indication of the portion of the content item, and the digital signature). In some embodiments, the request for the content is displayed, by the second electronic device, in a user interface of the messaging service according to one or more steps of method 700.

In some embodiments, such as in FIG. 8B, the second electronic device 500b is configured to (910) transmit the digital signature included in the request for the content (e.g., 872) to a content delivery service 803 (914). In some embodiments, the second electronic device transmits the digital signature included in the request for the content to a server associated with the content delivery service. In some embodiments, the second electronic device transmits the URL described above to the server. In some embodiments, the content delivery service is a content streaming service.

In some embodiments, such as in FIG. 8B, the second electronic device 500b is configured to (910), in accordance with a determination that one or more criteria are satisfied, including a criterion that is satisfied when the digital signature is valid, receive, from the content delivery service 803 (e.g., a server associated with the content delivery service), the first portion of the content (e.g., 876) (916) (and/or information for use by the second electronic device to access the first portion of the content). In some embodiments, the second electronic device receives the first portion of the content without receiving a second portion of the content. In some embodiments, the server associated with the content delivery service uses the indication of the content and the indication of the first portion of the content (e.g., and also indications of the country and/or language of the catalog associated with the content) to construct a digital signature and, in accordance with a determination that the signature generated by the server matches the signature transmitted by the second electronic device, the signature transmitted by the second electronic device is determined to be valid. In some embodiments, the first electronic device and the server use the same function or algorithm to generate digital signatures from indications of content and indications of portions of content (e.g., and indications of the country and/or language of the catalog of the content). In some embodiments, in accordance with a determination that the signature is not valid, the content delivery service forgoes transmitting the first portion of the content (and/or information for use by the second electronic device to access the first portion of content) to the second electronic device.

The above-described manner of using a digital signature in a request for content provides a secure manner of allowing the sharing of portions of content items with a different electronic device, and provides an efficient manner of the receiving device to receive access to the shared portions of content items, thus enhancing the operability of the electronic devices and making the user-device interface more efficient, which additionally reduces power usage and improves battery life of the electronic devices by enabling a user to use the electronic devices more quickly and efficiently.

In some embodiments, such as in FIG. 8B, the system includes (e.g., a server of) the content delivery service 803. In some embodiments, such as in FIG. 8B, the content delivery service 803 is configured to verify the digital signature (e.g., 874), including generating a second digital signature based on at least the indication of the content and the indication of the first portion of the content included in the request for the content. In some embodiments, the content delivery service obtains the indication of the content and the indication of the first portion of the content (e.g., and indications of a region and/or language of the catalog associated with the content item) from the URL transmitted by the second electronic device. The second digital signature is optionally created by the first electronic device by creating a (e.g., one-way) hash of data including the indication of the content and the indication of the first portion of the content (e.g., and indications of a region and/or language of the catalog associated with the content item) and then encrypting the hash using a (e.g., private) key. In some embodiments, the content delivery service uses the same (e.g., hashing and/or encryption) algorithm or function and/or private key to create the second digital signature as the (e.g., hashing and/or encryption) algorithm or function and/or private key that was used by the first electronic device to create the digital signature.

In some embodiments, such as in FIG. 8B, the content delivery service 803 is configured to verify (e.g., 874) the digital signature, including, in accordance with a determination that the second digital signature corresponds to (e.g., matches) the digital signature included in the request for the content, determining that the digital signature is valid. The content delivery service optionally compares the digital signature included in the request for the content with the second digital signature, and determines that they correspond if the two digital signatures match. In some embodiments, accordance with the determination that the digital signature is valid, the content delivery service transmits the first portion of the content (e.g., and/or instructions for accessing the first portion of the content) to the second electronic device.).

In some embodiments, such as in FIG. 8B, the content delivery service 803 is configured to verify (e.g., 874) the digital signature, including, in accordance with a determination that the second digital signature does not correspond (e.g., does not match) to the digital signature included in the request for the content, determining that the digital signature is not valid. The content delivery service optionally compares the digital signature included in the request for the content with the second digital signature, and determines that they do not correspond if the two digital signatures do not match. In some embodiments, in accordance with the determination that the digital signature is not valid, the content delivery service forgoes transmitting the first portion of the content (e.g., and/or instructions for accessing the first portion of the content) to the second electronic device.

The above-described manner of validating the digital signature by the content delivery service provides a secure way of sharing the first portion of the content and an efficient way of obtaining the first portion of the content, thus enhancing the operability of the electronic devices and making the user-device interface more efficient, which additionally reduces power usage and improves battery life of the electronic devices by enabling a user to use the electronic devices more quickly and efficiently.

In some embodiments, the second electronic device 500b is configured to, in accordance with a determination that the one or more criteria are not satisfied, receive, from the content delivery service 803, a predetermined preview (e.g., 876), other than the first portion, of the content (e.g., or an error message). In some embodiments, the predetermined preview is a portion of the content item that is accessible to users that do not subscribe to the content delivery service (e.g., a portion of the content available without a license). In some embodiments, the second electronic device receives the same predetermined preview of the content item when the one or more criteria are not satisfied irrespective of which portion of the content was requested by the first electronic device. In some embodiments, the one or more criteria are not satisfied when the content delivery service is unable to construct a second digital signature from the indication of the content and the indication of the first portion of the content (e.g., and indications of a region and/or language of the catalog associated with the content item) that matches the digital signature included in the request for content. In some embodiments, the digital signatures do not match if the indication of the content item used by the content delivery service to generate the second digital signature does not match the indication of the content item used by the first electronic device to generate the digital signature. In some embodiments, the digital signatures do not match if the indication of the first portion of the content item used by the content delivery service to generate the second digital signature does not match the indication of the first portion of the content item used by the first electronic device to generate the digital signature. In some embodiments, due to licensing agreements, there is a limit (e.g., 50, 150, 200, 250, 500, etc.) of a number of characters in lyrics corresponding to the first portion of the content that the first electronic device is allowed to share. In some embodiments, the first electronic device enforces the character limit according to one or more steps of method 700. In some embodiments, the content delivery service checks the number of characters included in the lyrics of the first portion of the content item and, if the number of characters included in the lyrics of the first portion of the content item exceeds the limit, the content delivery service forgoes transmitting the first portion of the content to the second electronic device even if the digital signature received from the second electronic device is valid. In some embodiments, if the character limit is exceeded, the content delivery service transmits, to the second electronic device, a subset of the first portion of content (e.g., with the same start time and different end time within the content, a different start time and same end time within the content, or different start and end times within the content as the first portion).

The above-described manner of receiving a predetermined preview of the content instead of the first portion of the content if the one or more criteria are not satisfied prevents unauthorized access to the content item and provides an efficient way of obtaining a preview of the content item if the criteria are not satisfied, thus enhancing the operability of the electronic devices and making the user-device interface more efficient, which additionally reduces power usage and improves battery life of the electronic devices by enabling a user to use the electronic devices more quickly and efficiently.

In some embodiments, such as in FIG. 8B, the second electronic device 500b is configured to, in response to receiving the first portion of the content (876), in accordance with a determination that a first application (e.g., a content browsing and/or playback application associated with the content delivery service) is installed on the second electronic device, present the first portion of the content via the first application (e.g., 878). In some embodiments, if a content application associated with the content delivery service is installed on the second electronic device, the second electronic device presents (e.g., plays) the first portion of the content item in a user interface for the content application associated with the content delivery service according to one or more steps of method 700.

In some embodiments, such as in FIG. 8B, the second electronic device 500b is configured to, in response to receiving the first portion of the content (876), in accordance with a determination that a first application is not installed on the second electronic device, present the first portion of the content via a second application (e.g., an internet browser application), different from the first application (e.g., 878). In some embodiments, if the second electronic device does not have a content application associated with the content delivery service installed, the second electronic device presents (e.g., plays) the first portion of the content item in a web browsing user interface. For example, the second electronic device presents a website associated with the content delivery service in the web browsing application.

The above-described manner of presenting the first portion of the content in a second application if the first application is not available provides an efficient way of presenting the first portion of the content (e.g., without requiring installation of the first application) thus enhancing the operability of the electronic devices and making the user-device interface more efficient (e.g., by reducing the time and inputs needed to access the first portion of the content (e.g., by installing the first application)), which additionally reduces power usage and improves battery life of the electronic devices by enabling a user to use the electronic devices more quickly and efficiently.

In some embodiments, such as in FIG. 8B, the second electronic device 500b is configured to transmit, with the digital signature to the content delivery service, at least one of the indication of the content included in the request or the indication of the first portion of the content included in the request (e.g., 872). In some embodiments, the request for content generated by the first electronic device is a URL including the digital signature, the indication of the content, and/or the indication of the first portion of the content (e.g., and/or indications of a region and/or language of the catalog associated with the content item) and the second electronic device transmits the URL to the content delivery service to access the first portion of the content.

The above-described manner of transmitting at least one of the indication of the content or the indication of the first portion of the content with the digital signature provides a way for the content delivery service to validate the digital signature, thus preventing unauthorized access to the content, thus enhancing the operability of the electronic devices and making the user-device interface more efficient, which additionally reduces power usage and improves battery life of the electronic devices by enabling a user to use the electronic devices more quickly and efficiently.

In some embodiments, the second electronic device transmits, with the digital signature, the indication of the first portion of the content to the content delivery service, and the digital signature is valid when the digital signature corresponds to the indication of the first portion of the content. For example, the content delivery service constructs a second digital signature based at least on the indication of the first portion of the content transmitted by the second electronic device and checks that the second digital signature matches the digital signature transmitted by the second electronic device.

In some embodiments, due to licensing agreements, there is a limit (e.g., 50, 150, 200, 250, 500, etc.) of a number of characters in lyrics corresponding to the first portion of the content that the first electronic device is allowed to share. In some embodiments, the first electronic device enforces the character limit according to one or more steps of method 700. In some embodiments, the content delivery service checks the number of characters included in the lyrics of the first portion of the content item and, if the number of characters included in the lyrics of the first portion of the content item exceeds the limit, the content delivery service forgoes transmitting the first portion of the content to the second electronic device even if the digital signature received from the second electronic device is valid.

In some embodiments, the digital signature is stateless. In some embodiments, the digital signature is not based on identifying information about the first or second electronic devices or user accounts associated with either the first or second electronic devices, and the (e.g., server of) the content delivery service does not have access to such identifying information.

In some embodiments, the second electronic device transmits the digital signature included in the request for content to the content delivery service from a messaging application (e.g., while displaying the user interface of the messaging application) associated with the messaging service.

In some embodiments, the first electronic device initiates generation of the request for content from a content application (e.g., while displaying a user interface associated with the content application) associated with the content delivery service.

In some embodiments, the request for content transmitted by the first electronic device includes a server address that is the address of a server of the content delivery service and the music application accesses content including the content via the content delivery service.

FIG. 9B is a flow diagram illustrating a method 901 of securely sharing a portion of a content item in accordance with some embodiments of the disclosure. The method 901 is optionally performed at an electronic device such as device 100, device 300, device 500, device 500a, device 500b as described above with reference to FIGS. 1A-1B, 2-3, 4A-4B and 5A-5H. Some operations in method 901 are, optionally combined and/or order of some operations is, optionally, changed.

As described below, the method 901 provides ways in which an electronic device securely shares a portion of a content item. The method prevents users from sharing portions of the content items that exceed a predetermined length defined by licensing agreements, thus preventing unauthorized access to the content items.

Some embodiments of the disclosure are directed to a non-transitory computer-readable storage medium including instructions, which when executed by a first electronic device 500a, cause the first electronic device 500a to perform a method 901. In some embodiments, the first electronic device is in communication with one or more first input devices and a first display generation component. In some embodiments, the first electronic device is a mobile device (e.g., a tablet, a smartphone, a media player), a computer (e.g., a desktop computer, a laptop computer), or a wearable device (e.g., a watch, a head-mounted device), or a set-top box in communication with a display generation component (e.g., a television screen) and one or more input devices (e.g., a remote control). In some embodiments, the display generation component is a display integrated with the electronic device (optionally a touch screen display) and/or an external display such as a monitor, projector, television, etc.).

In some embodiments, such as in FIG. 8A, the electronic device 500a generates (918) a server address (e.g., 820) (e.g., a URL), the server address including an indication of content (e.g., 810), and an indication of a first portion of the content (e.g., 812) and not a second portion of the content. In some embodiments, the indication of content is an identification number associated with an item of content included in a content catalog (e.g., accessible via a content delivery service). In some embodiments, the indication of the first portion of the content includes a timestamp of the beginning of the portion (e.g., within the total playback time of the full item of content) and a timestamp of the end of the portion (e.g., within the total playback time of the full item of content). In some embodiments, the server address further includes indications of a country and/or region of the catalog associated with the content item.

In some embodiments, such as in FIG. 8A, the electronic device 500a transmits (920), via a messaging service, the server address (e.g., and a digital signature) to a second electronic device 500b (e.g., 824). In some embodiments, the server address and a digital signature are included in a single URL. In some embodiments, the digital signature is based on the indication of the content and the indication of the first portion of the content. In some embodiments, the digital signature is also based on indications of the country and/or language of the catalog associated with the content. In some embodiments, the digital signature is generated using a (e.g., hashing and/or encryption) function or algorithm using the indication of the content and the indication of the first portion of the content (e.g., and the indications of the country and language of the catalog associated with the content). In some embodiments, the messaging service is a text messaging, emailing, social media, or enhanced data-based messaging service. In some embodiments, the second electronic device is in communication with one or more second input devices and a second display generation component. In some embodiments, the second electronic device is a mobile device (e.g., a tablet, a smartphone, a media player), a computer (e.g., a desktop computer, a laptop computer), or a wearable device (e.g., a watch, a head-mounted device), or a set-top box in communication with a display generation component (e.g., a television screen) and one or more input devices (e.g., a remote control). In some embodiments, the display generation component is a display integrated with the electronic device (optionally a touch screen display) and/or an external display such as a monitor, projector, television, etc. In some embodiments, the first electronic device transmits the server address and digital signature to the second electronic device in response to a request to share a portion of content corresponding to a respective portion of lyrics of the content according to one or more steps of method 700. In some embodiments, the digital signature is created by the first electronic device by creating a (e.g., one-way) hash of data including one or more of the identification number associated with the content item, the indication of the portion of the content item, the indication of the region, or the language, and then encrypting the hash using a (e.g., private) key.

In some embodiments, such as in FIG. 8B, the server address is configured such that use of the server address causes a content delivery service to respond with the first portion of the content (e.g., 876) and not a second portion of the content (922). In some embodiments, the second electronic device receives the server address and a digital signature via the messaging service. In some embodiments, in response to a request received at the second electronic device to access the server address, the server verifies the digital signature (e.g., by constructing a digital signature based on the indication of the item of content, the indication of the portion of content (e.g., and the indications of the country and language of the catalog of the content item) using the (e.g., hashing and/or encryption) function or algorithm used by the first electronic device) and checking if the constructed signature matches the signature transmitted by the second electronic device. In some embodiments, in accordance with a determination that the signature is valid, the server transmits the portion of the content item (or instructions for accessing the portion of the content item) to the second electronic device. In some embodiments, in accordance with a determination that the signature is not valid, the server forgoes transmitting the portion of the content item to the second electronic device. In some embodiments, the second electronic device is able to access the first portion of the content without being able to access a second portion of the content using the server address.

The above-described manner of using a server address provides an efficient and secure manner of allowing the sharing of portions of content items with another electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 8A, the content (e.g., 810) is a song (e.g., music content), and the first portion (e.g., 812) of the content corresponds to a respective portion of lyrics of the song. In some embodiments, the first portion of content is the portion of the song that includes the respective portion of lyrics. In some embodiments, the first electronic device is configured to only share portions of content (e.g., via transmission of the server address) corresponding to less than a threshold number (e.g., 50, 100, 150, 200, 250, 500, etc.) of characters in the lyrics corresponding to the portions of the content.

The above-described manner of generating a server address corresponding to a respective portion of lyrics of a song provides a secure way of sharing licensed music, thus enhancing the operability of the electronic devices and making the user-device interface more efficient, which additionally reduces power usage and improves battery life of the electronic devices by enabling a user to use the electronic devices more quickly and efficiently.

In some embodiments, such as in FIG. 8A, the indication (e.g., 812) of the first portion of the content includes an indication of a beginning of the first portion of the content and an indication of an end of the first portion of the content. In some embodiments, the indication of the beginning of the first portion of the content is a timestamp within the playback time of the content at which the first portion of the content begins. In some embodiments, the indication of the end of the first portion of the content is a subsequent timestamp within the playback time of the content at which the first portion of the content ends.

The above-described manner of including indications of the beginning and end of the first portion of content provides an efficient way of identifying the first portion of the content, thus enhancing the operability of the electronic devices and making the user-device interface more efficient, which additionally reduces power usage and improves battery life of the electronic devices by enabling a user to use the electronic devices more quickly and efficiently.

In some embodiments, such as in FIG. 8A, the server address (e.g., 822) includes an indication (e.g., 842, 862) of a language (e.g., of a catalog) associated with the content. In some embodiments, the content delivery service includes multiple (e.g., different) content catalogs associated with various countries and/or languages (e.g., such that different content items are optionally available in different content catalogs). In some embodiments, the server address includes an indication of the language of the catalog associated with the content and an identification number of the content. In some embodiments, the server uses the language of the catalog and the identification number of the content to locate the content requested by the first electronic device.

The above-described manner of including the indication of the language in the server address provides an efficient way of identifying the content item to be shared, thus enhancing the operability of the electronic devices and making the user-device interface more efficient, which additionally reduces power usage and improves battery life of the electronic devices by enabling a user to use the electronic devices more quickly and efficiently.

In some embodiments, such as in FIG. 8A, the server address (e.g., 822) includes an indication (e.g., 834, 854) of a remote database (e.g., storefront, catalog) associated with the content. In some embodiments, the indication of the remote database is an indication of a country associated with the remote database. In some embodiments, the content delivery service includes a plurality of remote databases of content. In some embodiments, including the indication of the remote database of content in the server address enables the server to identify the content item using an identification number of the content item in the remote database. In some embodiments, the indicated remote database defines the storefront from which users are able to access (e.g., via purchase, via subscription, etc.) the content.

The above-described manner of including the indication of the remote database in the server address provides an efficient way of identifying the content item to be shared, thus enhancing the operability of the electronic devices and making the user-device interface more efficient, which additionally reduces power usage and improves battery life of the electronic devices by enabling a user to use the electronic devices more quickly and efficiently.

In some embodiments, such as in FIG. 8A, after transmitting the server address to the second electronic device (e.g., 824), the electronic device 500a includes the server address in a messaging application (e.g., associated with the messaging service by which the server address was transmitted from the first electronic device to the second electronic device) installed on the first electronic device. In some embodiments, the server address is accessible to the first electronic device and the second electronic device from within (e.g., a user interface of) a messaging application associated with the messaging service. In some embodiments, the server address is embedded as a rich link in a message presented by the messaging application. In some embodiments, if a user of the first electronic device (or second electronic device) provides a request to access the server address (e.g., selects the rich link), the first electronic device (or second electronic device) navigates to the server address. In some embodiments, a server of the content delivery service transmits the first portion of the content to an electronic device that accesses the server address. The above-described manner of including the server address in the messaging application provides an efficient way of accessing the first portion of the content once the server address is generated, thus enhancing the operability of the electronic devices and making the user-device interface more efficient, which additionally reduces power usage and improves battery life of the electronic devices by enabling a user to use the electronic devices more quickly and efficiently.

In some embodiments, such as in FIG. 8A, generating the server address includes in accordance with a determination (e.g., 804) that the first portion of the content satisfies one or more criteria, including a criterion that is satisfied based on a number of characters of lyrics associated with the first portion of the content, generating the server address (e.g., 822) including the indication (e.g., 812, 838, 858) of the first portion of the content. In some embodiments, the one or more criteria include a criterion that is satisfied when the number of characters of the lyrics associated with the first portion of content is less than a threshold number (e.g., 50, 100, 150, 200, 350, 500, etc.) characters. In some embodiments, lyrics associated with the first portion of content are the lyrics included in the first portion of content. In some embodiments, if the number of characters in the lyrics associated with the first portion of content is less than the threshold number of characters, the first electronic device proceeds to generate the server address.

In some embodiments, such as in FIG. 8A, in accordance with a determination (e.g., 804) that the first portion of the content does not satisfy the one or more criteria, forgoing (e.g., 806) generating the server address including the indication of the first portion of the content. In some embodiments, if the number of characters in the lyrics associated with the first portion of the content is greater than the threshold number of characters, the first electronic device forgoes generating and/or transmitting the server address. In some embodiments, if the number of characters in the lyrics associated with the first portion of the content is greater than the threshold number of characters, the first electronic device generates and/or transmits a server address including an indication of a different portion of content that satisfies the character limit (e.g., a subset of the first portion of the content where the start and/or end time of the different portion is different from the start and/or end time of the first portion of content). In some embodiments, a user interface presented by the first electronic device prevents selection of a portion of content corresponding to a portion of lyrics that has more than the threshold number of characters according to one or more steps of method 700.

The above-described manner of enforcing the one or more criteria for sharing a portion of content provides a secure way of sharing portions of content without violating licensing agreements with content creators, thus enhancing the operability of the electronic devices and making the user-device interface more efficient, which additionally reduces power usage and improves battery life of the electronic devices by enabling a user to use the electronic devices more quickly and efficiently.

In some embodiments, the server address includes indications of a remote catalog (e.g., or a country or region associated with the remote catalog) and a language associated with the content and the first electronic device generates the digital signature based on the indication of the content, the indication of the first portion of the content, the indication of the remote catalog, and the indication of the language.

In some embodiments, the server (e.g., generates and/or) transmits the first portion of the content to an electronic device that accesses the server address. In some embodiments, the server (e.g., generates and/or) transmits instructions for accessing the first portion of the content to an electronic device that accesses the server address. For example, the server provides an identification number of the content item and instructions for which portion of the content item to access to the electronic device that accesses the server address.

In some embodiments, such as in FIG. 8A, the first electronic device generates (e.g., 820) the server address (e.g., 822) in response to an input (e.g., 802) to share the first portion of the content with the second electronic device. In some embodiments, the input to share the first portion of the content with the second electronic device is detected within a content playback application, such as according to one or more steps of method 700. In some embodiments, the input to share the first portion of the content includes selection of or otherwise designation of a portion of lyrics of the content item that correspond to (e.g., are played back during) the first portion of the content. In some embodiments, the first portion of the content is a subset of the content and sharing the first portion of the content shares the first portion of the content without sharing one or more portions of the content other than the first portion of the content.

The above-described manner of generating a server address in response to a request to share the first portion of content provides a secure way of sharing the first portion of the content without violating licensing agreements, thus enhancing the operability of the electronic devices and making the user-device interface more efficient, which additionally reduces power usage and improves battery life of the electronic devices by enabling a user to use the electronic devices more quickly and efficiently.

In some embodiments, the first electronic device generates a server address including an indication of a second portion of the content and the server address is configured such that the user of the server address causes a content delivery service to respond with the second portion of the content. In some embodiments, the server address includes a second digital signature generated at least based on the indication of the second portion of the content.

In some embodiments, such as in FIG. 8A, the first electronic device 500a initiates a process to generate (e.g., 820) the server address (e.g., 822) from a music application associated with a content delivery service, the music application different from a messaging application associated with the messaging service. In some embodiments, the music application is a music extension application installed within a messaging application of the messaging service. In some embodiments, the music application is associated with the content delivery service from which the content is accessible on the first and/or second electronic devices. For example, the music application browses, plays, and accesses (e.g., downloads and/or streams) content items available via the content delivery service.

The above-described manner of initiating the process to generate the server address from a music application provides an efficient way of sharing portions of content items accessible via the music application, thus enhancing the operability of the electronic devices and making the user-device interface more efficient, which additionally reduces power usage and improves battery life of the electronic devices by enabling a user to use the electronic devices more quickly and efficiently.

It should be understood that the particular order in which the operations in FIG. 9B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 800) are also applicable in an analogous manner to method 901 described above with respect to FIG. 9B. For example, the ways of securely sharing portions of content items in method 901 optionally have one or more of the characteristics of the ways of sharing portions of content items, etc., described herein with reference to other methods described herein (e.g., methods 700 and 800). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIG. 9B are, optionally, implemented by components depicted in FIGS. 1A-1B. For example, generating operation 918 and transmitting operation 920 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 9C:
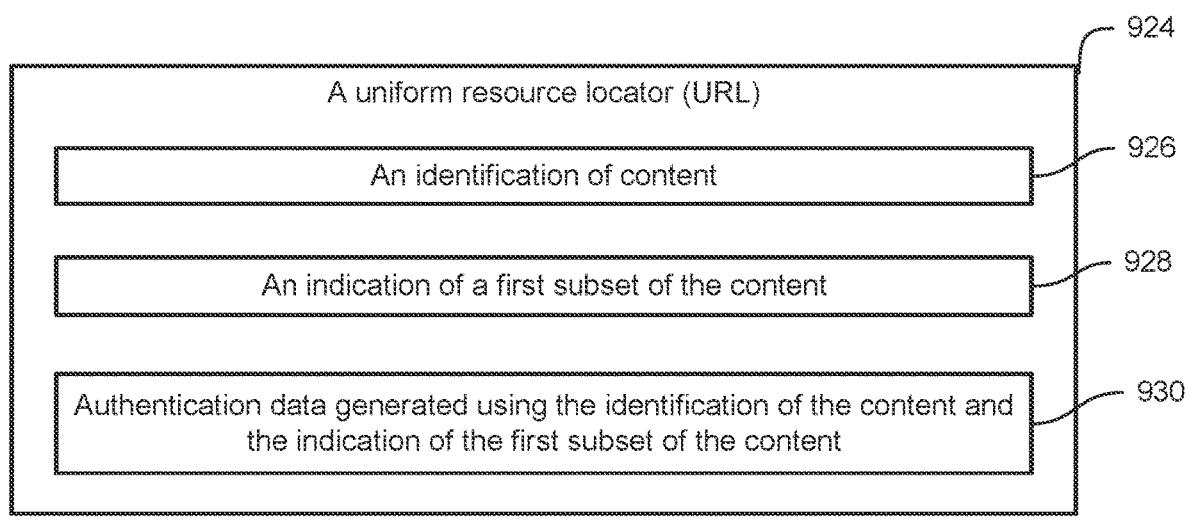
FIG. 9C is a block diagram illustrating a uniform resource locator according to some embodiments.

FIG. 9C is a block diagram illustrating a uniform resource locator 924 according to some embodiments. Some embodiments are directed to a uniform resource locator (URL) (924) (e.g., 822), such as in FIG. 8A. In some embodiments, such as in FIG. 8A, the URL (e.g., 822) includes an identification (e.g., 810, 836, 856) of content (926) (e.g., video content, audio content, etc.). In some embodiments, the identification of content is an identification number associated with an item of content in a catalog of content items (e.g., of a content streaming and/or delivery service). In some embodiments, the URL is a server address to a content delivery (e.g., browsing, streaming, playback, etc.) service from which the content is available.

In some embodiments, such as in FIG. 8A, the URL includes an indication (e.g., 812, 838, 858) of a first subset of the content (928) (e.g., and not a second subset of the content). In some embodiments, the indication of the first subset of the content includes an indication of a start time and an end time of the subset of the content, such as timestamps based on the playback time of the full item of content.

In some embodiments, such as in FIG. 8A, the URL includes authentication data (e.g., 818, 840, 860) (e.g., a certificate or a digital signature) generated using the identification (e.g., 810) of the content and the indication (e.g., 812) of the first subset of the content (930). In some embodiments, the URL further includes indications of a country and/or language of a catalog associated with the content. In some embodiments, the authentication data is further based on the indications of the country and/or language of the catalog associated with the content. In some embodiments, the authentication data is generated from the identification of the content and/or the indication of the first subset of the content (e.g., and the indications of country and/or language of the catalog associated with the content) using a (e.g., hashing and/or encryption) function or algorithm. In some embodiments, the URL is generated in response to a request, by a first electronic device, to share a portion of a content item that corresponds to a respective portion of lyrics for the content item with a second electronic device according to one or more steps of method 700. In some embodiments, the authentication data is created by a first electronic device by creating a (e.g., one-way) hash of data including one or more of the identification number associated with the content item, the indication of the portion of the content item, the indication of the region and/or the language of the catalog of the content item, and then encrypting the hash using a (e.g., private) key. In some embodiments, a second electronic device that receives the URL from a first electronic device is able to use the URL to contact a server (e.g., of a content delivery service). In some embodiments, the server transmits the first subset of the content (or instructions for accessing the first subset of the content) to the second electronic device in accordance with a determination that the authentication data is valid. In some embodiments, the server forgoes transmitting the first subset of the content (or instructions for accessing the first subset of the content) to the second electronic device in accordance with a determination that the authentication data is not valid. In some embodiments, the server determines whether or not the authentication data is valid by constructing second authentication data based on the identification of content, indication of the first subset of content, and/or the country and/or language of the catalog associated with the content using a (e.g., hashing or encryption) function or algorithm and checks that the second authentication data matches the received authentication data. In some embodiments, the URL (e.g., including the digital signature) is compatible for sharing via a messaging application/service.

The above-described manner of including authentication data and the indication of content in a URL provides an efficient way of securely sharing a portion of a content item, which enhances the operability of the electronic device and makes the user-device interface more efficient, which additionally reduces power usage and improves battery life of the electronic device by enabling the user to use the electronic device more quickly and efficiently.

In some embodiments, such as in FIG. 8A, the content (e.g., 810) comprises audio content, and the first subset (e.g., 812) of the content is a transcription of a portion of the audio content. In some embodiments, the first subset of the content is lyrics of a portion of a song. In some embodiments, the first subset of content is a portion of a song corresponding to a designated portion of lyrics of the song. In some embodiments, the indication of the first subset of the content includes an indication of a start time of the portion of the content within playback of the content and an indication of an end time of the portion of the content within playback of the content. In some embodiments, accessing the URL causes a server to look up the transcription of the first subset of the content to enable an electronic device (e.g., the electronic device that navigated to or otherwise accessed the URL) to present the transcription of the first subset of the content and/or the subset of the audio content.

The above-described manner of indicating a transcription of a portion of the audio content in a URL provides an efficient way of sharing the transcription of the portion of audio content, thus enhancing the operability of the electronic devices and making the user-device interface more efficient, which additionally reduces power usage and improves battery life of the electronic devices by enabling a user to use the electronic devices more quickly and efficiently.

In some embodiments, such as in FIG. 8A, the authentication data (e.g., 818, 840, 860) includes a digital signature generated using the identification (e.g., 810, 836, 856) of the content and the indication (e.g., 812, 838, 858) of the first subset of the content. In some embodiments, an electronic device generates the authentication data by creating a (e.g., one-way) hash of data including the identification of the content and the indication of the first subset of the content (e.g., and indications of a region and/or language of the catalog associated with the content item) and then encrypting the hash using a (e.g., private) key.

The above-described manner of generating the digital signature using the identification of the content and the indication of the first subset of the content provides a secure way of sharing the first subset of the content in accordance with licensing agreements, thus enhancing the operability of the electronic devices and making the user-device interface more efficient, which additionally reduces power usage and improves battery life of the electronic devices by enabling a user to use the electronic devices more quickly and efficiently.

In some embodiments, such as in FIG. 8A, the URL (e.g., 822) includes an indication (e.g., 814, 842, 862) of a language associated with the content. In some embodiments, the content delivery service includes multiple (e.g., different) content catalogs associated with various countries and/or languages (e.g., such that different content items are optionally available in different content catalogs). In some embodiments, the URL includes an indication of the language of the catalog associated with the content and an identification number of the content. In some embodiments, a server uses the language of the catalog and the identification number of the content to locate the content requested by the first electronic device.

The above-described manner of including the indication of the language in the URL provides an efficient way of identifying the content item to be shared, thus enhancing the operability of electronic devices and making user-device interfaces more efficient, which additionally reduces power usage and improves battery life of electronic devices by enabling a user to use the electronic devices more quickly and efficiently.

In some embodiments, such as in FIG. 8A, the URL (e.g., 822) includes an indication (e.g., 816, 834, 854) of a remote database (e.g., storefront, catalog) associated with the content. In some embodiments, the indication of the remote database is an indication of a country associated with the remote database. In some embodiments, the content delivery service includes a plurality of remote databases of content. In some embodiments, including the indication of the remote database of content in the URL enables the server to identify the content item using an identification number of the content item in the remote database. In some embodiments, the indicated remote database defines the storefront from which users are able to access (e.g., via purchase, via subscription, etc.) the content.

The above-described manner of including the indication of the remote database in the URL provides an efficient way of identifying the content item to be shared, thus enhancing the operability of electronic devices and making the user-device interface more efficient, which additionally reduces power usage and improves battery life of the electronic devices by enabling a user to use the electronic devices more quickly and efficiently.

In some embodiments, such as in FIG. 8A, the authentication data (e.g., 818, 840, 860) is generated using at least one of an indication of a language associated with the content or an indication of a remote database associated with the content. In some embodiments, the authentication data is created by an electronic device by creating a (e.g., one-way) hash of data including one or more of the identification associated with the content item, the indication of the first subset of the content item, the indication of the language associated with the content, and/or an indication of a remote database associated with the content, and then encrypting the hash using a (e.g., private) key.

The above-described manner of generating the authentication data using the indication of the language associated with the content or the indication of the remote database associated with the content provides a secure way of sharing the first subset of the content in accordance with licensing agreements, thus enhancing the operability of the electronic devices and making the user-device interface more efficient, which additionally reduces power usage and improves battery life of the electronic devices by enabling a user to use the electronic devices more quickly and efficiently.

As described above, one aspect of the present technology is the gathering and use of data available from specific and legitimate sources to present content of relevance to the user. The present disclosure contemplates that in some instances, this gathered data may include personal information data that uniquely identifies or can be used to identify a specific person. Such personal information data can include demographic data, location-based data, online identifiers, telephone numbers, e-mail addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, determining the content consumption history associated with a user account enables the electronic device to recommend additional content items that are relevant to the user. Accordingly, use of such personal information data enables users to discover content relevant to their tastes. Further, other uses for personal information data that benefit the user are also contemplated by the present disclosure. For instance, subscription information may be used to provide the user with additional portions of content items.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. For example, users can select not to share information about their content consumption history.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, users are able to browse, play, stream, and share (e.g., portions of) content without sharing their content consumption history.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
    at a first electronic device in communication with a display generation component and one or more input devices:
        while displaying, via the display generation component, a user interface associated with a respective content item, receive, via the one or more input devices, an input corresponding to a request to share a portion of the respective content item for playback corresponding to a portion of lyrics of the respective content item, with a second electronic device;
        in response to receiving the input corresponding to the request to share a portion of the respective content item corresponding to the portion of the lyrics, display, via the display generation component, a sharing user interface that includes lyrics for the respective content item;
        while displaying the sharing user interface, detect, on the sharing user interface via the one or more input devices, a sequence of one or more inputs including an input corresponding to a request to designate a portion of the lyrics of the respective content item for sharing; and
        in response to detecting the sequence of one or more inputs:
            in accordance with a determination that the sequence of one or more inputs corresponds to a request to designate a first portion of the lyrics for sharing, initiate a process to share a portion of the respective content item for playback corresponding to the first portion of the lyrics with the second electronic device; and
            in accordance with a determination that the sequence of one or more inputs corresponds to a request to designate a second portion of the lyrics for sharing, different from the first portion, initiate a process to share a portion of the respective content item for playback corresponding to the second portion of the lyrics, with the second electronic device.

2. The method of claim 1, further comprising:
    while displaying the sharing user interface that includes the lyrics for the respective content item, detecting, on the sharing user interface via the one or more input devices, selection of a first line of lyrics and selection of a second line of lyrics; and
    in response to detecting the selection of the first line of lyrics and the selection of the second line of lyrics, designating the first line of lyrics and the second line of lyrics for sharing,
    wherein the first portion of the lyrics includes the first line of lyrics and the second line of lyrics.

3. The method of claim 1, wherein the user interface associated with the respective content item includes:
    a third portion of the lyrics of the respective content item; and
    a visual indication indicating that it is possible to share a portion of the respective content item for playback corresponding to the third portion of the lyrics, wherein the visual indication is displayed proximate to the third respective portion of the lyrics.

4. The method of claim 1, wherein:
    the user interface associated with the respective content item includes a representation of the respective content item, the input corresponding to the request to share the respective portion of the respective content item for playback corresponding to the designated respective portion of lyrics of the respective content item includes selection of the representation of the respective content item, in response to receiving the input corresponding to the request to share the respective portion of the respective content item for playback corresponding to the designated respective portion of the lyrics, the electronic device displays the sharing user interface that includes the lyrics for the respective content item without a respective portion of the lyrics designated for sharing, the sequence of one or more inputs corresponding to the request to designate the first respective portion of the lyrics for sharing includes selection of the first respective portion of the lyrics in the sharing user interface, and the sequence of one or more inputs corresponding to the request to designate the second respective portion of the lyrics for sharing includes selection of the second respective portion of the lyrics in the sharing user interface.

5. The method of claim 1, wherein displaying the lyrics for the respective content item in the sharing user interface with the designated respective portion of lyrics designated for sharing includes:

in accordance with a determination that the designated respective portion of the lyrics includes a plurality of lines of the lyrics:
  displaying a first line and a last line of the designated respective portion of the lyrics with a first visual characteristic, and
  displaying one or more middle lines of the designated respective portion of the lyrics with a second visual characteristic, different from the first visual characteristic.

6. The method of claim 1, wherein the user interface associated with the respective content item includes artwork associated with the respective content item, the artwork displayed with a first artwork visual characteristic, and displaying the sharing user interface includes:

displaying, via the display generation component, the designated respective portion of the lyrics with the first artwork visual characteristic, and displaying, via the display generation component, an additional portion of the lyrics not included in the designated respective portion of the lyrics with a second artwork visual characteristic different from the first artwork visual characteristic.

7. The method of claim 1, further comprising:
while displaying the sharing user interface with the first portion of the lyrics designated for sharing, wherein the first respective portion of the lyrics includes a first line of lyrics and a second line of lyrics, detecting, via the one or more input devices, a first selection of a first line of the first portion of the lyrics;

in response to detecting the first selection of the first line of lyrics:
  updating the sharing user interface to display the sharing user interface with the first line of lyrics being designated for sharing without the second line of lyrics being designated for sharing;
while displaying the sharing user interface with the first line of lyrics being designated for sharing without the second line of lyrics being designated for sharing, detecting, via the one or more input devices, a second selection of the first line of lyrics; and in response to detecting the second selection of the first line of lyrics:
  updating the sharing user interface to display the sharing user interface without the first line of lyrics or the second line of lyrics being designated for sharing.

8. The method of claim 1, further comprising:
while displaying the sharing user interface with the first portion of lyrics designated for sharing, detecting, via the one or more input devices, selection of a respective line of lyrics not included in the first portion of the lyrics; and in response to detecting selection of the respective line of lyrics:
  in accordance with a determination that a total number of characters of the first portion of the lyrics and the respective line of lyrics is less than a predetermined character threshold, designating the respective line of lyrics for sharing and maintaining designation of the first portion of lyrics for sharing; and
  in accordance with a determination that the total number of characters of the first portion of the lyrics and the respective line of lyrics is greater than the predetermined character threshold, designating the respective line of lyrics for sharing and removing the designation of the first respective portion of lyrics for sharing.

9. The method of claim 1, further comprising:
while displaying the sharing user interface with a first line of the lyrics designated for sharing, detecting, via the one or more input devices, selection of the first line of the lyrics;

in response to detecting selection of the first line of lyrics:
  in accordance with a determination that a second line of the lyrics different from the first line of the lyrics is also designated for sharing, updating the sharing user interface to designate the first line of lyrics for sharing and removing designation of the second line of lyrics for sharing; and
  in accordance with a determination that the second line of lyrics is not designated for sharing, updating the sharing user interface to remove the designation of the first line of lyrics for sharing.

10. The method of claim 1, further comprising:
receiving, from a second electronic device in communication with the electronic device, an indication of a portion of a second respective content item corresponding to a designated respective portion of lyrics for the second respective content item;

after receiving the indication of the portion of the second respective content item corresponding to the designated respective portion of the lyrics for the second respective content item, displaying, via the display generation component, a visual indication of the portion of the second respective content item corresponding to the designated respective portion of the lyrics for the second respective content item in a messaging user interface;

while displaying the messaging user interface, detecting, via the one or more input devices, selection of the visual indication of the portion of the second respective content item corresponding to the designated respective portion of the lyrics for the second respective content item; and in response to detecting selection of the visual indication of the portion of the second respective content item corresponding to the respective portion of the lyrics for the second respective content item, displaying, via the display generation component, a content playback user interface of a music application, the content playback user interface associated with the second respective content item.

11. The method of claim 1, wherein:
the electronic device is playing the respective content item while displaying the user interface associated with the respective content item, and
the electronic device continues to play the respective content item while displaying the sharing user interface.

12. The method of claim 1, further comprising:
in response to detecting the sequence of one or more inputs including the input corresponding to the request to initiate the process to share the respective portion of the respective content item corresponding to the designated respective portion of the lyrics, displaying, via the display generation component, a preview of a message that includes a selectable user interface element that, when selected, causes a respective electronic device to initiate playback of the respective portion of the respective content item corresponding to the designated respective portion of the lyrics.

13. The method of claim 1, further comprising:
in response to detecting the sequence of one or more inputs including the input corresponding to the request to initiate the process to share the respective portion of the respective content item corresponding to the designated respective portion of the lyrics:
in accordance with a determination that the request to initiate the process to share the respective portion of the respective content item includes a request to share the respective portion of the respective content item via a first sharing protocol:
sharing, via the first sharing protocol, a first indication of the respective content item that includes a selectable user interface element that, when selected, causes a respective electronic device to initiate playback of the respective portion of the respective content item while displaying a user interface associated with the first sharing protocol; and
in accordance with a determination that the request to initiate the process to share the respective portion of the respective content item includes a request to share the respective portion of the respective content item via a second sharing protocol, different from the first sharing protocol:
sharing, via the second sharing protocol, a second indication of the respective content item that includes a selectable user interface element that, when selected, causes the respective electronic device to display a user interface of a content application associated with the respective content item.

14. An electronic device, comprising:
one or more processors;
memory; and
one or more programs, wherein the one or more programs are stored in the memory and configured to be executed by the one or more processors, the one or more programs including instructions for:
while displaying, via a display generation component, a user interface associated with a respective content item, receiving, via one or more input devices, an input corresponding to a request to share a portion of the respective content item for playback corresponding to a portion of lyrics of the respective content item, with a second electronic device;
in response to receiving the input corresponding to the request to share a portion of the respective content item corresponding to the portion of the lyrics, displaying, via the display generation component, a sharing user interface that includes lyrics for the respective content item;
while displaying the sharing user interface, detecting, on the sharing user interface via one or more input devices, a sequence of one or more inputs including an input corresponding to a request to designate a portion of the lyrics of the respective content item for sharing; and
in response to detecting the sequence of one or more inputs:
in accordance with a determination that the sequence of one or more inputs corresponds to a request to designate a first portion of the lyrics for sharing, initiating a process to share a portion of the respective content item for playback corresponding to the first portion of the lyrics with the second electronic device; and
in accordance with a determination that the sequence of one or more inputs corresponds to a request to designate a second portion of the lyrics for sharing, different from the first portion, initiating a process to share a portion of the respective content item for playback corresponding to the second portion of the lyrics, with the second electronic device.

15. The electronic device of claim 14, wherein the one or more programs further include instructions for:
while displaying the sharing user interface that includes the lyrics for the respective content item, detecting, on the sharing user interface via the one or more input devices, selection of a first line of lyrics and selection of a second line of lyrics; and
in response to detecting the selection of the first line of lyrics and the selection of the second line of lyrics, designating the first line of lyrics and the second line of lyrics for sharing,
wherein the first portion of the lyrics includes the first line of lyrics and the second line of lyrics.

16. The electronic device of claim 14, wherein the user interface associated with the respective content item includes:
a third portion of the lyrics of the respective content item; and
a visual indication indicating that it is possible to share a portion of the respective content item for playback corresponding to the third portion of the lyrics, wherein the visual indication is displayed proximate to the third respective portion of the lyrics.

17. The electronic device of claim 14, wherein:
the user interface associated with the respective content item includes a representation of the respective content item,
the input corresponding to the request to share the respective portion of the respective content item for playback corresponding to the designated respective portion of lyrics of the respective content item includes selection of the representation of the respective content item,
in response to receiving the input corresponding to the request to share the respective portion of the respective content item for playback corresponding to the designated respective portion of the lyrics, the electronic device displays the sharing user interface that includes the lyrics for the respective content item without a respective portion of the lyrics designated for sharing, the sequence of one or more inputs corresponding to the request to designate the first respective portion of the lyrics for sharing includes selection of the first respective portion of the lyrics in the sharing user interface, and the sequence of one or more inputs corresponding to the request to designate the second respective portion of the lyrics for sharing includes selection of the second respective portion of the lyrics in the sharing user interface.

18. The electronic device of claim 14, wherein displaying the lyrics for the respective content item in the sharing user interface with the designated respective portion of lyrics designated for sharing includes:
in accordance with a determination that the designated respective portion of the lyrics includes a plurality of lines of the lyrics:
displaying a first line and a last line of the designated respective portion of the lyrics with a first visual characteristic, and
displaying one or more middle lines of the designated respective portion of the lyrics with a second visual characteristic, different from the first visual characteristic.

19. The electronic device of claim 14, wherein the user interface associated with the respective content item includes artwork associated with the respective content item, the artwork displayed with a first artwork visual characteristic, and displaying the sharing user interface includes:
displaying, via the display generation component, the designated respective portion of the lyrics with the first artwork visual characteristic, and
displaying, via the display generation component, an additional portion of the lyrics not included in the designated respective portion of the lyrics with a second artwork visual characteristic different from the first artwork visual characteristic.

20. The electronic device of claim 14, wherein the one or more programs further include instructions for:
while displaying the sharing user interface with the first portion of the lyrics designated for sharing, wherein the first respective portion of the lyrics includes a first line of lyrics and a second line of lyrics, detecting, via the one or more input devices, a first selection of a first line of the first portion of the lyrics;
in response to detecting the first selection of the first line of lyrics:
updating the sharing user interface to display the sharing user interface with the first line of lyrics being designated for sharing without the second line of lyrics being designated for sharing;
while displaying the sharing user interface with the first line of lyrics being designated for sharing without the second line of lyrics being designated for sharing, detecting, via the one or more input devices, a second selection of the first line of lyrics; and
in response to detecting the second selection of the first line of lyrics:
updating the sharing user interface to display the sharing user interface without the first line of lyrics or the second line of lyrics being designated for sharing.

21. The electronic device of claim 14, wherein the one or more programs further include instructions for:
while displaying the sharing user interface with the first portion of lyrics designated for sharing, detecting, via the one or more input devices, selection of a respective line of lyrics not included in the first portion of the lyrics; and
in response to detecting selection of the respective line of lyrics:
in accordance with a determination that a total number of characters of the first portion of the lyrics and the respective line of lyrics is less than a predetermined character threshold, designating the respective line of lyrics for sharing and maintaining designation of the first portion of lyrics for sharing; and
in accordance with a determination that the total number of characters of the first portion of the lyrics and the respective line of lyrics is greater than the predetermined character threshold, designating the respective line of lyrics for sharing and removing the designation of the first respective portion of lyrics for sharing.

22. The electronic device of claim 14, wherein the one or more programs further include instructions for:
while displaying the sharing user interface with a first line of the lyrics designated for sharing, detecting, via the one or more input devices, selection of the first line of the lyrics;
in response to detecting selection of the first line of lyrics:
in accordance with a determination that a second line of the lyrics different from the first line of the lyrics is also designated for sharing, updating the sharing user interface to designate the first line of lyrics for sharing and removing designation of the second line of lyrics for sharing; and
in accordance with a determination that the second line of lyrics is not designated for sharing, updating the sharing user interface to remove the designation of the first line of lyrics for sharing.

23. The electronic device of claim 14, wherein the one or more programs further include instructions for:
receiving, from a second electronic device in communication with the electronic device, an indication of a portion of a second respective content item corresponding to a designated respective portion of lyrics for the second respective content item;
after receiving the indication of the portion of the second respective content item corresponding to the designated respective portion of the lyrics for the second respective content item, displaying, via the display generation component, a visual indication of the portion of the second respective content item corresponding to the designated respective portion of the lyrics for the second respective content item in a messaging user interface;
while displaying the messaging user interface, detecting, via the one or more input devices, selection of the visual indication of the portion of the second respective content item corresponding to the designated respective portion of the lyrics for the second respective content item; and
in response to detecting selection of the visual indication of the portion of the second respective content item corresponding to the respective portion of the lyrics for the second respective content item, displaying, via the display generation component, a content playback user interface of a music application, the content playback user interface associated with the second respective content item.

24. The electronic device of claim 14, wherein:
the electronic device is playing the respective content item while displaying the user interface associated with the respective content item, and
the electronic device continues to play the respective content item while displaying the sharing user interface.

25. The electronic device of claim 14, wherein the one or more programs further include instructions for:
in response to detecting the sequence of one or more inputs including the input corresponding to the request to initiate the process to share the respective portion of the respective content item corresponding to the designated respective portion of the lyrics, displaying, via the display generation component, a preview of a message that includes a selectable user interface element that, when selected, causes a respective electronic device to initiate playback of the respective portion of the respective content item corresponding to the designated respective portion of the lyrics.

26. The electronic device of claim 14, wherein the one or more programs further include instruction for:
in response to detecting the sequence of one or more inputs including the input corresponding to the request to initiate the process to share the respective portion of the respective content item corresponding to the designated respective portion of the lyrics:
in accordance with a determination that the request to initiate the process to share the respective portion of the respective content item includes a request to share the respective portion of the respective content item via a first sharing protocol:
sharing, via the first sharing protocol, a first indication of the respective content item that includes a selectable user interface element that, when selected, causes a respective electronic device to initiate playback of the respective portion of the respective content item while displaying a user interface associated with the first sharing protocol; and
in accordance with a determination that the request to initiate the process to share the respective portion of the respective content item includes a request to share the respective portion of the respective content item via a second sharing protocol, different from the first sharing protocol:
sharing, via the second sharing protocol, a second indication of the respective content item that includes a selectable user interface element that, when selected, causes the respective electronic device to display a user interface of a content application associated with the respective content item.

27. A non-transitory computer readable storage medium storing one or more programs, the one or more programs comprising instructions, which when executed by one or more processors of an electronic device, cause the electronic device to:
while displaying, via a display generation component, a user interface associated with a respective content item, receive, via one or more input devices, an input corresponding to a request to share a portion of the respective content item for playback corresponding to a portion of lyrics of the respective content item, with a second electronic device;
in response to receiving the input corresponding to the request to share a portion of respective content item corresponding to the portion of the lyrics, display, via the display generation component, a sharing user interface that includes lyrics for the respective content item;
while displaying the sharing user interface, detect, on the sharing user interface via one or more input devices, a sequence of one or more inputs including an input corresponding to a request to designate a portion of the lyrics of the respective content item for sharing; and
in response to detecting the sequence of one or more inputs:
in accordance with a determination that the sequence of one or more inputs corresponds to a request to designate a first portion of the lyrics for sharing, initiate a process to share a portion of the respective content item for playback corresponding to the first portion of the lyrics with the second electronic device; and
in accordance with a determination that the sequence of one or more inputs corresponds to a request to designate a second portion of the lyrics for sharing, different from the first portion, initiate a process to share a portion of the respective content item for playback corresponding to the second portion of the lyrics, with the second electronic device.

28. The non-transitory computer readable storage medium of claim 27, wherein the one or more programs further cause the electronic device to:
while displaying the sharing user interface that includes the lyrics for the respective content item, detect, on the sharing user interface via the one or more input devices, selection of a first line of lyrics and selection of a second line of lyrics; and
in response to detecting the selection of the first line of lyrics and the selection of the second line of lyrics, designate the first line of lyrics and the second line of lyrics for sharing,
wherein the first portion of the lyrics includes the first line of lyrics and the second line of lyrics.

29. The non-transitory computer readable storage medium of claim 27, wherein the one or more programs further cause the electronic device to:
while displaying the sharing user interface:
detect, on the sharing user interface via the one or more input devices, selection of a first portion of the lyrics;
in response to detecting the selection of the first portion of the lyrics, display, via the display generation component, the first portion of the lyrics with a visual characteristic having a first value and an additional portion of the lyrics with the visual characteristic having a second value, different from the first value;
detect, on the sharing user interface via the one or more input devices, selection of the additional portion of the lyrics; and
in response to detecting the selection of the additional portion of the lyrics, update the sharing user interface to include the first respective portion and the additional portion of the lyrics displayed with the visual characteristic having the first value.

30. The non-transitory computer readable storage medium of claim 27, wherein the input corresponding to the request to share the respective portion of the respective content item corresponding to the designated respective portion of the lyrics includes designating the first respective portion of the lyrics without designating an additional portion of the lyrics, and the one or more programs further cause the electronic device to:
  while displaying the sharing user interface, detect, on the sharing user interface via the one or more input devices, a sequence of one or more inputs corresponding to a request to initiate a process to share a portion of the respective content item for playback corresponding to the first portion of the lyrics and the additional portion of the lyrics; and
  in response to the sequence of one or more inputs corresponding to the request to initiate the process to share the portion of the respective content item corresponding to the first portion of the lyrics and the additional portion of the lyrics:
    display, via the display generation component, a messaging user interface including a preview of a message sharing the portion of the respective content item for playback corresponding to the first respective portion of the lyrics and the additional portion of the lyrics.

31. The non-transitory computer readable storage medium of claim 27, wherein the user interface associated with the respective content item includes:
  a third portion of the lyrics of the respective content item; and
  a visual indication indicating that it is possible to share a portion of the respective content item for playback corresponding to the third portion of the lyrics, wherein the visual indication is displayed proximate to the third respective portion of the lyrics.

32. The non-transitory computer readable storage medium of claim 27, wherein:
  the user interface associated with the respective content item includes a selectable user interface element that, when selected, causes the electronic device to display a menu that includes a selectable option that is selectable to display the sharing user interface, and
  detecting the input corresponding to the request to share the respective portion of the respective content item corresponding to the designated respective portion of lyrics of the respective content item includes detecting, via the one or more input devices, selection of the selectable option.

33. The non-transitory computer readable storage medium of claim 32, wherein the one or more programs further cause the electronic device to:
  in response to detecting selection of the selectable option and prior to displaying the sharing user interface:
    display, via the display generation component, an animated transition to displaying the sharing user interface;
  while displaying the user interface associated with the respective content item, receive, via the one or more input devices, selection of the first respective portion of lyrics, wherein the selection of the first respective portion of the lyrics satisfies one or more criteria; and
  in response to detecting the selection of the first respective portion of the lyrics satisfying the one or more criteria:
    display, via the display generation component, the animated transition to displaying the sharing user interface.

34. The non-transitory computer readable storage medium of claim 27, wherein the one or more programs further cause the electronic device to:
  while displaying the user interface associated with the respective content item and while receiving the input corresponding to the request to share the portion of the respective content item for playback corresponding to the designated respective portion of the lyrics:
    playing the respective content item; and
    displaying, via the display generation component, a third portion of the lyrics corresponding to a portion of the respective content item that is currently playing, wherein displaying the sharing user interface that includes the lyrics for the respective content item includes displaying, via the display generation component, the third portion of the lyrics with a visual characteristic having a first value and an additional portion of the lyrics with the visual characteristic having a second value, different from the first value.

35. The non-transitory computer readable storage medium of claim 27, wherein:
  the user interface associated with the respective content item includes a representation of the respective content item,
  the input corresponding to the request to share the respective portion of the respective content item for playback corresponding to the designated respective portion of lyrics of the respective content item includes selection of the representation of the respective content item,
  in response to receiving the input corresponding to the request to share the respective portion of the respective content item for playback corresponding to the designated respective portion of the lyrics, the electronic device displays the sharing user interface that includes the lyrics for the respective content item without a respective portion of the lyrics designated for sharing,
  the sequence of one or more inputs corresponding to the request to designate the first respective portion of the lyrics for sharing includes selection of the first respective portion of the lyrics in the sharing user interface, and
  the sequence of one or more inputs corresponding to the request to designate the second respective portion of the lyrics for sharing includes selection of the second respective portion of the lyrics in the sharing user interface.

36. The non-transitory computer readable storage medium of claim 27, wherein displaying the lyrics for the respective content item in the sharing user interface with the designated respective portion of lyrics designated for sharing includes:
  in accordance with a determination that the designated respective portion of the lyrics includes a plurality of lines of the lyrics:
    displaying a first line and a last line of the designated respective portion of the lyrics with a first visual characteristic, and
    displaying one or more middle lines of the designated respective portion of the lyrics with a second visual characteristic, different from the first visual characteristic.

37. The non-transitory computer readable storage medium of claim 36, wherein displaying the lyrics for the respective content item in the sharing user interface with the designated respective portion of lyrics designated for sharing includes:
  in accordance with a determination that the designated respective portion of the lyrics is a single line of lyrics:
    displaying the single line of lyrics with the first visual characteristic.

38. The non-transitory computer readable storage medium of claim 27, wherein displaying the sharing user interface includes:
  displaying, via the display generation component, a visual indication of a number of lines of the lyrics included in the designated portion of the lyrics or a number of characters included in the designated portion of the lyrics.

39. The non-transitory computer readable storage medium of claim 27, wherein the user interface associated with the respective content item includes artwork associated with the respective content item, the artwork displayed with a first artwork visual characteristic, and displaying the sharing user interface includes:
  displaying, via the display generation component, the designated respective portion of the lyrics with the first artwork visual characteristic, and
  displaying, via the display generation component, an additional portion of the lyrics not included in the designated respective portion of the lyrics with a second artwork visual characteristic different from the first artwork visual characteristic.

40. The non-transitory computer readable storage medium of claim 27, wherein the one or more programs further cause the electronic device to:
  while displaying the sharing user interface with the first portion of the lyrics designated for sharing, wherein the first respective portion of the lyrics includes a first line of lyrics and a second line of lyrics, detect, via the one or more input devices, a first selection of a first line of the first portion of the lyrics;
  in response to detecting the first selection of the first line of lyrics:
    update the sharing user interface to display the sharing user interface with the first line of lyrics being designated for sharing without the second line of lyrics being designated for sharing;
  while displaying the sharing user interface with the first line of lyrics being designated for sharing without the second line of lyrics being designated for sharing, detect, via the one or more input devices, a second selection of the first line of lyrics; and
  in response to detecting the second selection of the first line of lyrics:
    update the sharing user interface to display the sharing user interface without the first line of lyrics or the second line of lyrics being designated for sharing.

41. The non-transitory computer readable storage medium of claim 27, wherein the one or more programs further cause the electronic device to:
  while displaying the sharing user interface with the first portion of lyrics designated for sharing, detect, via the one or more input devices, selection of a respective line of lyrics not included in the first portion of the lyrics; and
  in response to detecting selection of the respective line of lyrics:
    in accordance with a determination that a total number of characters of the first portion of the lyrics and the respective line of lyrics is less than a predetermined character threshold, designate the respective line of lyrics for sharing and maintaining designation of the first portion of lyrics for sharing; and
    in accordance with a determination that the total number of characters of the first portion of the lyrics and the respective line of lyrics is greater than the predetermined character threshold, designate the respective line of lyrics for sharing and removing the designation of the first respective portion of lyrics for sharing.

42. The non-transitory computer readable storage medium of claim 41, wherein the one or more programs further cause the electronic device to:
  while displaying the sharing user interface with the first respective portion of lyrics designated for sharing without the respective line of lyrics designated for sharing, detect, via the one or more input devices, a request to scroll the lyrics for the respective content item to the respective line of lyrics; and
  in response to detecting the request to scroll the lyrics:
    in accordance with a determination that a total number of characters of the first respective portion of the lyrics, one or more lines of lyrics between the first respective portion of the lyrics and the respective line of lyrics, and the respective line of lyrics is less than a predetermined character threshold, display the respective line of lyrics with a first visual characteristic; and
    in accordance with a determination that the total number of characters of the first respective portion of the lyrics, one or more lines of lyrics between the first respective portion of the lyrics and the respective line of lyrics, and the respective line of lyrics is greater than the predetermined character threshold, display the respective line of lyrics with a second visual characteristic different from the first visual characteristic.

43. The non-transitory computer readable storage medium of claim 41, wherein the one or more programs further cause the electronic device to:
  while displaying the sharing user interface with the first respective portion of lyrics designated for sharing without the respective line of lyrics being designated for sharing, detect, via the one or more input devices, a request to designate the respective line of lyrics for sharing; and
  in response to detecting the request to designate the respective line of lyrics for sharing:
    in accordance with a determination that the respective line of lyrics is consecutive with the first respective portion of lyrics in the lyrics for the respective content item, designate the respective line of lyrics for sharing and maintaining designation of the first respective portion of lyrics for sharing; and
    in accordance with a determination that the respective line of lyrics is not consecutive with the first respective portion of lyrics in the lyrics for the respective content item, display, via the display generation component, a prompt to confirm designation of the respective line of lyrics for sharing without maintaining designation of the respective line of lyrics for sharing.

44. The non-transitory computer readable storage medium of claim 27, wherein the one or more programs further cause the electronic device to:
  while displaying the sharing user interface with a first line of the lyrics designated for sharing, detect, via the one or more input devices, selection of the first line of the lyrics;
  in response to detecting selection of the first line of lyrics:
    in accordance with a determination that a second line of the lyrics different from the first line of the lyrics is also designated for sharing, update the sharing user interface to designate the first line of lyrics for sharing and removing designation of the second line of lyrics for sharing; and in accordance with a determination that the second line of lyrics is not designated for sharing, update the sharing user interface to remove the designation of the first line of lyrics for sharing.

45. The non-transitory computer readable storage medium of claim 27, wherein the one or more programs further cause the electronic device to:

receiving, from a second electronic device in communication with the electronic device, an indication of a portion of a second respective content item corresponding to a designated respective portion of lyrics for the second respective content item;

after receiving the indication of the portion of the second respective content item corresponding to the designated respective portion of the lyrics for the second respective content item, displaying, via the display generation component, a visual indication of the portion of the second respective content item corresponding to the designated respective portion of the lyrics for the second respective content item in a messaging user interface;

while displaying the messaging user interface, detecting, via the one or more input devices, selection of the visual indication of the portion of the second respective content item corresponding to the designated respective portion of the lyrics for the second respective content item; and in response to detecting selection of the visual indication of the portion of the second respective content item corresponding to the respective portion of the lyrics for the second respective content item, displaying, via the display generation component, a content playback user interface of a music application, the content playback user interface associated with the second respective content item.

46. The non-transitory computer readable storage medium of claim 45, wherein the electronic device is not playing a third respective content item when selection of the visual indication of the portion of the second respective content item corresponding to the designated respective portion of the lyrics for the second respective content item is detected, and the one or more programs further cause the electronic device to:

while the electronic device is playing a third respective content item, and while displaying the messaging user interface, detect, via the one or more input devices, second selection of the visual indication of the portion of the second respective content item corresponding to the designated respective portion of the lyrics for the second respective content item; and in response to detecting the second selection of the visual indication of the portion of the second respective content item corresponding to the designated respective portion of the lyrics for the second respective content item, display, via the display generation component, a content collection user interface of the music application, the content collection user interface associated with a content collection that includes the second respective content item.

47. The non-transitory computer readable storage medium of claim 45, wherein the one or more programs further cause the electronic device to:

while displaying the content playback user interface associated with the second respective content item, detect, via the one or more input devices, an input corresponding to a request to cease display of the content playback user interface; and in response to the input corresponding to the request to cease display of the content playback user interface:

cease display of the content playback user interface; and display, via the display generation component, a content collection user interface of the music application, the content collection user interface associated with a content collection that includes the second respective content item.

48. The non-transitory computer readable storage medium of claim 27, wherein:

the electronic device is playing the respective content item while displaying the user interface associated with the respective content item, and the electronic device continues to play the respective content item while displaying the sharing user interface.

49. The non-transitory computer readable storage medium of claim 27, wherein the one or more programs further cause the electronic device to:

in response to detecting the sequence of one or more inputs including the input corresponding to the request to initiate the process to share the respective portion of the respective content item corresponding to the designated respective portion of the lyrics, display, via the display generation component, a preview of a message that includes a selectable user interface element that, when selected, causes a respective electronic device to initiate playback of the respective portion of the respective content item corresponding to the designated respective portion of the lyrics.

50. The non-transitory computer readable storage medium of claim 27, wherein the one or more programs further cause the electronic device to:

in response to detecting the sequence of one or more inputs including the input corresponding to the request to initiate the process to share the respective portion of the respective content item corresponding to the designated respective portion of the lyrics:

in accordance with a determination that the request to initiate the process to share the respective portion of the respective content item includes a request to share the respective portion of the respective content item via a first sharing protocol:

share, via the first sharing protocol, a first indication of the respective content item that includes a selectable user interface element that, when selected, causes a respective electronic device to initiate playback of the respective portion of the respective content item while displaying a user interface associated with the first sharing protocol; and in accordance with a determination that the request to initiate the process to share the respective portion of the respective content item includes a request to share the respective portion of the respective content item via a second sharing protocol, different from the first sharing protocol:

share, via the second sharing protocol, a second indication of the respective content item that includes a selectable user interface element that, when selected, causes the respective electronic device to display a user interface of a content application associated with the respective content item.

* * * * *

UNITED STATES PATENT AND TRADEMARK OFFICE
CERTIFICATE OF CORRECTION

PATENT NO. : 11,777,881 B2
APPLICATION NO. : 17/587965
DATED : October 3, 2023
INVENTOR(S) : Tiffany S. Reese et al.

Page 1 of 1

It is certified that error appears in the above-identified patent and that said Letters Patent is hereby corrected as shown below:

In the Claims

In Column 102, Line 5, in Claim 27, after "of" insert --the--.

Signed and Sealed this
Ninth Day of December, 2025

John A. Squires
*Director of the United States Patent and Trademark Office*